(12) United States Patent
Peterson et al.

(10) Patent No.: US 11,034,299 B2
(45) Date of Patent: Jun. 15, 2021

(54) VEHICULAR VISION SYSTEM WITH EPISODIC DISPLAY OF VIDEO IMAGES SHOWING APPROACHING OTHER VEHICLE

(71) Applicant: MAGNA MIRRORS OF AMERICA, INC., Holland, MI (US)

(72) Inventors: Kenneth C. Peterson, Ada, MI (US); Gregory A. Huizen, Hudsonville, MI (US); Niall R. Lynam, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/949,128

(22) Filed: Oct. 15, 2020

(65) Prior Publication Data
US 2021/0024000 A1    Jan. 28, 2021

Related U.S. Application Data

(63) Continuation of application No. 15/571,876, filed as application No. PCT/IB2016/052601 on May 6, 2016, now abandoned.
(Continued)

(51) Int. Cl.
*B60R 1/06* (2006.01)
*H04N 7/18* (2006.01)
(Continued)

(52) U.S. Cl.
CPC ............ *B60R 1/06* (2013.01); *G06K 9/00805* (2013.01); *G06T 11/60* (2013.01); *G08G 1/167* (2013.01);
(Continued)

(58) Field of Classification Search
None
See application file for complete search history.

(56) References Cited

U.S. PATENT DOCUMENTS

| | | |
|---|---|---|
| 2,010,138 A | 8/1935 | Condon |
| 2,263,382 A | 11/1941 | Gotzinger |
| (Continued) | | |

FOREIGN PATENT DOCUMENTS

| | | |
|---|---|---|
| CA | 1063695 A | 10/1979 |
| DE | 20010180 U1 | 8/2000 |
| (Continued) | | |

OTHER PUBLICATIONS

International Search Report and Written Opinion dated Aug. 25, 2016 for corresponding PCT Application No. PCT/IB2016/052601.

*Primary Examiner* — Frederick D Bailey
(74) *Attorney, Agent, or Firm* — Honigman LLP

(57) ABSTRACT

A vehicular vision system includes a camera disposed at an exterior portion of a body side of the equipped vehicle and viewing sideward and rearward of the equipped vehicle. A video display screen is disposed in an interior cabin of the equipped vehicle and operable to display video images. When no other vehicle is detected in another traffic lane, the video display screen displays video images representative of a first portion of the exterior scene viewed by the camera. Responsive to determination that another vehicle is in the other traffic lane and approaching from rearward of the equipped vehicle, the video display screen displays video images representative of a second portion of the exterior scene that includes the determined other vehicle. Responsive to detection of the other vehicle, the video display screen displays a graphic overlay overlaying the displayed video images representative of the second portion of the exterior scene.

62 Claims, 73 Drawing Sheets

Related U.S. Application Data

(60) Provisional application No. 62/269,350, filed on Dec. 18, 2015, provisional application No. 62/222,269, filed on Sep. 23, 2015, provisional application No. 62/157,605, filed on May 6, 2015.

(51) Int. Cl.
  *G06K 9/00* (2006.01)
  *G06T 11/60* (2006.01)
  *G08G 1/16* (2006.01)

(52) U.S. Cl.
  CPC ...... *H04N 7/188* (2013.01); *B60R 2300/8026* (2013.01); *B60R 2300/8046* (2013.01)

(56) References Cited

U.S. PATENT DOCUMENTS

| | | | |
|---|---|---|---|
| 2,580,014 A | 12/1951 | Gazda | |
| 3,266,016 A | 8/1966 | Maru | |
| 4,499,451 A | 2/1985 | Suzuki et al. | |
| 4,588,267 A | 5/1986 | Pastore | |
| 4,623,222 A | 11/1986 | Itoh et al. | |
| 4,630,904 A | 12/1986 | Pastore | |
| 4,721,364 A | 1/1988 | Itoh et al. | |
| 4,793,690 A | 12/1988 | Gahan et al. | |
| 4,799,768 A | 1/1989 | Gahan | |
| 4,906,085 A | 3/1990 | Sugihara et al. | |
| 4,917,477 A | 4/1990 | Bechtel et al. | |
| 4,951,179 A | 8/1990 | Machida | |
| 5,014,167 A | 5/1991 | Roberts | |
| 5,189,537 A | 2/1993 | O'Farrell | |
| 5,207,492 A | 5/1993 | Roberts | |
| 5,289,321 A | 2/1994 | Secor | |
| 5,313,335 A | 5/1994 | Gray et al. | |
| 5,340,503 A | 8/1994 | Varaprasad et al. | |
| 5,355,284 A | 10/1994 | Roberts | |
| 5,371,659 A | 12/1994 | Pastrick et al. | |
| 5,436,741 A | 7/1995 | Crandall | |
| 5,438,487 A | 8/1995 | Schmid et al. | |
| 5,481,409 A | 1/1996 | Roberts | |
| 5,483,385 A | 1/1996 | Boddy | |
| 5,487,116 A * | 1/1996 | Nakano ............... | G06K 9/00798 382/104 |
| 5,497,306 A | 3/1996 | Pastrick | |
| 5,528,422 A | 6/1996 | Roberts | |
| 5,530,240 A | 6/1996 | Larson et al. | |
| 5,535,056 A | 7/1996 | Caskey et al. | |
| 5,550,677 A | 8/1996 | Schofield et al. | |
| 5,575,552 A | 11/1996 | Faloon et al. | |
| 5,587,699 A | 12/1996 | Faloon et al. | |
| 5,668,663 A | 9/1997 | Varaprasad et al. | |
| 5,669,699 A | 9/1997 | Pastrick et al. | |
| 5,670,935 A | 9/1997 | Schofield et al. | |
| 5,721,187 A | 2/1998 | Ogawa et al. | |
| 5,751,489 A | 5/1998 | Caskey et al. | |
| 5,760,962 A | 6/1998 | Schofield et al. | |
| 5,774,283 A | 6/1998 | Nagel et al. | |
| 5,786,772 A | 7/1998 | Schofield et al. | |
| 5,788,357 A | 8/1998 | Muth et al. | |
| 5,796,094 A | 8/1998 | Schofield et al. | |
| 5,823,654 A | 10/1998 | Pastrick et al. | |
| 5,929,786 A | 7/1999 | Schofield et al. | |
| 5,938,320 A | 8/1999 | Crandall | |
| 6,005,724 A | 12/1999 | Todd | |
| 6,045,243 A | 4/2000 | Muth et al. | |
| 6,065,840 A | 5/2000 | Caskey et al. | |
| 6,076,948 A | 6/2000 | Bukosky et al. | |
| 6,097,023 A | 8/2000 | Schofield et al. | |
| 6,111,683 A | 8/2000 | Cammenga et al. | |
| 6,116,743 A | 9/2000 | Hoek | |
| 6,175,300 B1 | 1/2001 | Kendrick | |
| 6,176,602 B1 | 1/2001 | Pastrick et al. | |
| 6,196,688 B1 | 3/2001 | Caskey et al. | |
| 6,198,409 B1 | 3/2001 | Schofield et al. | |
| 6,213,609 B1 | 4/2001 | Foote et al. | |
| 6,227,689 B1 | 5/2001 | Miller | |
| 6,239,928 B1 | 5/2001 | Whitehead et al. | |
| 6,243,218 B1 | 6/2001 | Whitehead | |
| 6,257,746 B1 | 7/2001 | Todd et al. | |
| 6,264,353 B1 | 7/2001 | Caraher et al. | |
| 6,276,808 B1 | 8/2001 | Foote et al. | |
| 6,276,821 B1 | 8/2001 | Pastrick et al. | |
| 6,286,965 B1 | 9/2001 | Caskey et al. | |
| 6,310,738 B1 | 10/2001 | Chu | |
| 6,325,518 B1 | 12/2001 | Whitehead et al. | |
| 6,329,925 B1 | 12/2001 | Skiver et al. | |
| 6,356,376 B1 | 3/2002 | Tonar et al. | |
| 6,394,616 B1 | 5/2002 | Foote et al. | |
| 6,396,397 B1 | 5/2002 | Bos et al. | |
| 6,447,130 B2 | 9/2002 | Chu | |
| 6,467,920 B2 | 10/2002 | Schnell et al. | |
| 6,497,491 B2 | 12/2002 | Boddy et al. | |
| 6,512,624 B2 | 1/2003 | Tonar et al. | |
| 6,582,109 B2 | 6/2003 | Miller | |
| 6,598,982 B2 | 7/2003 | Witt | |
| 6,612,708 B2 | 9/2003 | Chu | |
| 6,616,314 B2 | 9/2003 | Thau | |
| 6,669,267 B1 | 12/2003 | Lynam et al. | |
| 6,690,268 B2 | 2/2004 | Schofield et al. | |
| 6,693,517 B2 | 2/2004 | McCarthy et al. | |
| 6,700,692 B2 | 3/2004 | Tonar et al. | |
| 6,755,544 B2 | 6/2004 | Schnell et al. | |
| 6,824,281 B2 | 11/2004 | Schofield et al. | |
| 6,855,431 B2 | 2/2005 | Varaprasad et al. | |
| 6,882,287 B2 | 4/2005 | Schofield | |
| 6,902,284 B2 | 6/2005 | Hutzel et al. | |
| 6,969,101 B2 | 11/2005 | Lynam et al. | |
| 7,038,577 B2 | 5/2006 | Pawlicki et al. | |
| 7,083,312 B2 | 8/2006 | Pastrick et al. | |
| 7,184,190 B2 | 2/2007 | McCabe et al. | |
| 7,188,963 B2 | 3/2007 | Schofield et al. | |
| 7,195,381 B2 | 3/2007 | Lynam et al. | |
| 7,224,324 B2 | 5/2007 | Quist et al. | |
| 7,241,037 B2 | 7/2007 | Mathieu et al. | |
| 7,253,723 B2 | 8/2007 | Lindahl et al. | |
| 7,255,451 B2 | 8/2007 | McCabe et al. | |
| 7,274,501 B2 | 9/2007 | McCabe et al. | |
| 7,338,177 B2 | 3/2008 | Lynam | |
| 7,370,983 B2 | 5/2008 | DeWind et al. | |
| 7,404,654 B2 | 7/2008 | Lueftner | |
| 7,446,650 B2 | 11/2008 | Scholfield et al. | |
| 7,492,281 B2 | 2/2009 | Lynam et al. | |
| 7,580,795 B2 | 8/2009 | McCarthy et al. | |
| 7,581,859 B2 | 9/2009 | Lynam | |
| 7,594,823 B2 | 9/2009 | Moscovitch | |
| 7,626,749 B2 | 12/2009 | Baur et al. | |
| 7,720,580 B2 | 5/2010 | Higgins-Luthman | |
| 7,777,611 B2 | 8/2010 | Desai | |
| 7,855,755 B2 | 12/2010 | Weller et al. | |
| 7,881,496 B2 | 2/2011 | Camilleri et al. | |
| 7,914,187 B2 | 3/2011 | Higgins-Luthman et al. | |
| 7,965,336 B2 | 6/2011 | Bingle et al. | |
| 8,027,029 B2 | 9/2011 | Lu et al. | |
| 8,154,418 B2 | 4/2012 | Peterson et al. | |
| 8,506,096 B2 | 8/2013 | McCabe et al. | |
| 8,786,704 B2 | 7/2014 | Foote et al. | |
| 8,861,792 B2 | 10/2014 | Stein et al. | |
| 9,280,202 B2 | 3/2016 | Gieseke et al. | |
| 2002/0017985 A1 | 2/2002 | Schofield et al. | |
| 2005/0128061 A1 * | 6/2005 | Yanai ................... | H04N 7/181 340/435 |
| 2005/0146607 A1 | 7/2005 | Linn et al. | |
| 2006/0050018 A1 | 3/2006 | Hutzel et al. | |
| 2006/0061008 A1 | 3/2006 | Karner et al. | |
| 2006/0181772 A1 | 8/2006 | Byers et al. | |
| 2006/0184297 A1 | 8/2006 | Higgins-Luthman | |
| 2006/0250224 A1 | 11/2006 | Steffel et al. | |
| 2007/0058257 A1 | 3/2007 | Lynam | |
| 2008/0007428 A1 | 1/2008 | Watanabe et al. | |
| 2008/0106389 A1 | 5/2008 | Desai | |
| 2008/0149796 A1 | 6/2008 | Moscovitch | |
| 2008/0180527 A1 | 7/2008 | Nixdorf et al. | |

(56) References Cited

U.S. PATENT DOCUMENTS

| | | | |
|---|---|---|---|
| 2009/0079553 A1* | 3/2009 | Yanagi | B60R 1/00 |
| | | | 340/435 |
| 2010/0013928 A1* | 1/2010 | Haug | H04N 5/2354 |
| | | | 348/148 |
| 2010/0049402 A1 | 2/2010 | Tanaka | |
| 2010/0231715 A1* | 9/2010 | Garner | B60R 1/00 |
| | | | 348/148 |
| 2010/0256909 A1 | 10/2010 | Duggan et al. | |
| 2010/0265048 A1 | 10/2010 | Lu et al. | |
| 2011/0181728 A1 | 7/2011 | Tieman et al. | |
| 2011/0293145 A1 | 12/2011 | Nogami et al. | |
| 2012/0013742 A1 | 1/2012 | Fairchild et al. | |
| 2012/0062743 A1 | 3/2012 | Lynam et al. | |
| 2012/0133768 A1 | 5/2012 | Stephan | |
| 2012/0154591 A1* | 6/2012 | Baur | B60R 1/00 |
| | | | 348/148 |
| 2012/0162427 A1 | 6/2012 | Lynam | |
| 2012/0218412 A1 | 8/2012 | Dellantoni et al. | |
| 2013/0222592 A1 | 8/2013 | Gieseke | |
| 2013/0300869 A1 | 11/2013 | Lu et al. | |
| 2013/0342333 A1 | 12/2013 | Hutchings | |
| 2014/0104426 A1 | 4/2014 | Boegel et al. | |
| 2014/0139669 A1 | 5/2014 | Petrillo et al. | |
| 2014/0160284 A1 | 6/2014 | Achenbach et al. | |
| 2014/0218529 A1 | 8/2014 | Mahmoud et al. | |
| 2014/0232869 A1 | 8/2014 | May et al. | |
| 2014/0285666 A1 | 9/2014 | O'Connell et al. | |
| 2014/0375476 A1 | 12/2014 | Johnson et al. | |
| 2014/0376119 A1 | 12/2014 | Sobecki et al. | |
| 2015/0002642 A1* | 1/2015 | Dressler | H04N 13/305 |
| | | | 348/51 |
| 2015/0049193 A1 | 2/2015 | Gupta et al. | |
| 2015/0124096 A1 | 5/2015 | Koravadi | |
| 2015/0158499 A1 | 6/2015 | Koravadi | |
| 2015/0224930 A1 | 8/2015 | Foote et al. | |
| 2015/0232030 A1 | 8/2015 | Bongwald | |
| 2015/0232034 A1* | 8/2015 | Weller | B60R 1/02 |
| | | | 348/148 |
| 2015/0251599 A1 | 9/2015 | Koravadi | |
| 2015/0294169 A1 | 10/2015 | Zhou et al. | |
| 2015/0296135 A1 | 10/2015 | Wacquant et al. | |
| 2015/0314736 A1* | 11/2015 | Hughes | B60R 11/04 |
| | | | 348/148 |
| 2015/0350607 A1* | 12/2015 | Kim | H04N 7/181 |
| | | | 348/148 |
| 2015/0352953 A1 | 12/2015 | Koravadi | |
| 2015/0360615 A1 | 12/2015 | Peterson et al. | |
| 2016/0036917 A1 | 2/2016 | Koravadi et al. | |
| 2016/0046236 A1* | 2/2016 | Mozer | G06K 9/00604 |
| | | | 348/148 |
| 2016/0137126 A1 | 5/2016 | Fursich et al. | |
| 2016/0243988 A1 | 8/2016 | Peterson et al. | |
| 2016/0347251 A1* | 12/2016 | Shigemura | G06K 9/00805 |
| 2016/0375833 A1 | 12/2016 | Larson et al. | |
| 2018/0134217 A1 | 5/2018 | Peterson et al. | |
| 2018/0253899 A1* | 9/2018 | Schrepfer | G01C 21/3638 |

FOREIGN PATENT DOCUMENTS

| | | |
|---|---|---|
| DE | 102004034477 A1 | 2/2006 |
| EP | 0028370 A1 | 5/1981 |
| EP | 2003019 A2 | 12/2008 |
| FR | 2672857 A1 | 8/1992 |
| FR | 2783778 A1 | 3/2000 |
| GB | 1172382 A | 11/1969 |
| WO | 2006124682 A2 | 11/2006 |
| WO | 2007005942 A2 | 1/2007 |
| WO | 2010099416 A1 | 9/2010 |
| WO | 2011028686 A1 | 3/2011 |
| WO | 2011044312 A1 | 4/2011 |
| WO | 2011105638 A1 | 9/2011 |
| WO | 2012/051500 A1 | 4/2012 |
| WO | 2013071070 A1 | 5/2013 |
| WO | 2013/109869 A1 | 7/2013 |
| WO | 2014204794 A1 | 12/2014 |

* cited by examiner

Use head-tracking as an input for the driver to tell the CMS to expand the FOV

Use GPS, turn signal or lane change detection to trigger system to display additional field of view.
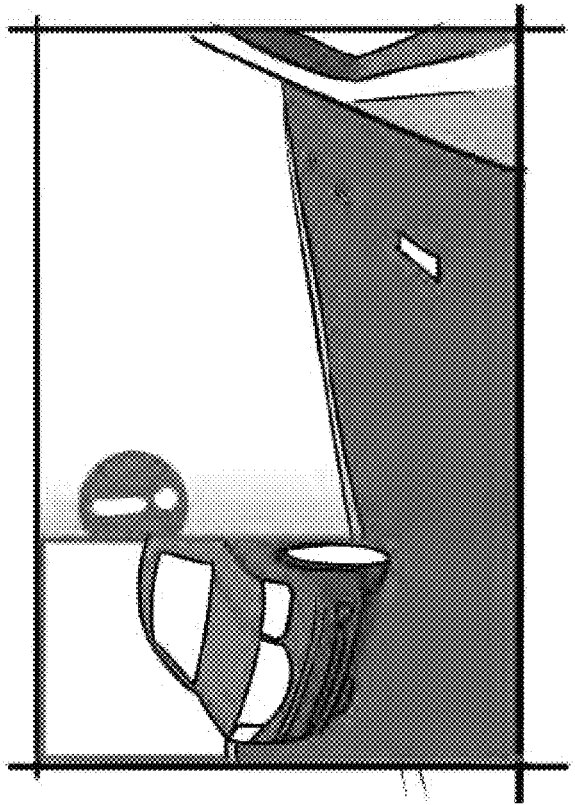
FIG. 8A
FIG. 8B
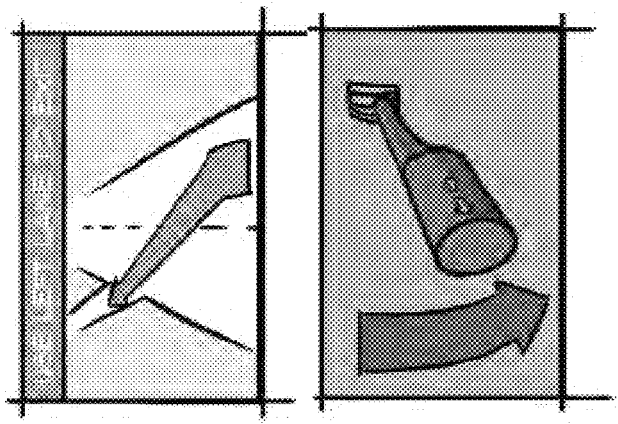
FIG. 8C
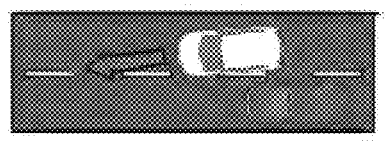
FIG. 8D
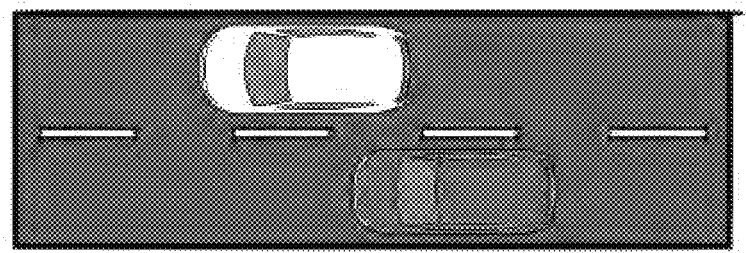
FIG. 8E

Use icon's size, color and/or shape to indicate lane change risk

Use tint on display to convey lane change risk

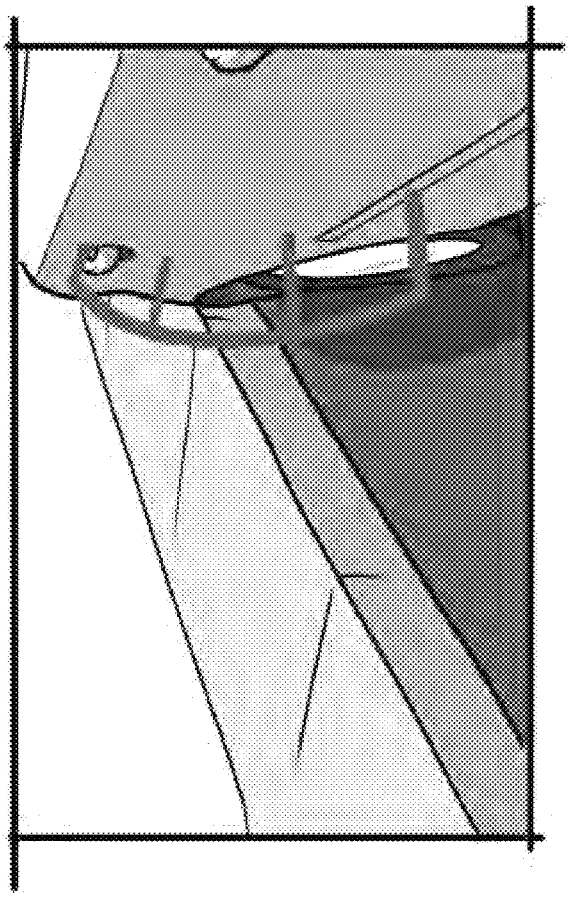
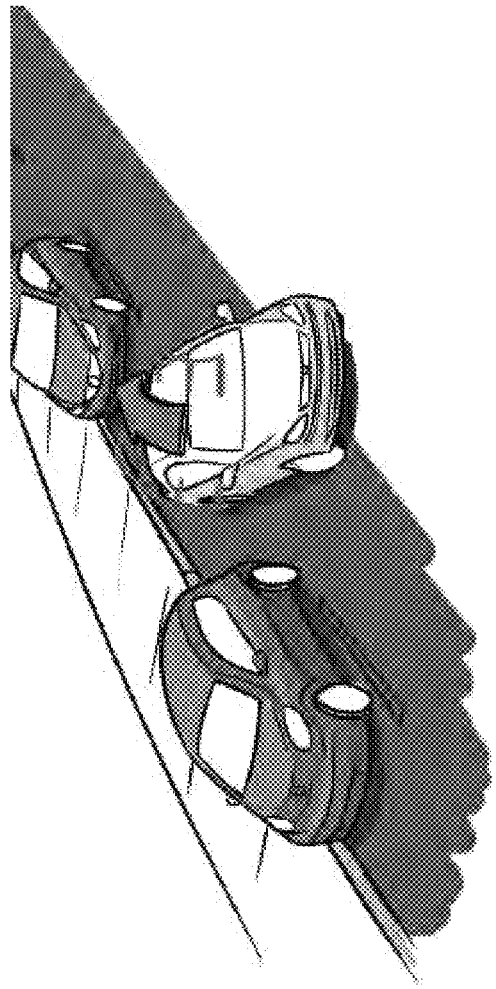
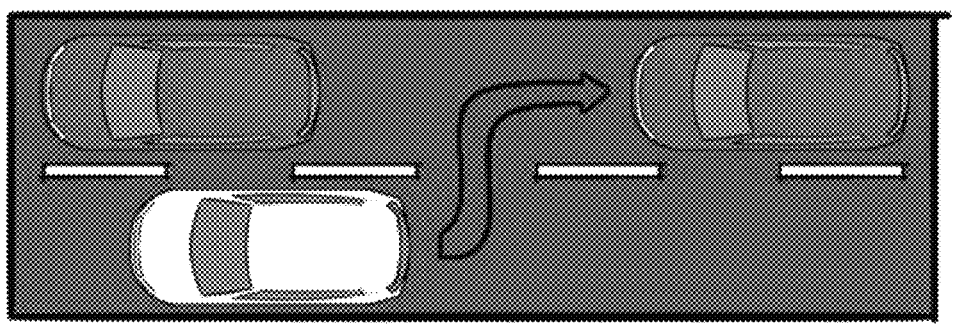
FIG. 21C
FIG. 21B
FIG. 21A

SYSTEM ARCHITECTURE

HARDWARE COMPONENTS

22° FOV (50%)
32° FOV (70%)
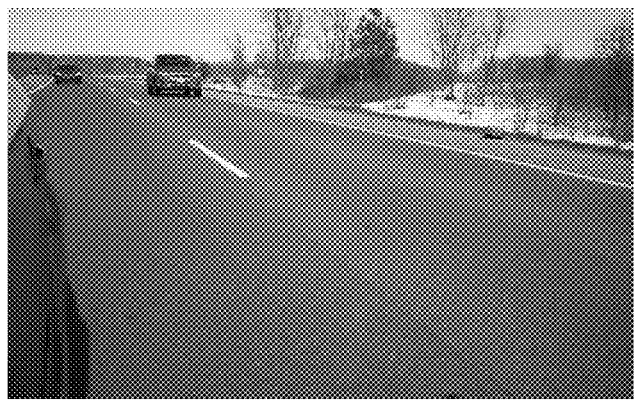
45° FOV (100%)
FIG. 30

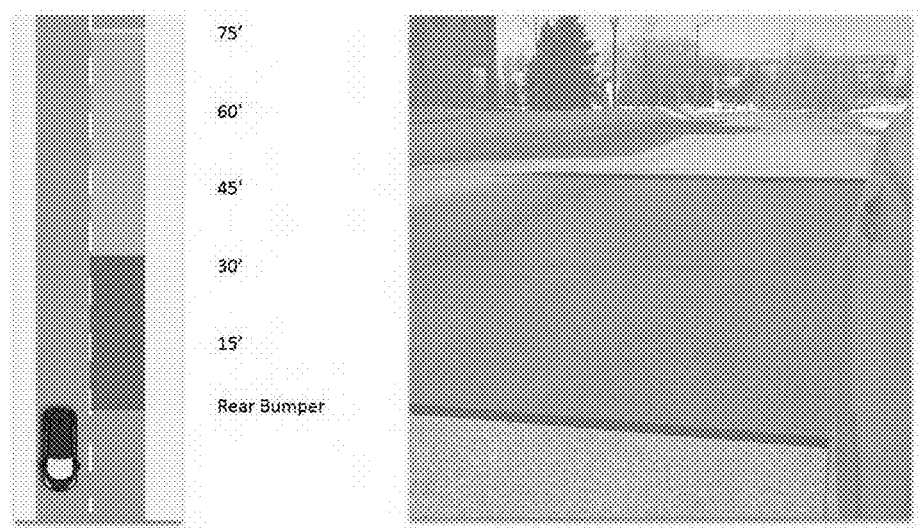
FIG. 31A
Without vehicle masking
With vehicle masking
FIG. 31B       FIG. 31C Folded flush with vehicle body
When parked or not needed

FIG. 69

FIG. 71

VEHICULAR VISION SYSTEM WITH EPISODIC DISPLAY OF VIDEO IMAGES SHOWING APPROACHING OTHER VEHICLE

CROSS REFERENCE TO RELATED APPLICATIONS

The present application is a continuation of U.S. patent application Ser. No. 15/571,876, filed Nov. 6, 2017, which is a 371 national phase filing of PCT Application No. PCT/IB2016/052601, filed May 6, 2016, which claims the filing benefits of U.S. provisional applications, Ser. No. 62/269,350, filed Dec. 18, 2015; Ser. No. 62/222,269, filed Sep. 23, 2015, and Ser. No. 62/157,605, filed May 6, 2015, which are hereby incorporated herein by reference in their entireties.

FIELD OF THE INVENTION

The present invention relates to exterior rearview mirror systems and, more particularly, to an exterior rearview mirror system having a blind spot/object detection and display system at the exterior rearview mirror assembly and door of the vehicle.

BACKGROUND OF THE INVENTION

It is known to provide an object in a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such an object in a blind spot detection/LCA system often includes a visual indicator that visually indicates the detection of another vehicle or object to the driver of the host vehicle. It is known to provide a video display at the exterior rearview mirror assembly, such as described in U.S. Pat. No. 7,777,611, which is hereby incorporated herein by reference in its entirety, or to provide a video display at an interior rearview mirror assembly to display sideward and/or rearward images, such as described in U.S. Pat. No. 5,670,935, which is hereby incorporated herein by reference in its entirety.

A variety of interior and exterior mirror assemblies with indicators are known in the art, such as U.S. Pat. Nos. 5,668,663; 5,355,284; 5,788,357; 6,257,746; 6,005,724; 5,481,409; 6,111,683; 6,045,243; 6,264,353; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,436,741; 5,587,699; 5,938,320; 6,700,692 and 5,786,772, which are all hereby incorporated herein by reference in their entireties.

SUMMARY OF THE INVENTION

The present invention provides a vision system for displaying video images of a side region or blind spot region at the side of the vehicle for viewing by the driver of the vehicle. Optionally, a video display screen may be disposed in the vehicle cabin and generally at or mounted at an inside portion of the vehicle door. Optionally, a video display screen may be disposed at a wide angle spotter mirror location (such as at an upper outboard corner region) of the reflective element of the exterior rearview mirror assembly mounted at the exterior side of the vehicle. The video display screen displays video images captured by the exterior viewing camera and provides a graphic overlay at the displayed images, with the graphic overlay extending perspectively along the side region of the vehicle with indications (such as short laterally extending portions or segments or different shadings or colors or the like) to show distance of objects or vehicles from the vehicle (such as both laterally from the vehicle and rearwardly of the vehicle). The displayed graphic overlay thus provides enhanced cognitive awareness for the driver in understanding the distance of the vehicles present in the camera's field of view.

According to an aspect of the present invention, a vision system for a vehicle comprises an exterior structure mounted at an exterior portion of a body side of a vehicle equipped with the vision system. An imaging sensor is disposed at the exterior structure and has a field of view exterior of the equipped vehicle. The field of view of the imaging sensor extends at least sideward and rearward of the equipped vehicle and encompasses a portion of a side lane adjacent to the lane in which the equipped vehicle is traveling and encompasses at least a portion of the body side of the equipped vehicle at which the exterior structure is mounted. The imaging sensor captures image data within its field of view. A video display screen is disposed in an interior cabin of the equipped vehicle and viewable by a driver of the equipped vehicle, with the video display screen operable to display video images derived at least in part from image data captured by the imaging sensor. The video display screen is operable to display a graphic overlay at the displayed video images to alert the driver of relative locations of other vehicles in the field of view of the image sensor. The graphic overlay comprises a semitransparent perspectively-rendered overlay having a longitudinally extending line segment that extends along a displayed body side portion of the equipped vehicle and a plurality of laterally extending line segments that extend laterally outwardly from the longitudinally extending line segment at spaced apart intervals along the longitudinally extending line segment.

Optionally, the laterally extending line segments of the graphic overlay extend laterally so as to at least substantially overlay a video-displayed side lane region adjacent to the equipped vehicle. The laterally extending segments may be different color from one another and are color-coded to indicate degree of potential hazard.

Optionally, spacing between the laterally extending line segments may be varied responsive at least in part to a speed of the equipped vehicle. The graphic overlay may include an alert icon that changes responsive to the lane change risk due to a determination of the presence of another vehicle in the field of view of the imaging sensor. The graphic overlay may include a distance indicator that enhances the viewer's ability to determine a distance to another vehicle displayed by the video display screen. The graphic overlay may include an alert bar that indicates a degree of the lane change risk due to a determination of the presence of another vehicle in the field of view of the imaging sensor. The display screen may change a tint of the display screen responsive to the lane change risk due to a determination of the presence of another vehicle in the field of view of the imaging sensor. The display screen may expand the field of view shown at the display screen responsive to a determined presence of another vehicle in the field of view of the imaging sensor, and the display screen may optionally display a frame showing the initial field of view shown at the display screen.

Optionally, the exterior structure may comprise an exterior rearview mirror assembly mounted at an exterior portion of a door of the equipped vehicle. The imaging sensor may be disposed at a portion of the exterior structure of the equipped vehicle, with the portion of the exterior structure adjustably disposed at a housing of the exterior structure. The portion of the exterior structure may be movable relative to the housing between a retracted state, where the imaging sensor is disposed in the housing, and an extended state, where the imaging sensor is disposed outside of the housing, with the imaging sensor, when the portion is in the extended state, has its field of view exterior the vehicle. Optionally, the portion of the exterior structure pivots between the retracted state and the extended state. Optionally, when the portion is in its retracted state, the imaging sensor has a generally downward field of view through a wide angle lens disposed at a lower portion of the structure, with an angled mirror disposed in the structure along an optical path between the imaging sensor and the wide angle lens. When the imaging sensor has the generally downward field of view, the imaging sensor captures image data as part of a surround view vision system of the vehicle.

Optionally, the system includes an object detection system operable to detect presence of other vehicles in the field of view of the image sensor, with the object detection system controlling, at least in part, display of the graphic overlay. The object detection system may detect presence of and distance to other vehicles in the field of view of the image sensor, and the object detection system may determine closing velocity between the equipped vehicle and detected other vehicles, wherein, responsive to no detected vehicle having a positive closing velocity, the graphic overlay is not displayed.

Optionally, the video display screen may be operable to episodically display the graphic overlay at the displayed video images. For example, the graphic overlay may be displayed responsive to one of (i) a determination of the presence of another vehicle in the side lane adjacent to the equipped vehicle and approaching the equipped vehicle from the rear and (ii) a communication from another vehicle present in the side lane adjacent to the equipped vehicle. The graphic overlay is then not displayed when at least one of (i) there is no determination of the presence of another vehicle in the side lane adjacent to the equipped vehicle and approaching the equipped vehicle from the rear and (ii) there is no communication received from another vehicle present in the side lane adjacent to the equipped vehicle.

These and other objects, advantages, purposes and features of the present invention will become apparent upon review of the following specification in conjunction with the drawings.

BRIEF DESCRIPTION OF THE DRAWINGS

FIGS. 8A-E are views showing use of a GPS determined location, a turn signal indicator and/or a lane change detection to control the display system to display an additional field of view at the display when the subject vehicle is making a lane change when there is another vehicle in the side lane adjacent to subject vehicle;

FIGS. 21A-C are views showing a parking assist function of the present invention;

FIG. 30 shows images captured by a camera with different fields of view;

FIGS. 31A-C show exemplary overlays and masking of displayed images in accordance with the present invention;

FIGS. 68-71 are photographs showing a vehicle with a conventional mirror assembly compared to a vehicle with the mirror and camera and monitor system of the present invention;

DESCRIPTION OF THE PREFERRED EMBODIMENTS

Figure 1:
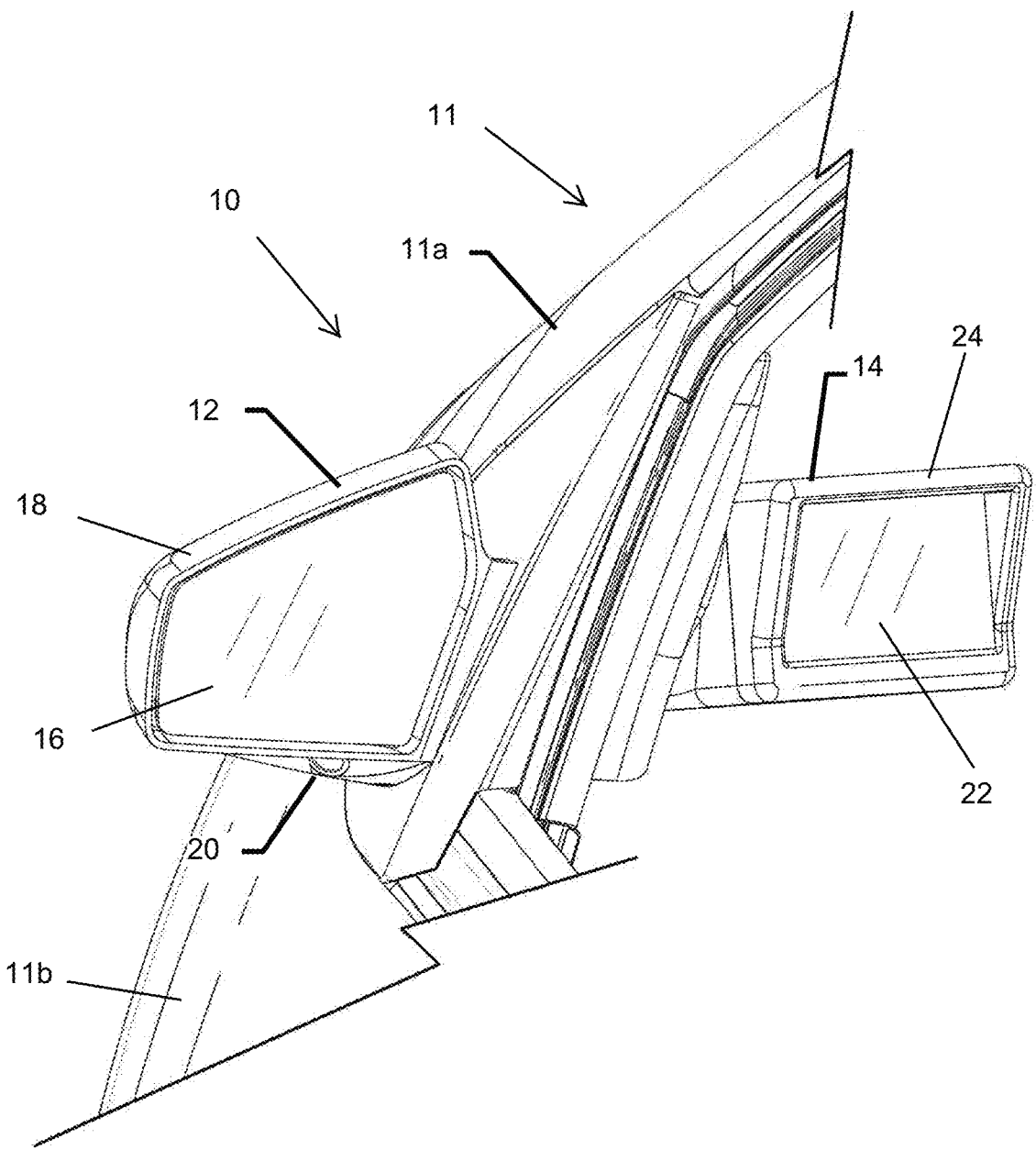
FIG. 1 is a perspective view of an exterior mirror assembly with a camera and an interior door-mounted video display in accordance with the present invention.

Referring now to the drawings and the illustrative embodiments depicted therein, an exterior rearview mirror system 10 for a vehicle 11 includes an exterior rearview mirror assembly 12 and an in-cabin display device or module 14 disposed at or mounted at the interior of the vehicle door 11a or otherwise near to the exterior rearview mirror assembly 12 (FIG. 1). The exterior rearview mirror assembly 12 is mounted at the side 11b of the host or subject or equipped vehicle 11 and includes a mirror reflective element 16 and a mirror shell or casing 18, and a camera or imaging sensor 20 that is disposed at the mirror casing 18 and has a generally rearwardly and sidewardly field of view at the side of the equipped vehicle.

In the illustrated embodiment, exterior rearview mirror assembly 12 may comprise a small or reduced size reflective element 16 that meets, but does not exceed or substantially exceed, the minimum size requirements (for example, the reflective element may have a field of view of at least about 20 degrees from the side of the vehicle). The camera 20 may be disposed at any suitable location at mirror assembly 12, such as at an output portion of the mirror casing 18, such as shown in FIG. 1. The display device or module may utilize aspects of the modules described in U.S. patent application Ser. No. 14/354,674, filed Apr. 28, 2014, which is a 371 national phase filing of PCT Application No. PCT/US2012/062905, filed Nov. 1, 2012, which claims the filing benefits of U.S. provisional application, Ser. No. 61/554,015, filed Nov. 1, 2011, which are all hereby incorporated herein by reference in their entireties.

The small or reduced size mirror reflective element provides a reduced size rearward field of view to the driver of the vehicle (as compared to larger size mirror reflective elements), and the smaller field of view may be supplemented or enhanced via the video display device 14 disposed at the interior of the vehicle cabin and in an area at or near the exterior rearview mirror assembly. For example, and as shown in FIG. 1, display device 14 may be disposed at an inboard portion of the vehicle door 11a and may be disposed immediately opposite exterior rearview mirror assembly 12. Optionally, the exterior rearview mirror assembly 12 and display device 14 may be incorporated into an imaging module that is mountable to or incorporated in a vehicle door, such that all of the wiring and communication links between the camera and display are provided within the module. The module may be mounted at or installed in the door assembly and may be electrically connected to a vehicle wiring harness via an electrical connector at the door, so that power and/or control of the module and/or system is provided via the vehicle wiring harness. The video display screen and module and system may utilize aspects of the systems described in U.S. Publication No. US-2014-0285666, which is hereby incorporated herein by reference in its entirety.

In the illustrated embodiment, the display device 14 includes a video display screen 22 supported at or housed by a housing or casing or structure 24 so that the display screen is at a location near the door that is readily viewable by a driver of the vehicle and is an area that the driver of the vehicle readily cognitively associates with where to look to see what is to the side and rear of the vehicle (because of the proximity of the display screen to the exterior rearview mirror assembly). When the mirror and display device are mounted at the vehicle door, the display screen and the exterior mirror move with the vehicle door when the vehicle door is opened and closed. Video display screen 22 may comprise any suitable video display screen, such as discussed below, and may comprise a touch screen to allow for user control of the video display and/or other vehicle functions via touching of appropriate locations at the display screen by the driver of the vehicle. For example, the video display screen may comprise directional arrow inputs to allow the user or driver to zoom in or out or to pan the video display up or down or to either side to set the rearward field of view at the display screen to a preferred setting for that individual. The system may include a memory system that also allows the user to set the rearward field of view to a desired setting and to store that setting such as in a similar manner as is done for memory mirror settings and/or memory seat settings and the like.

Camera and monitor systems have been proposed as replacements for conventional rear-view mirrors. The advantages include reduced wind drag, reduced vehicle weight, and improved field of view. Despite these advantages, there are a number of reasons such systems are not yet in widespread use in vehicles. For example, reduced depth perception is a concern. Because a typical camera only provides monocular view, the ability to judge depth due to parallax is lost. Additionally, as a trade-off to gaining additional field of view on a given display size, the image may become distorted to the point where judgment of distance using relative object size is also hindered. Also, the video display provides a fixed field of view (i.e., the driver is unable to expand the field of view by moving the head to a different position, as one can with a mirror). The present invention provides the following concepts to help the driver visualize where other vehicles are relative to his or her own vehicle.

Figure 2:
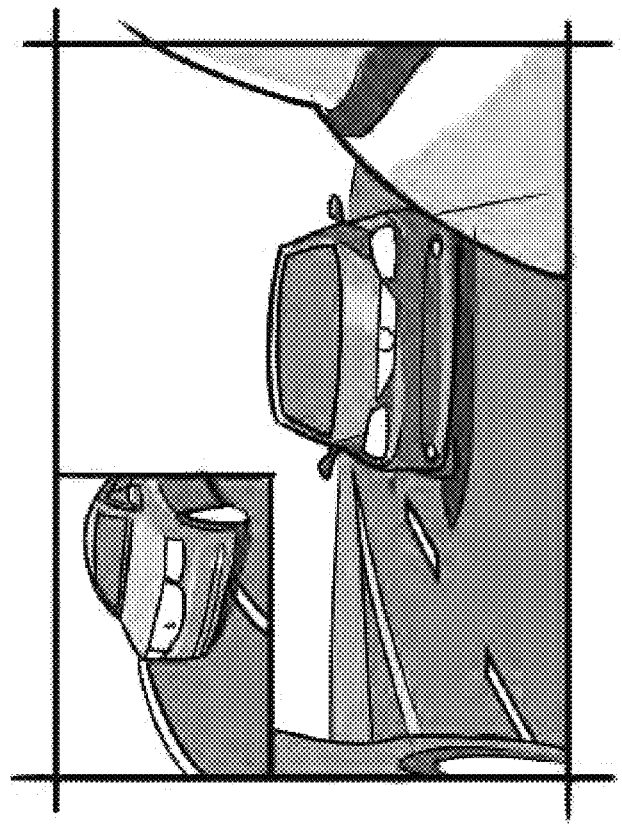
FIG. 2 is a view of a display screen of the present invention, showing a static spotter mirror display.
Figure 3:
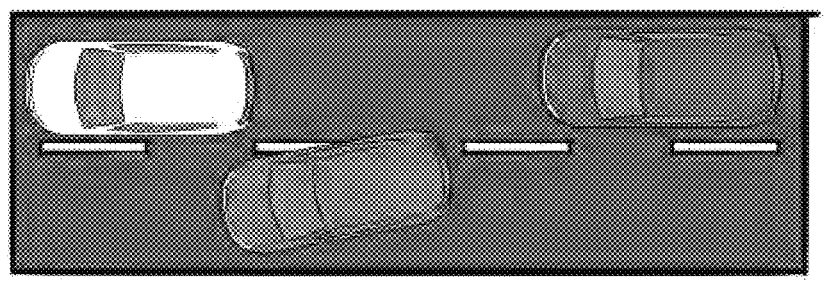
FIG. 3 is a plan view showing the driving condition of the vehicle that results in the displayed image of FIG. 2.

For example, and with reference to FIGS. 2 and 3, a static spotter concept may present information from the camera in a way that the driver may be used to, with a main view to the rear of the vehicle and an additional blind-zone view. The main view shows the area largely behind the vehicle with minimal distortion due to magnification. In addition to the main view, a smaller view in the upper outboard corner shows an area typically covered by a 'spotter' or blind-zone mirror. All information being displayed can potentially be provided by one camera with sufficient field of view and resolution to cover all areas being displayed, that information being cropped and scaled accordingly to be shown on the display.

Figure 4:
FIG. 4 is a view of the display screen, showing an outline or box to highlight a vehicle in the blind spot region.

Optionally, the static spotter function may include a red highlight marker or box (FIG. 4) that indicates when a car is in the blind spot. There is significant overlap between the blind zone view and the main view, for the purposes of helping the driver see the relative position of the vehicle in the blind zone.

Figure 5:
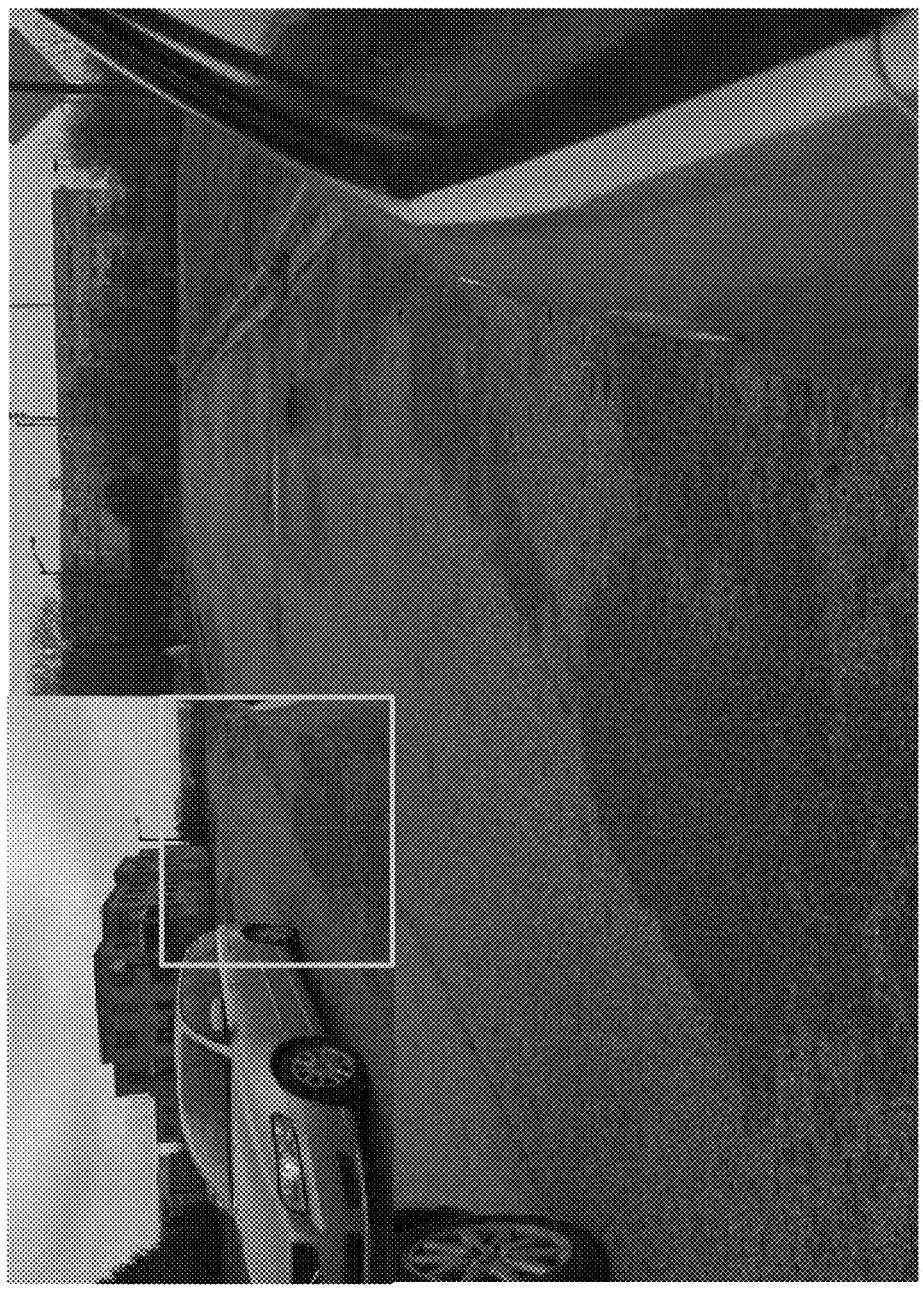
FIG. 5 is another view of the display screen of FIG. 4, showing an outline or box to indicate when an object is not in the blind spot region.

Optionally, and such as shown in FIG. 5, the display screen may highlight the area in the blind zone view that overlaps the main view. This would also be for the purpose of helping the driver see the relationship between the blind zone and main views.

Figure 6A:
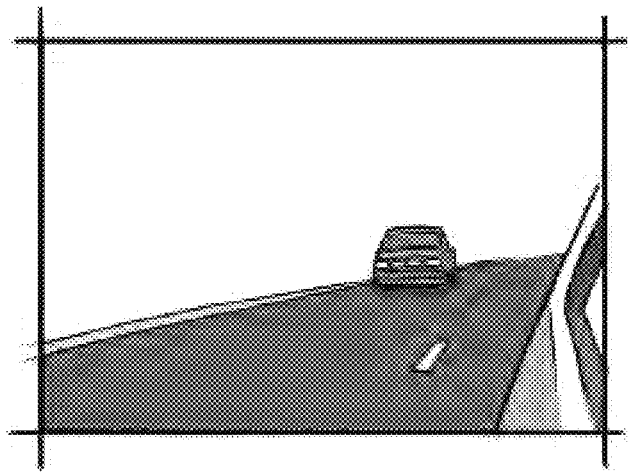
FIGS. 6A-C are views of the display screen of the present invention, showing an expanding spotter mirror display that expands in size when a vehicle moves into the blind spot region.
Figure 6B:
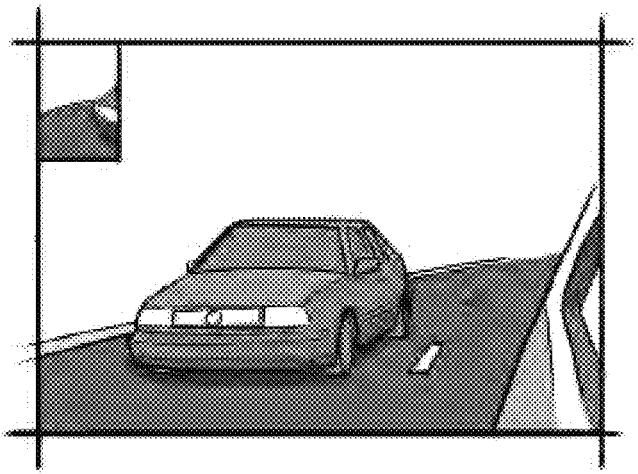
Figure 6C:
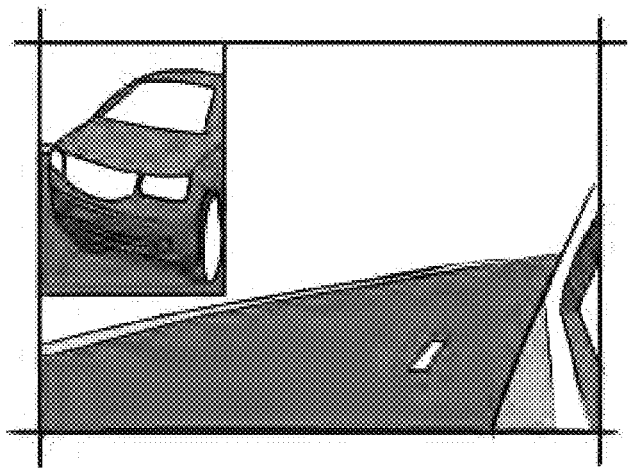

As shown in FIGS. 6A-C, the spotter view may be a dynamic spotter and may be hidden so that the main view can fill the entire display area, such as when no other vehicle is determined to be present in the blind spot region. When another vehicle enters the blind zone, the spotter view would re-appear to reveal the car in the blind zone, and may enlarge as the vehicle moves further into the blind spot region. Thus, the spotter view expands from the corner of the display screen only when needed.

Figure 7:
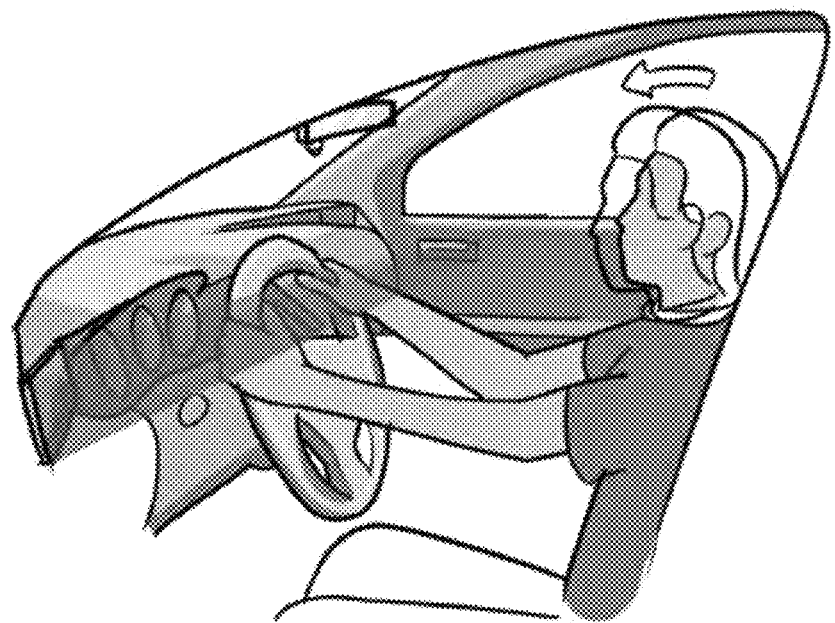
FIG. 7 is a view of a driver of a vehicle equipped with the display system of the present invention, showing a dynamic head-tracking function of the display, whereby head-tracking is used as an input for the driver to expand the field of view that is displayed at the display screen.
Figure 7A:
FIGS. 7A-B are views of the display screen, showing the change in the field of view of the displayed images.
Figure 7B:

During normal driving, it is desirable not to show too wide of a field of view in the main view, due to the distortion of the image involved with such magnification. As mentioned previously, this distortion could lead to difficulty in judging the distance to nearby vehicles. However, it is also desirable for the driver to be able to temporarily expand the field of view when needed. Dynamic head tracking (FIG. 7) would allow the system to detect when the driver is moving his or her head forward, which would automatically expand the main view field of view to provide wider coverage—similar to how one gains additional field of view with a mirror by moving one's head. Such head tracking may utilize aspects of the systems described in U.S. Pat. Nos. 9,280,202 and/or 7,914,187, and/or U.S. Publication Nos. US-2015-0296135; US-2015-0294169 and/or US-2015-0232030, which are hereby incorporated herein by reference in their entireties. FIGS. 7A and 7B show how the displayed images may be expanded or adjusted responsive to the head tracking system or function.

Sometimes extra information and/or warnings about objects in the blind zone are only needed if the driver intends to change lanes. As shown in FIGS. 8A-E, a blind zone display or alert (FIG. 8A) may be triggered to display an additional field of view in response to either turn-by-turn prompts from a GPS navigation system (FIG. 8B), by actuation of the turn signal (FIG. 8C), or by a lane departure detection system (FIG. 8D). If activated in this manner, warnings about a vehicle in the blind zone may be presented in a way that is more easily noticed (such as shown in FIG. 8A).

Figure 9A:
FIGS. 9A-C are views of the display screen, showing a change in size, color, shape and location of an alert icon responsive to the lane change risk of the subject vehicle.
Figure 9B:
Figure 9C:
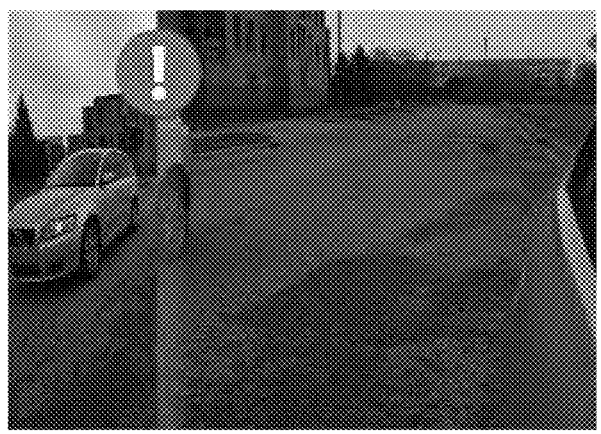

Optionally, and with reference to FIGS. 9A-C, an icon could be shown on the main view display at the display screen that would indicate the presence of a vehicle in the adjacent lane. As the vehicle approaches more closely (FIGS. 9B and 9C), the icon's size, color or shape may be changed to indicate the relative risk of changing lanes. An additional blind zone view may also appear in the blind zone region of the display (FIG. 9C).

Figure 10A:
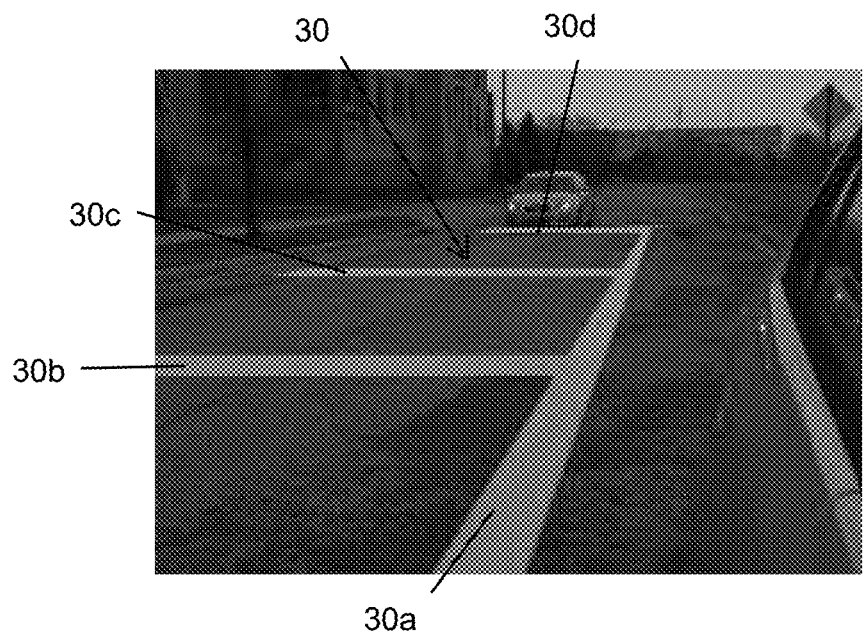
FIGS. 10A-C are views of the display screen, showing an overlay indicating distance where the overlay does not change in response to the determined vehicle.
Figure 10B:
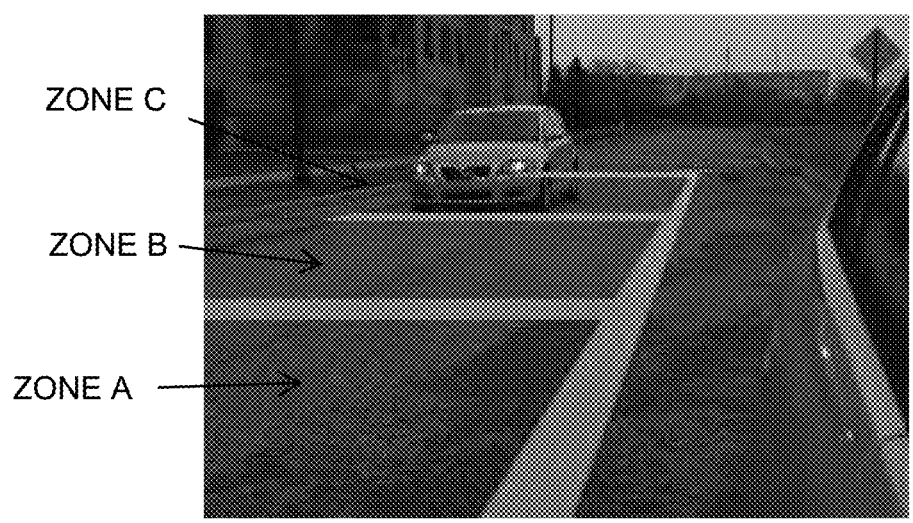
Figure 10C:

Optionally, the display system may provide a fixed overlay (FIGS. 10A-C) to the display to indicate the relative distance, similar to those used for backup cameras. The fixed overlay is overlaid at the displayed images regardless of whether or not a vehicle is present in the camera's field of view.

Figure 11A:
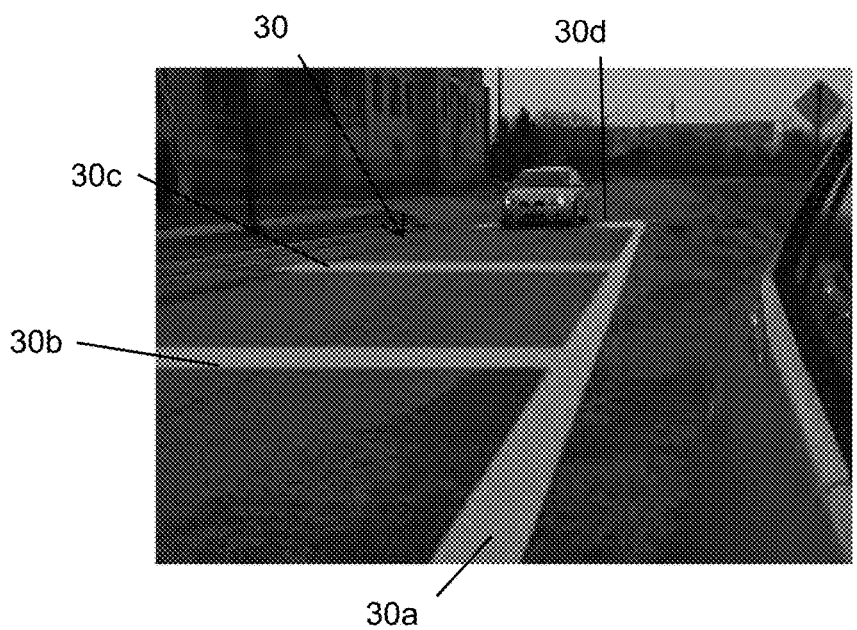
FIGS. 11A-C are views of the display screen, showing an overlay indicating distance where the overlay does change in response to the determined vehicle being present at the overlaid region.

Optionally, with a system that incorporates vehicle detection, the overlay (FIGS. 11A-C) can be hidden in areas where the vehicle is present to minimize the confusion associated with having the overlay appear in front of the vehicle being observed. This enhances the illusion that the overlay is on the ground and provides better assistance for judging the distance to the vehicle detected at the side or blind spot region by the equipped vehicle. The overlay may be initially generated when a vehicle is detected sideward and/or rearward of the equipped vehicle and parts of the overlay at areas where the vehicle is present are not shown. The overlay may not be generated or overlaid in situations where no vehicle is detected near the blind spot region or rearward and sideward of the equipped vehicle.

Optionally, in addition to the fixed overlay distance indicators (such as discussed above with respect to FIGS. 10A-C), the overlay (such as shown in FIGS. 12-16B) can be semitransparent and fade or get more transparent toward the outboard side (away from the side of the equipped vehicle at which the camera is disposed). The overlay can be made up of one or more colors to indicate different distances and safe or unsafe zones in the adjacent lane. For example, the overlay could start as yellow for a distance zone behind the vehicle and then transition to red for a closer distance zone behind and sideward of the vehicle. The red zone could indicate a danger to the driver if thinking about a lane change and the yellow or orange zone could indicate a caution to the driver in which the driver would have to make a judgment on how fast the adjacent lane vehicle is moving into the blind zone. The semitransparent overlay helps to minimize confusion similar to the overlay with vehicle detection discussed above with respect to FIGS. 11A-C. During nighttime driving, the overlay transparency may be increased such that the colors of the overlay do not become over powering or too bright to the driver viewing the displayed images and overlays.

The graphic overlay comprises an electronically-generated Perspective Overtaking Zone Overlay or safety overlay, which (as seen by a driver viewing at an in-cabin video screen real-time video images captured by the side-mounted video camera) overlays/superimposes upon displayed video images. The electronically-generated Perspective Overtaking Zone Overlay or safety overlay extends perspectively outboard of the side of the equipped vehicle and along the equipped vehicle to beyond and rearward of the rear of the equipped vehicle and extends laterally outward from the equipped vehicle. For example, the graphic overlay 30 (FIGS. 10A-C and 11A-C) may include a longitudinally extending portion or element or segment 30a that extends along and rearward of the side of the body of vehicle (which body-side is preferably shown or displayed or imaged in the displayed video images) and a plurality of laterally extending portions or elements or segments 30b, 30c, 30d that extend laterally outward from the longitudinal portion 30a.

As further discussed below, longitudinal portion 30a is spaced on the video screen at a distance representative of about 3 feet from the body-side of the equipped vehicle, and the overall plane of the Perspective Overtaking Zone Overlay or safety overlay is meant to convey to the driver viewing the displayed rear-time video image where the immediately adjacent traffic side-lane is positioned relative to the traffic lane along which the equipped vehicle is travelling. The first lateral segment 30b may be generally at the side or at the rear of the displayed equipped vehicle, while the next lateral segment 30c is further rearward of the displayed equipped vehicle and the next lateral segment 30d is even further rearward of the displayed equipped vehicle. The laterally extending segments may be color coded (such as, for example, with segment 30b being red, segment 30c being orange or yellow and segment 30d being green), and the longitudinally extending segment or segments may also or otherwise be color coded.

Figure 11B:
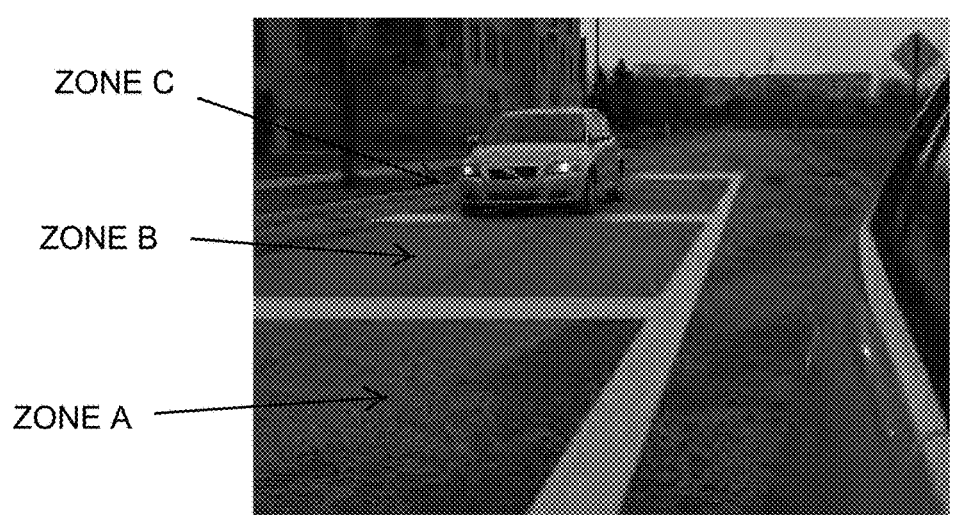
Figure 11C:
Figure 12:
FIG. 12 is a perspective view of another display screen and camera system in accordance with the present invention, showing overlays on the displayed image.
Figure 13:
FIGS. 13 and 14 are perspective views of the display screen and camera system of FIG. 12.
Figure 14:
Figure 15:
FIG. 15 is a perspective view of the display screen and camera system of the present invention, showing the overlays at a display screen at the passenger side of the vehicle.

Also, the space designated as Zone A as shown in FIG. 11B can be tinted or colored or rendered red (but semi-transparently so as not to overly obscure the video image portion that Zone A overlays) so that at a glance, the driver can gauge that any vehicle or object being overlayed by Zone A is a real and present hazard to the equipped vehicle attempting a lane change to that side lane. The space designated as Zone B as shown in FIG. 11B can be tinted or colored or rendered yellow or orange (but semi-transparently so as not to overly obscure the video image portion that Zone B overlays) so that at a glance, the driver can gauge that any vehicle or object being overlayed by Zone B may be a real and present hazard to the equipped vehicle attempting a lane change to that side lane, and thus the driver should be wary of such a vehicle entering or in the orange zone. The space designated as Zone C as shown in FIG. 11B can be tinted or colored or rendered green (but semi-transparently so as not to overly obscure the video image portion that Zone C overlays) so that at a glance, the driver can gauge that any vehicle or object being overlayed by Zone C likely is not as yet a hazard to the equipped vehicle attempting a lane change to that side lane, and thus the driver can be cognizant of such a vehicle entering or in the green zone.

Figure 16A:
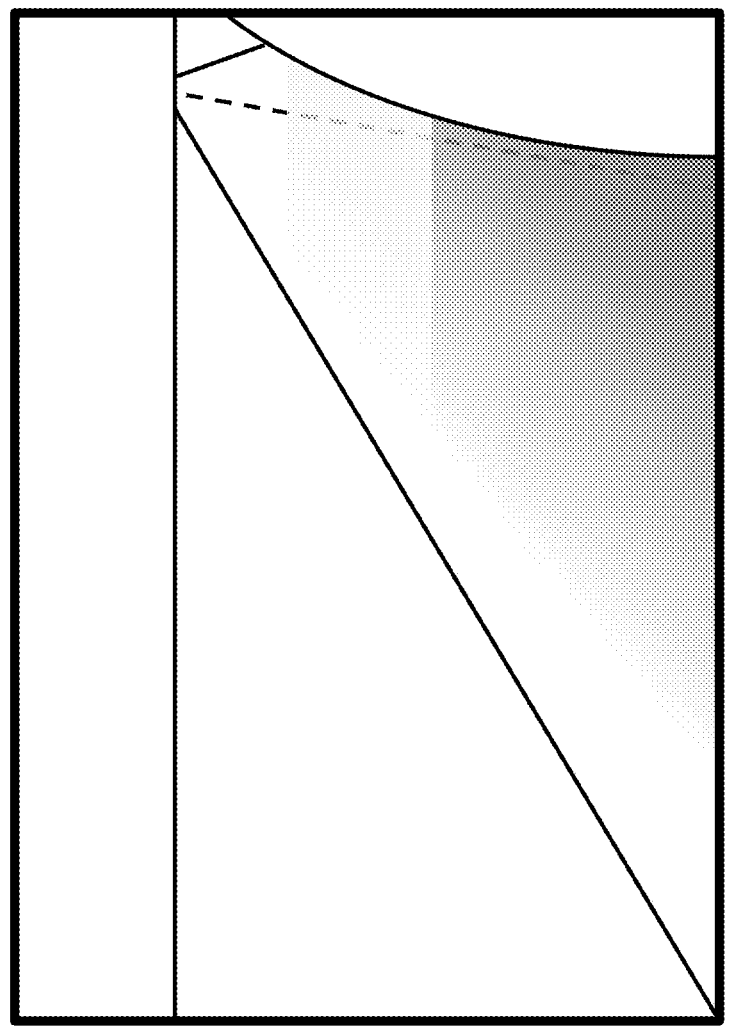
FIGS. 16A and 16B are schematics showing a displayed image with overlays that become more transparent outboard and away from the side of the equipped vehicle in accordance with the present invention.
Figure 16B:
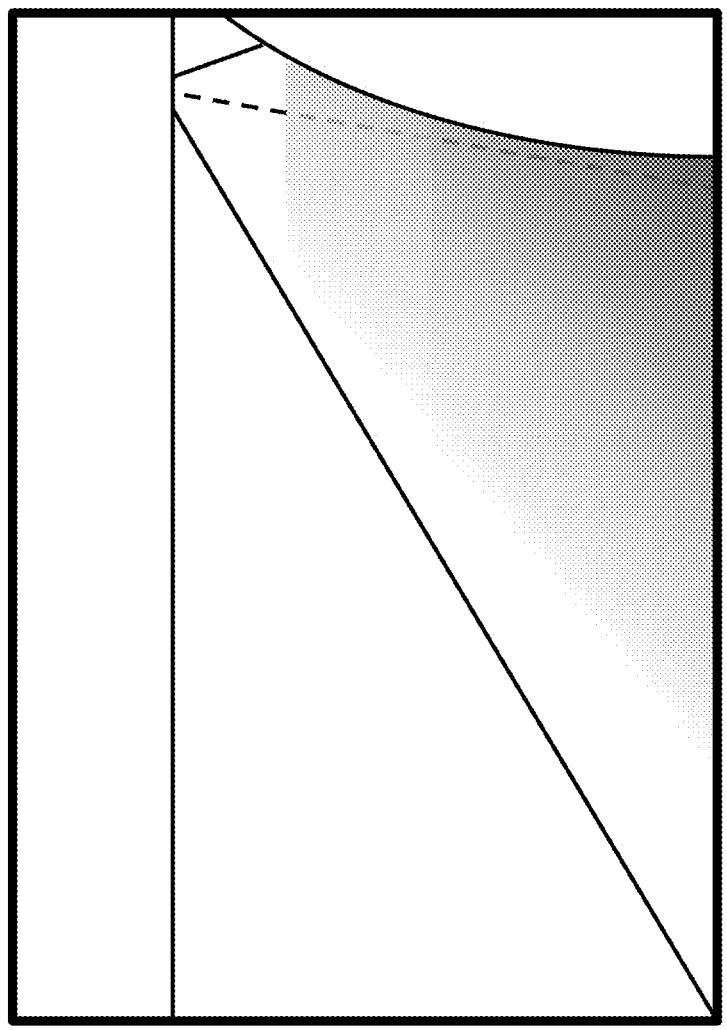

Optionally, the overlay may take other forms that provide the perspective and dimensional (and optionally color coded) overlay information that is readily understood by the driver viewing the displayed video images and overlay at the display screen in the vehicle. For example, as shown in FIGS. 16A and 16B, the overlay may comprise a plurality of semitransparent portions that are different colors or different degrees of transparency or the like, with the portions overlaying a substantial portion of the region they encompass at the side of the vehicle. The electronically-generated Perspective Overtaking Zone Overlay or safety overlay thus functions like a zoned safety carpet that overtaking vehicles must drive over or a zoned safety "magic carpet" that appears to "float" over the adjacent side-lane that overtaking vehicles must drive through. Thus, the electronically-generated Perspective Overtaking Zone Overlay or safety overlay assists the driver to gauge real-world distances to the side and to the rear of the equipped vehicle by reference to the perspectively-rendered overlay. Optionally, the displayed video images may also be accompanied by a text overlay stating (in order to alert and warn the driver) that "OBJECTS IMAGED ON THE SCREEN MAY BE CLOSER OR FARTHER THAN THEY APPEAR."

The electronically-generated Perspective Overtaking Zone Overlay is perspectively-rendered/configured/constructed to match the perspective seen when viewing the actual video images captured by the actual video camera disposed at the body-side of the equipped vehicle.

The electronically-generated Perspective Overtaking Zone Overlay is semitransparent so that the road/road markings/vehicles/objects present in the portion of the video images to the side of the equipped vehicle as it travels forward (or reverses rearward) remain visible to the driver. The Perspective Overtaking Zone Overlay is perspectively rendered and appears to the driver to be "floating" above the road with the plane of the Perspective Overtaking Zone Overlay preferably appearing to the driver to generally be parallel/horizontal with the road being travelled by the equipped vehicle. The Perspective Overtaking Zone Overlay appears on the display screen to be a distance of about three feet or less from the displayed body side of the equipped vehicle (which is also imaged on the display screen). The closest-to-body side edge of the Perspective Overtaking Zone Overlay conveys to the driver that that edge of the overlay (as seen on the video screen) may be at or near the lane marker of the lane in which the vehicle is traveling. Likewise, the width dimension and length dimension of the Perspective Overtaking Zone Overlay allows the driver to gauge where other vehicles/objects imaged by the side/rear viewing camera are actually positioned on the actual road relative to the equipped vehicle.

The plurality of segments or color-coded zones constituting the Perspective Overtaking Zone Overlay also allow the driver to gauge where other vehicles/objects imaged by the side/rear viewing camera are actually positioned on the actual road relative to the equipped vehicle. For example, and preferably, the Perspective Overtaking Zone Overlay may comprise three zones. A red zone (zone A in FIGS. 10B and 11B) is closest to the equipped vehicle (and typically is representative of a blind zone of an exterior sideview mirror at that side of the equipped vehicle). If the driver sees this semi-transparent red zone to be encompassing/superimposing over another vehicle imaged on the video screen in the sidelane adjacent the equipped vehicle, then the driver of the equipped vehicle knows that if he or she were to make a lane change into that side lane, the equipped vehicle would be in hazard of colliding with that overtaking other vehicle. An orange zone (zone B in FIGS. 10B and 11B) may be next to the red zone and farther rearward. This orange zone conveys to the driver to be cautious of or wary of other vehicles or objects that this semi-transparent orange zone is encompassing/superimposing over. A green zone (zone C in FIGS. 10B and 11B) is next to the orange zone and farther back. This green zone conveys to the driver that other vehicles or objects that this semi-transparent green zone is encompassing/superimposing over are far enough away from the equipped vehicle to allow the driver of the equipped vehicle to safely execute a lane change into the adjacent lane.

The perspective and/or size or rendering of such zones of the Perspective Overtaking Zone Overlay may change dynamically. For example, if the equipped vehicle is equipped with the likes of a radar sensor or is capable of image processing of captured image data (including image data captured by the subject side-mounted camera) for object detection so as to be capable of detecting both presence of and determining rate of rear-approaching other vehicles, then the perspective and/or the size of such zones of the Perspective Overtaking Zone Overlay may change dynamically. For example, the size of the green zone may reduce if the rear approaching vehicle is fast approaching and the sizes of the orange and red zones may increase. The perspective and/or size or rendering of such zones of the Perspective Overtaking Zone Overlay may also change depending on how the equipped vehicle is being driven or whether the equipped vehicle is being driven by day or by night or whether the equipped vehicle is being driven forward, whether stationary or whether being driven in reverse.

Optionally, and desirably, the overlay may vary depending on the speed of the equipped vehicle. For example, at highway speeds, the zones may extend further rearward of the vehicle, while at slower speeds, the zones will not extend as far rearward of the vehicle. For example, the furthest rearward laterally extending line segment (30d in FIGS. 10A and 11A) may be displayed at a location representative of a distance rearward of the equipped vehicle that would be covered in about one second of travel at the speed of the equipped vehicle. Optionally, the overlay may vary depending on an approach rate of another vehicle detected in the side lane adjacent to the equipped vehicle's lane and approaching the equipped vehicle from the rear. For example, the furthest rearward laterally extending line segment (30d in FIGS. 10A and 11A) may be displayed at a location representative of a distance rearward of the equipped vehicle that would be covered by the approaching vehicle in at least about two seconds of travel.

The laterally extending line segments extend laterally a sufficient amount so as to span the side lane adjacent to the equipped vehicle (a lane is typically about 12 feet wide). Thus, if a vehicle is at or in one of the zones defined by the laterally extending line segments, that vehicle is in the adjacent lane, whereas, if a vehicle is detected that is laterally outboard of the laterally extending line segments, that vehicle is likely in a further away lane one lane (or more) removed from the adjacent side lane. The longitudinal line segment is at or near the displayed side of vehicle and may be generally at or near or inside of a lane marker of the lane in which the vehicle is traveling.

The overlay thus helps the driver to judge the longitudinal distance of a vehicle in the adjacent lane behind the equipped vehicle. The zones represent a caution distance (yellow zone or zone A) where one could safely change lanes without hindering the driver of the other vehicle assuming their rate of speed is similar and a 'no go' distance (red zone or zone B) where a lane change is not recommended/and could result in a potential accident. The distances of these zones can be determined based upon zones already defined for technologies such as blind spot detection radar systems. This would allow the overlay to 'align' or be synchronized with the indicator light in the mirror or graphic on the digital display.

The longitudinally extending line segment separates or demarcates the adjacent lane from the lane in which the equipped vehicle is traveling. This line is to be displayed to appear to be less than about 3 feet from the side of the equipped vehicle. The distances of the lines perpendicular to the lane direction or longitudinal line are at distances to represent increased levels of caution/safety for a lane change. First, they help the driver to judge the distance the approaching vehicle is behind the equipped vehicle, and second, they give the driver of the equipped vehicle an increased awareness of how fast the approaching vehicle in the adjacent lane is approaching the equipped vehicle. For example, the line furthest away could be placed on the display to represent around 70 feet rearward of the rear bumper of the equipped vehicle, the next line could represent around 36 feet rearward of the rear bumper of the equipped vehicle, and the line closest could represent about 12 feet rearward of the rear bumper of the equipped vehicle.

Figure 17A:
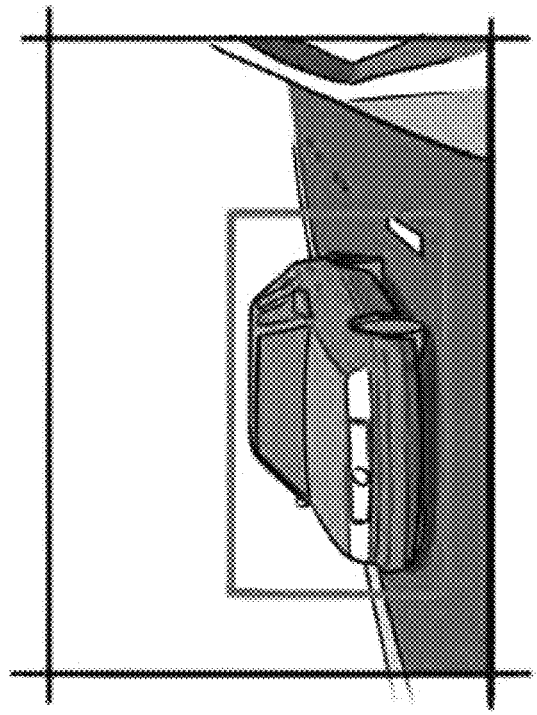
FIGS. 17A-B are views of the display screen, showing highlighting of a determined vehicle responsive to the vehicle being close to the subject vehicle.
Figure 17B:
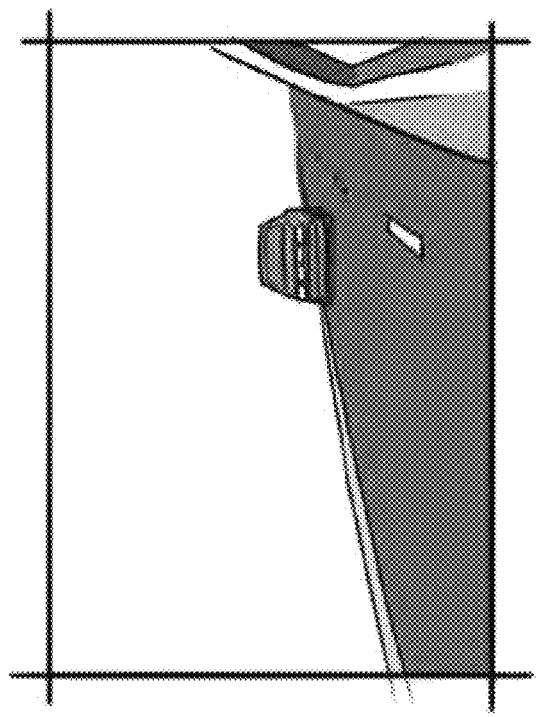

Optionally, when a vehicle is detected by the object detection system, the system can highlight the vehicle on the display to help alert the driver to its presence without requiring the driver to look directly at the display. This helps reduce driver distraction. Thus, for example, when a vehicle is detected at a distance from the equipped vehicle (such as shown in FIG. 17A), the display may not highlight the detected vehicle, but when the vehicle gets closer and approaches or enters the blind spot region, the display highlights the detected vehicle to alert the driver to the presence of the vehicle at or near the blind spot region. In the illustrated embodiment of FIG. 17B, the highlighting is a colored box around the detected vehicle, but other highlighting (such as flashing the image of the vehicle or other alert indication) may be provided depending on the particular application of the display system.

A car or SUV or the like typically is around 16 feet long. Safe driving and avoidance of the likes of tailgating typically dictates that a vehicle drive behind another leading vehicle at a vehicle-to-vehicle spacing such that the time-to-collision with the other vehicle ahead is not less than 2 seconds or thereabouts (and preferably at a much greater spacing distance for safety). The overlay of the present invention may adjust responsive to a determined closing rate between a rear approaching vehicle and the equipped vehicle. When the vehicle closing velocity between the equipped vehicle and the soon-to-potentially-overtake other vehicle in the adjacent side lane is, for example, 5 mph, then the Perspective Overtaking Zone Overlay may be rendered on the display screen to end at what represents at least around 40-50 feet behind the equipped vehicle. When the equipped vehicle closing velocity between the vehicle and the soon-to-potentially-overtake other vehicle in the adjacent side lane is, for example, 30 mph, then the Perspective Overtaking Zone Overlay may be rendered on the display screen to end at what represents at least around 85-95 feet behind the equipped vehicle. In general, if the closing velocity or rate is CV mph, then the Perspective Overtaking Zone Overlay may be rendered on the display screen to end at what represents at least about [CV (in mph) multiplied by 2.93] feet behind the equipped vehicle as displayed on the video screen being viewed by the driver.

Thus, in accordance with this embodiment of the present invention, the equipped vehicle is equipped with a camera and/or radar and/or lidar side-lane monitoring/lane change assist system such as is disclosed in U.S. Pat. Nos. 8,027,029; 7,038,577 and/or 7,720,580, which are hereby incorporated herein by reference in their entireties. For example, a side/rear viewing camera (such as a camera mounted in a driver-side exterior mirror assembly of the equipped vehicle or in a side body panel or in a side-pillar of the equipped vehicle) has a field of view at least sideward and rearward of the equipped vehicle to capture image data of objects such as other vehicles or motorcyclists or bicyclists present in the immediately adjacent driver-side side lane. A control of the equipped vehicle includes an image processor (such as an EYEQ® image processor available from Mobileye N.V. of Jerusalem, Israel). Image data captured by the side/rear-viewing camera of the equipped vehicle is provided to the control and is image processed by the image processor to detect the presence of any rear-approaching other vehicle and to determine distance to the other vehicle (such as by use of optical inflation as disclosed in U.S. Pat. No. 8,861,792, which is hereby incorporated herein by reference in its entirety). The speed being travelled by the equipped vehicle (such as from wheel sensors of the equipped vehicle) is also provided to the control (preferably via connection to a data communication bus of the equipped vehicle such as a CAN bus). Other vehicle data from the equipped vehicle can be provided to the control (such as yaw rate or steering angle or turn signal activation status or gear selection).

Based on such image processing of captured image data, the speed/velocity of the detected potentially-overtaking other vehicle can be determined via algorithmic processing of captured image data. Combined with the vehicle data (including speed of the equipped vehicle) provided, the control determines the closing velocity between that other vehicle and the equipped vehicle. If closing velocity is negative (i.e., if the equipped vehicle is travelling faster than the detected other vehicle), then there is likely no hazard for the equipped vehicle to change lane. In such circumstance, the Perspective Overtaking Zone Overlay need not display. If closing velocity however is positive (i.e., if the equipped vehicle is travelling slower than the detected other vehicle), then there is a potential hazard for the equipped vehicle to change lane. Thus, the Perspective Overtaking Zone Overlay is displayed only when closing velocity is determined to be positive and its length to and beyond the rear of the equipped vehicle increases in proportion to the closing velocity—the higher the closing velocity, the longer the Perspective Overtaking Zone Overlay. Such episodal display of the Perspective Overtaking Zone Overlay (such as tied to closing velocity being negative or positive) helps build driver awareness and use of the Perspective Overtaking Zone Overlay, since the appearance or display of the Perspective Overtaking Zone Overlay is itself a cue or alert to the driver to be cautious/wary of a lane change because a potentially-overtaking vehicle has been detected in the adjacent side-lane (albeit still some distance to the rear of the equipped vehicle) whenever the episodal Perspective Overtaking Zone Overlay displays. In lieu of object detection as discussed above using a camera/image processing, a ranging sensor such as a radar sensor or a lidar sensor can be used.

Figure 18A:
FIGS. 18A-C are views of the display screen, showing tinting of the display and different display options responsive to the lane change risk of the subject vehicle.
Figure 18B:
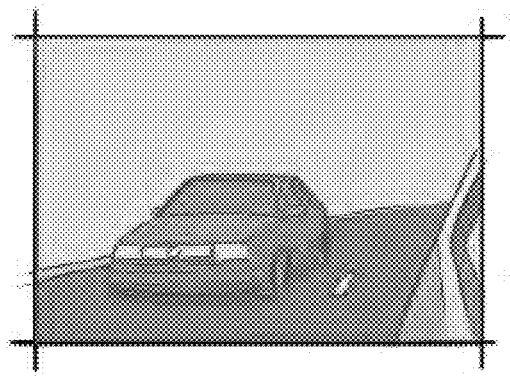
Figure 18C:
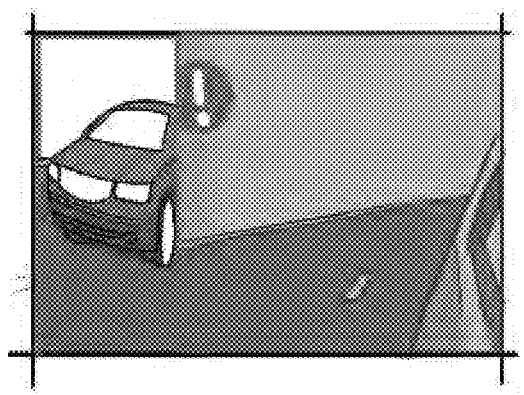

Optionally, the display can be tinted or colored to show the relative risk of the objects in the blind spot. For example, a yellow tint (FIG. 18A) could indicate that a car is some distance back in the adjacent lane, and an orange tint (FIG. 18B) may indicate that the vehicle is getting closer, while a red tint (FIG. 18C) may indicate that a lane change could be dangerous.

As disclosed and discussed herein, the Perspective Overtaking Zone Overlay can display in pop-up or episodal mode whenever an object detection system of the vehicle or a Car2Car or vehicle-to-vehicle (v2v) communication system determines that another vehicle rearward of the equipped vehicle can present a hazard should equipped vehicle attempt a lane change. The Perspective Overtaking Zone Overlay provides a visual surrogate side lane blind zone danger area displayed over (but not unduly obscuring) the video images being displayed on the in-cabin video display screen that is being viewed by a driver contemplating a lane change maneuver of the equipped vehicle. The driver can readily see and discern the video image of another vehicle to the side/rear but because of the nature of camera optics/video display, the driver is challenged to gauge the actual distance to that imaged other vehicle. Using the Perspective Overtaking Zone Overlay, all the driver needs to gauge is whether or not that other vehicle falls within (or is close to fall within) the Perspective Overtaking Zone Overlay as overlaid/superimposed on the displayed video images. And if within, where within Perspective Overtaking Zone Overlay the video image of that other vehicle is seen on the screen to lie (e.g., within a green or orange or red zone as discussed above) further informs the driver as to whether a lane change is safe or not.

By providing a Perspective Overtaking Zone Overlay in episodal/pop-up mode under control of and responsive to a vision-based and/or radar-based and/or lidar-based side/rear object detection system, the very appearance of the Perspective Overtaking Zone Overlay constitutes a cognitive cue or alert to the driver of the equipped vehicle that a contemplated lane change may be a hazard. The episodal appearance and disappearance of the subject graphic overlay may be responsive to other than an object detection system of the equipped vehicle. For example, a car2car or vehicle-to-vehicle (v2v) communication system can have the equipped vehicle in wireless communication with the potentially-overtaking other vehicle to the rear. Based on such v2v telematics communication, the existence or not of a hazardous condition can be determined. If non-hazardous, the subject graphic overlay need not display. Optionally, the appearance and disappearance of the subject graphic overlay may be responsive to actuation and deactuation of a turn signal indicator by the driver of the equipped vehicle. Optionally, the appearance and disappearance of the subject graphic overlay may be responsive to a lane departure warning (LDW) system or lane keep assist system or the like (where the graphic overlay may be displayed responsive to a determination of a lane departure of the equipped vehicle or an approach of the equipped vehicle toward a lane boundary or lane marker and thus towards the side lane adjacent to the lane in which the equipped vehicle is traveling).

The system thus may communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953 and/or US-2016-0036917, which are hereby incorporated herein by reference in their entireties.

Figure 19A:
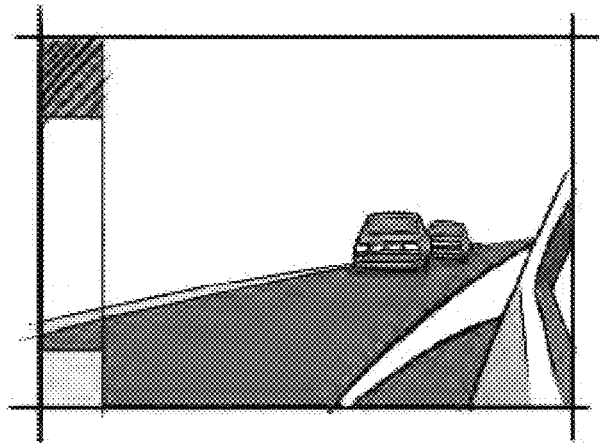
FIGS. 19A-C are views of the display screen, showing a growing bar scale that indicates distance to another vehicle determined to be at or near the side lane adjacent to the subject vehicle.
Figure 19B:
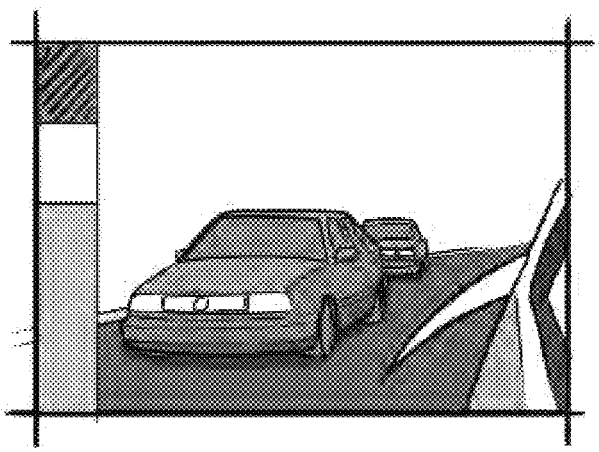
Figure 19C:
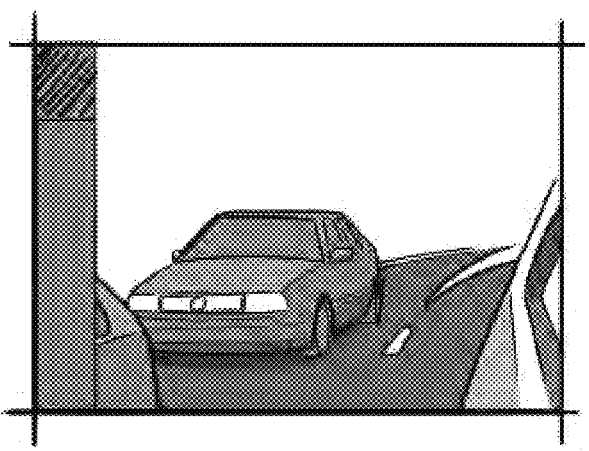

Optionally, the display may incorporate a bar graph beside the main view showing a depiction of the adjacent lane with a box or plan view of the vehicle in the top corner. As a vehicle approaches in the adjacent lane, a colored bar would appear (FIG. 19A) that indicates the relative distance of the nearest vehicle, and would grow in size as the vehicle approaches (FIGS. 19B and 19C). This provides an intuitive means for the driver to judge the distance relative to the size of his or her own vehicle.

Figure 20A:
FIGS. 20A-C are views of the display screen showing a distance indicating overlay and a distance indicating bar scale to indicate distance to other vehicles.
Figure 20B:
Figure 20C:
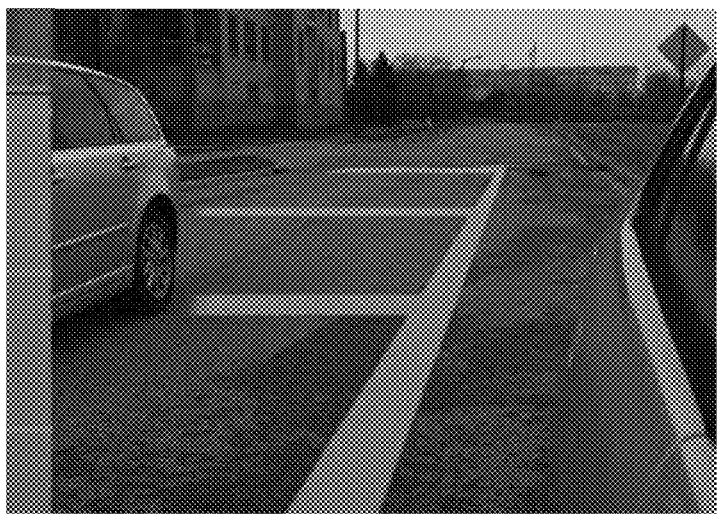

The smart overlay and the distance bar concepts may be combined with the grid lines of the overlay shown on the distance bar (see FIGS. 20A-C). This would provide the added benefit to the driver of being able determine which vehicle they see in the main view corresponds to the distance shown on the Distance Bar. This would also provide a means for the driver to calibrate their own judgment of distance as they use the system.

When parking the vehicle (FIG. 21A), the displayed view can shift down to the curb, and the distance to the curb can be detected. An indicator (FIGS. 21B and 21C) at the display can show whether or not the rear tire will clear the curb at the given steering wheel position.

Figure 22:
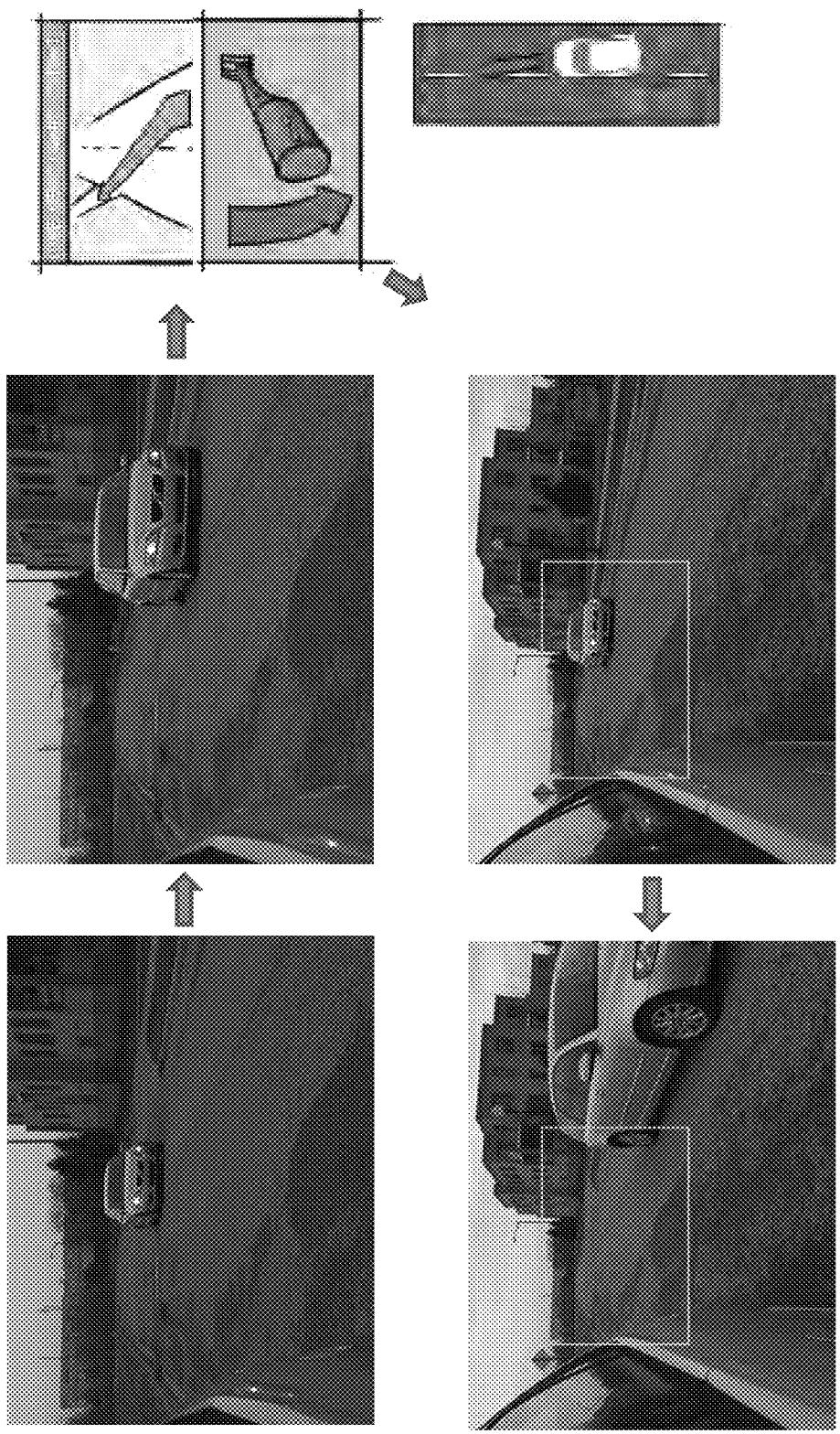
FIG. 22 shows views of the display screen, showing how the field of view is expanded responsive to a lane change determination, whereby the initial field of view is still shown as an outlined box in the expanded displayed images.

Optionally, and with reference to FIG. 22, if the field of view shown in the main display changes, either due to some action by the driver (such as turn signal indicator actuation or the like), or by the presence of a vehicle in the blind zone, a box can be shown on the display to indicate the previous field of view. This would help prevent driver confusion, especially if they happen not to be looking at the display at the time the field of view changes. The transition from the normal field of view to the expanded field of view and back again can be animated along with the highlight box to help make the driver aware of how it has changed.

Figure 23:
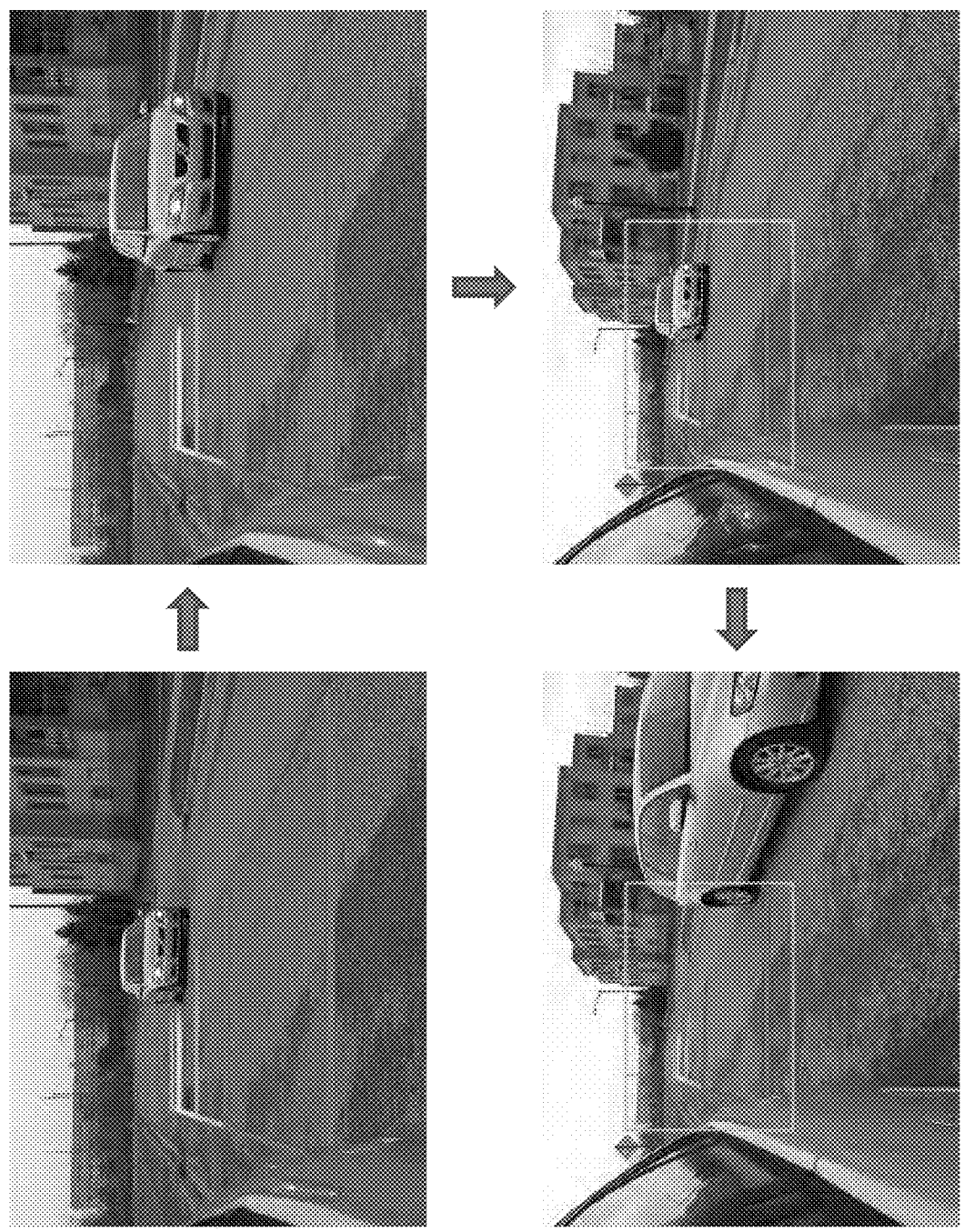
FIG. 23 shows views of the display screen similar to FIG. 22, with a distance scale shown in the displayed images.
Figure 24:
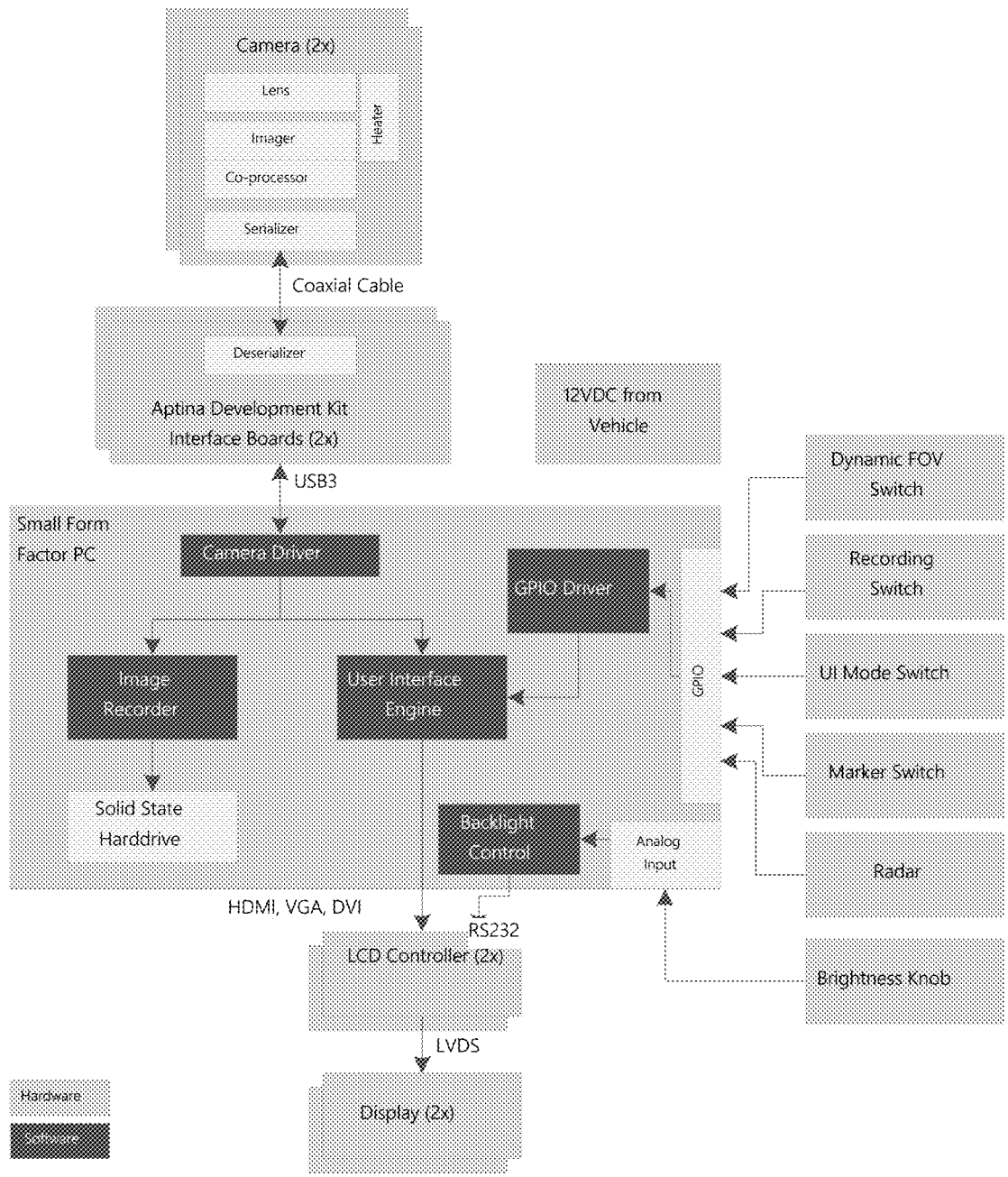
FIGS. 24-27 are schematics of the camera and monitoring system of the present invention.
Figure 25:
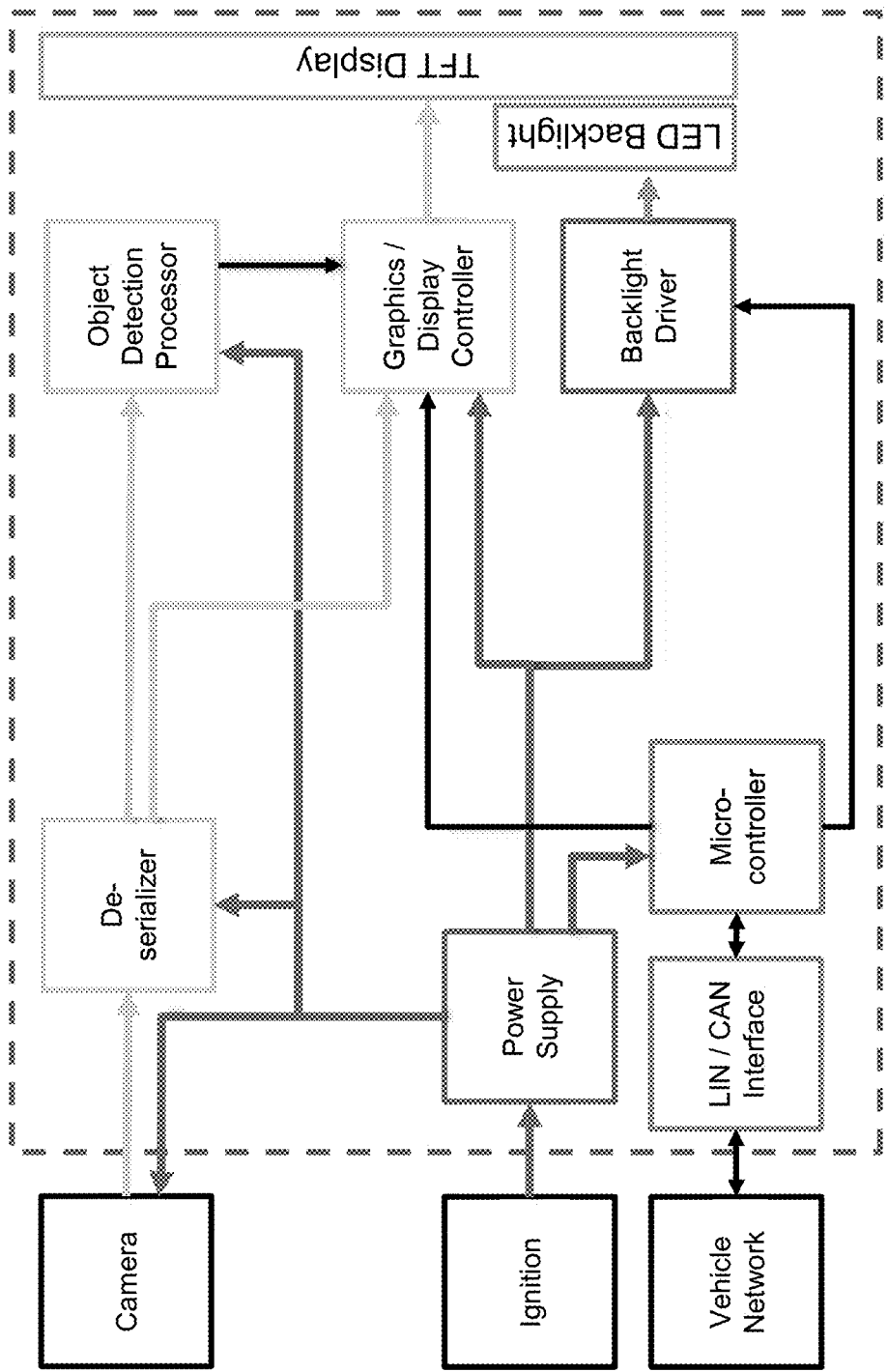
Figure 26:
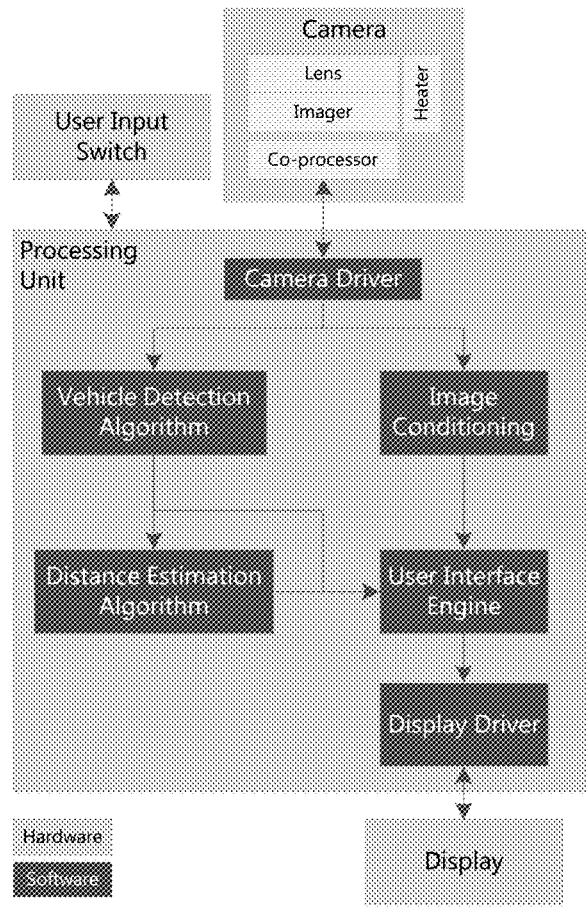
Figure 27:
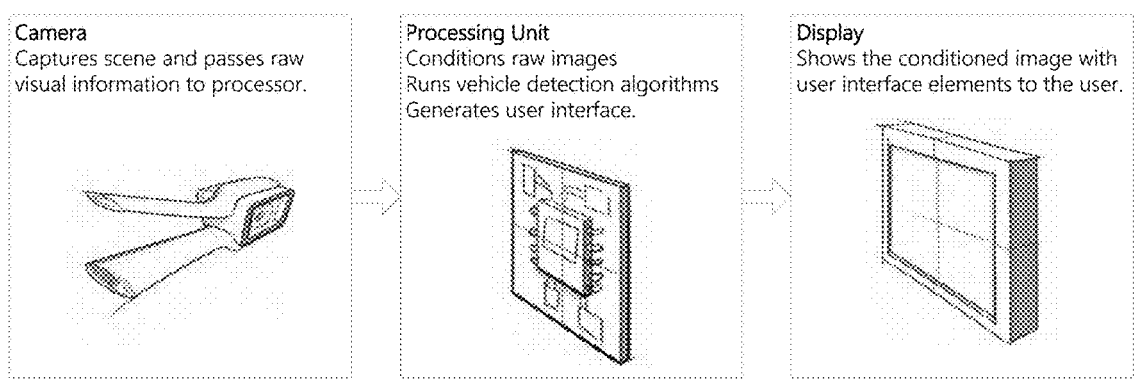

Optionally, a distance scale (FIG. 23) can be included in the field of view which scales with the field of view when the view changes. This would also help the driver understand the change in perceived distance as the field of view changes.

Optionally, the overlay of the present invention may be displayed on other video display screens of the vehicle that may display video images derived from image data captured by one or more other cameras of the vehicle. For example, the graphic overlays may be applied to displayed images displayed by an interior mirror full-size video display (such as a display that utilizes aspects of the displays described in U.S. provisional applications, Ser. No. 62/237,716, filed Oct. 6, 2015, and Ser. No. 62/185,206, filed Jun. 26, 2015, which are hereby incorporated herein by reference in their entireties) in order to help with distance perception with large field-of-view angles.

The video camera may be mounted in an exterior structure mounted at an exterior portion of a body side of a vehicle equipped with said vision system. An exterior mirror assembly is one such structure but other exterior structures can be used, such as for example a housing or cowling at and extending from a side body-panel or side pillar of the equipped vehicle.

Video frames (such as for display on the display screen of the present invention) are captured by the respective video cameras at a rate of typically 30 frames per second (which means that a fresh frame of image data is captured every 33 milliseconds or so). The video frame rate can however be set greater than 30 fps (such as for example, 45 fps) or can be set smaller (15 fps). Also, exposure periods for any given frame of image data capture (or set of frames) can also be set/varied. When driving in a traffic/lighting environment where ambient and/or light level seen by the respective changes is rapidly changing or may oscillate (such as can occur, for example, by day driving down a road flanked on both sided by a row of trees or a fence, or such as driving at night in an urban environment where lights from shops or other road traffic can impinge at the respective cameras), the video display as seen by the driver of the equipped vehicle on the video screen or screens provided may be seen to flicker.

To mitigate or substantially eliminate or eliminate such flickering, a rolling average of light intensity as being captured across the entire image sensor array of a camera used can be maintained and significant intensity variations can be algorithmically averaged or ironed out. For example, if the overall lighting intensity experienced at an n+1th frame exceeds or is less than that of the nth frame by a determined amount (for example 5 percent or for example 10 percent), the intensity of that n+1th frame of image data as displayed by the display device is restricted or constrained to be at the same overall displayed intensity level as that displayed for the prior frame of image data. Optionally, a band or limit can be set that prevents any n+1th (or n+xth) displayed frame of captured image data from having a displayed display intensity more or less than the nth (or n−yth) displayed intensity. Moreover, when lighting conditions might otherwise lead to flickering of displayed video images, the frame rate of video frame capture and/or the exposure period for frames of captured image data can be adjusted to mitigate, reduce and overcome the impact of rapid lighting variation that otherwise could lead to display flickering. Such smoothing of displayed intensities enhances utility and driver usage of the camera monitoring and display systems of the present invention.

Optionally, the camera may have a forward field of view and/or sideward and/or downward field of view for capturing image data for other functions, such as for a lane departure warning system of the vehicle, an automatic headlamp control system of the vehicle, an accident and/or event recording system of the vehicle, a traffic sign recognition system or function, an object or pedestrian or animal detection system or function and/or the like. Optionally, the camera may comprise a wireless camera suitable for attachment at any suitable location at the vehicle and/or at a trailer or the like, such as at a back or rear portion of a trailer that is being towed by the subject vehicle.

The present invention provides a camera monitor system that captures images at the side and rear of the vehicle and displays images derived from captured image data at a monitor or display screen at the interior of the vehicle.

The mirror may have a slight curvature to provide a similar field of view as the camera. For example, the mirror element may have about a 330 mm radius of curvature. This provides approximately the same field of view as the camera, and slightly less in the vertical direction. The camera field of view may be about 46 degrees horizontal and about 34 degrees vertical. The camera may be angled about 7 degrees down from horizontal and rotated horizontally so that the driver can just see the side of the vehicle in the displayed images at the monitor or display screen.

The CMS hardware consists of a camera, processing unit and display. At least two cameras and displays must be used, one for each mirror. The processing unit can be shared between the camera/display pairs or each camera/display can have its own processing unit. The software may comprise a single application containing the camera driver, GPIO driver, image recorder, and user interface generation engine. See FIGS. 24-27 for system schematics.

Figure 28:
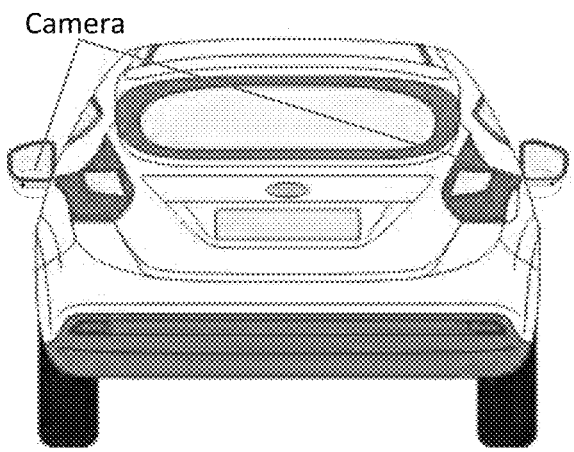
FIGS. 28 and 29 are views showing exemplary locations of the cameras and display screens of the systems of the present invention.
Figure 29:

The cameras are mounted outside the vehicle near the current location for side view mirrors (FIG. 28). The monitors are located inside the vehicle near the A-pillar (FIG. 29). The location of the processing unit may be any suitable location at or in the vehicle.

One aspect of the system that a user interface may overcome is the lack of depth perception due to magnification of the image. This issue is shown in the images of FIG. 30, which demonstrate the effect of field of view (magnification) on perceived distance. Each of these images is from the same instant, the only difference is in the cropping and zooming.

Optionally, overlay lines indicating distance may be displayed, with markers at, for example, about 30 feet and 75 feet from the rear bumper. It has been identified that the quality of the information provided by the overlays can be dramatically improved if the overlays are able to react to the contents of a given scene. The two primary areas requiring smart overlays (FIGS. 31A-C) are vehicle masking and scenario detection.

Vehicle masking comprises tuning off the overlay for pixels of the image corresponding to the subject vehicle and/or a detected vehicle present in the field of view of the camera (see FIGS. 31A-C). This provides the illusion that the overlay is being drawn on the road only, not over the entire image. It helps to improve the ability of the driver to relate real-world objects to the overlay.

Using semitransparent overlays helps to minimize the impact if the algorithms are not able to correctly mask a vehicle.

Scenario detection is used to turn the overlays off completely when they are not needed or are not valid. Some example scenarios are (i) when there is no lane beside the vehicle (i.e., the driver's side display on a two-lane road), and (ii) at corners where the overlay no longer is on the road.

Figure 32:
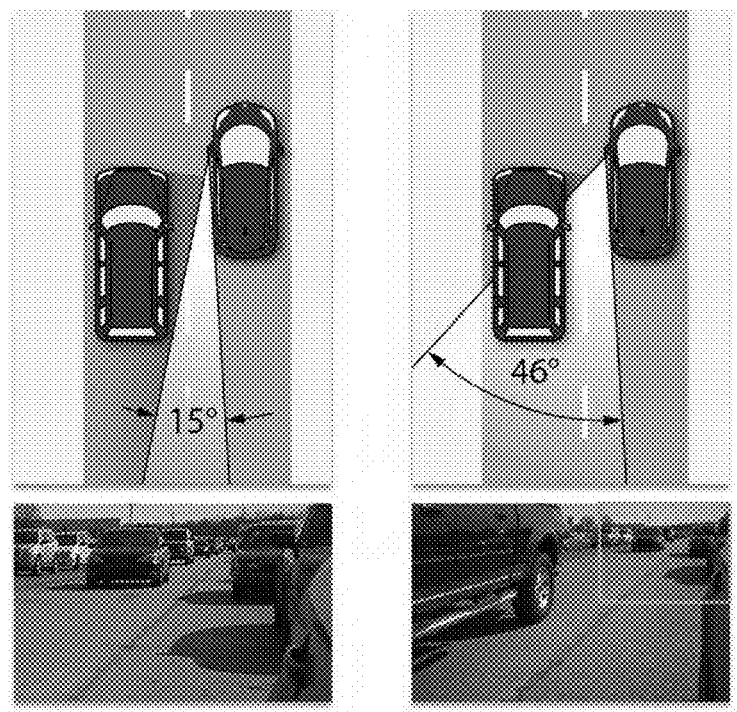
FIGS. 32-36 show the system using a dynamic field of view feature that adjusts the field of view of the camera at the side of the vehicle.
Figure 33:
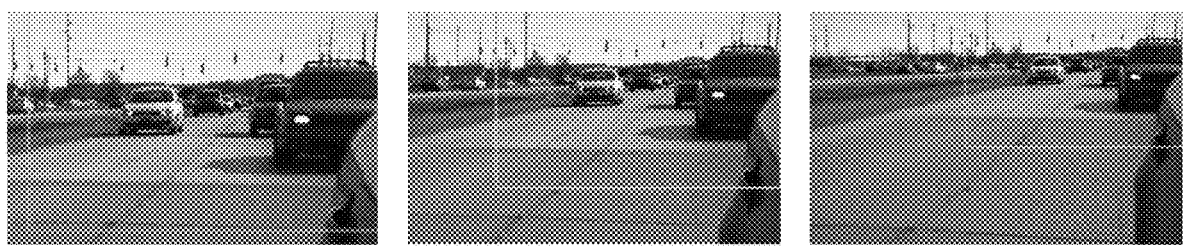

Optionally, the system may provide a dynamic field of view of the camera or cameras. The dynamic field of view (FOV) concept includes displaying a narrow FOV as the default such that a near 1:1 magnification is achieved. A wide FOV is shown in FIG. 32, such as may be provided when the driver actuates a manual control. Example FOV configurations and images are shown in FIGS. 32 and 33.

Figure 34:

A blind spot indicator is desired to warn the driver when a vehicle is present in the blind spot area. The icon for indicating a vehicle in the blind spot may be selected depending on the particular application. FIG. 34 shows the icon as a yellow triangle containing an exclamation point.

Optionally, a transition animation with markings of the original narrow FOV may be used when changing the FOV. The upper right corner of the image is 'fixed' during the animation when transitioning FOVs. An example of transitioning from the narrow to the wide FOV is shown in FIG. 33. The animation speed must be sufficiently fast to avoid the dolly zoom effect which can make approaching cars appear to stand still.

Figure 35:

Some example scenes with the narrow FOV are shown in FIG. 34, while some example scenes with the wide FOV are shown in FIG. 35. Each image in FIG. 35 corresponds to the same image in FIG. 34.

Figure 36:

The wide FOV concept includes presenting the full FOV to the driver such that the driver can always see vehicles in the blind spot area. A drawback to this concept is the magnification that occurs, making distant vehicles appear even further than they actually are. To help the driver judge distance, an additional distance indication bar can be provided (see FIG. 36). The top edge of the bar represents the distance of the vehicle from the back bumper. Lines corresponding to the overlay lines are provided to help provide a reference to the image. Additionally, the bar color corresponds to the color of the overlay sections. An image of the driver's vehicle may also be provided to help with scale.

Figure 37:
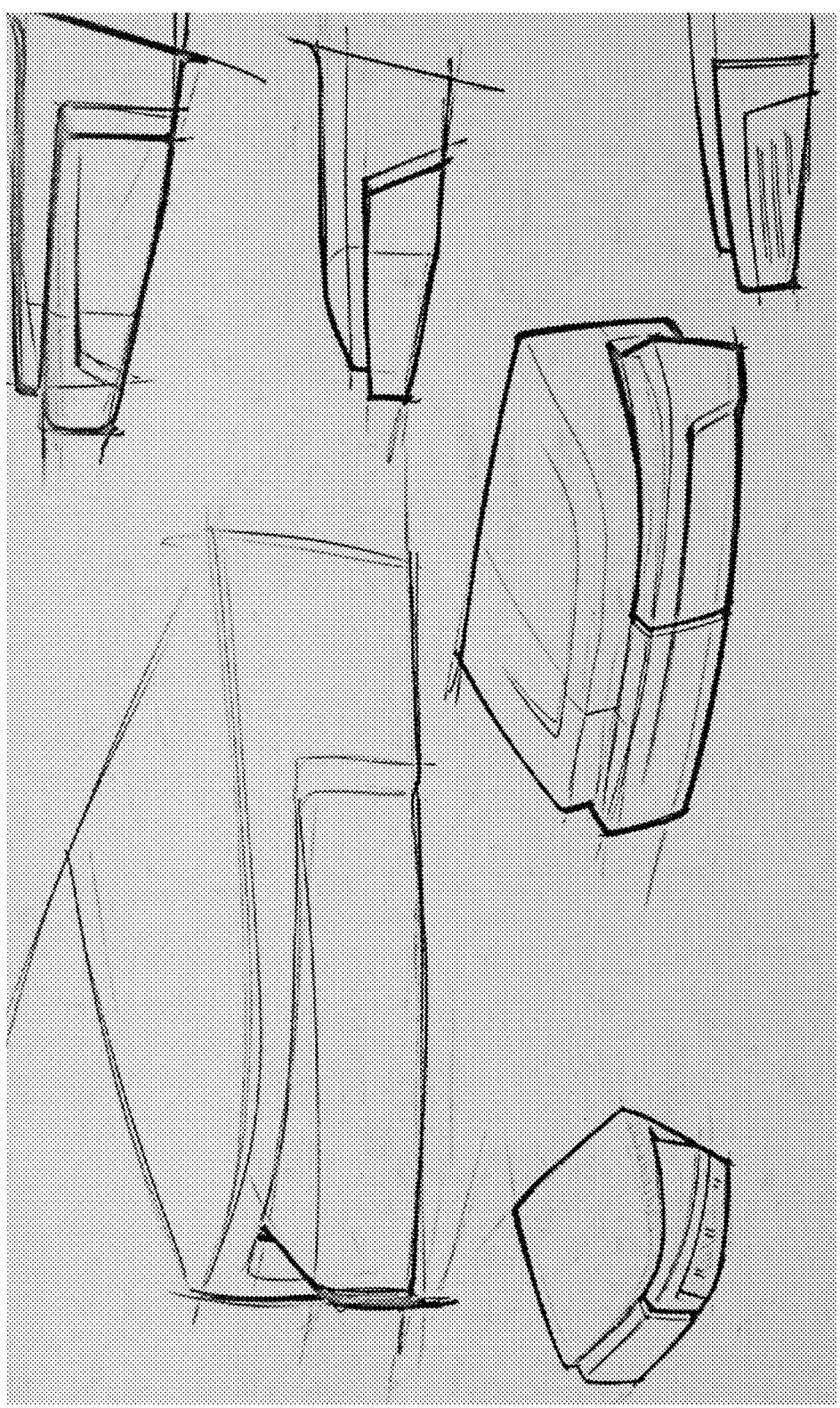
FIG. 37 shows perspective views of camera housings suitable for housing a camera at the side of a vehicle in accordance with the present invention.
Figure 38:
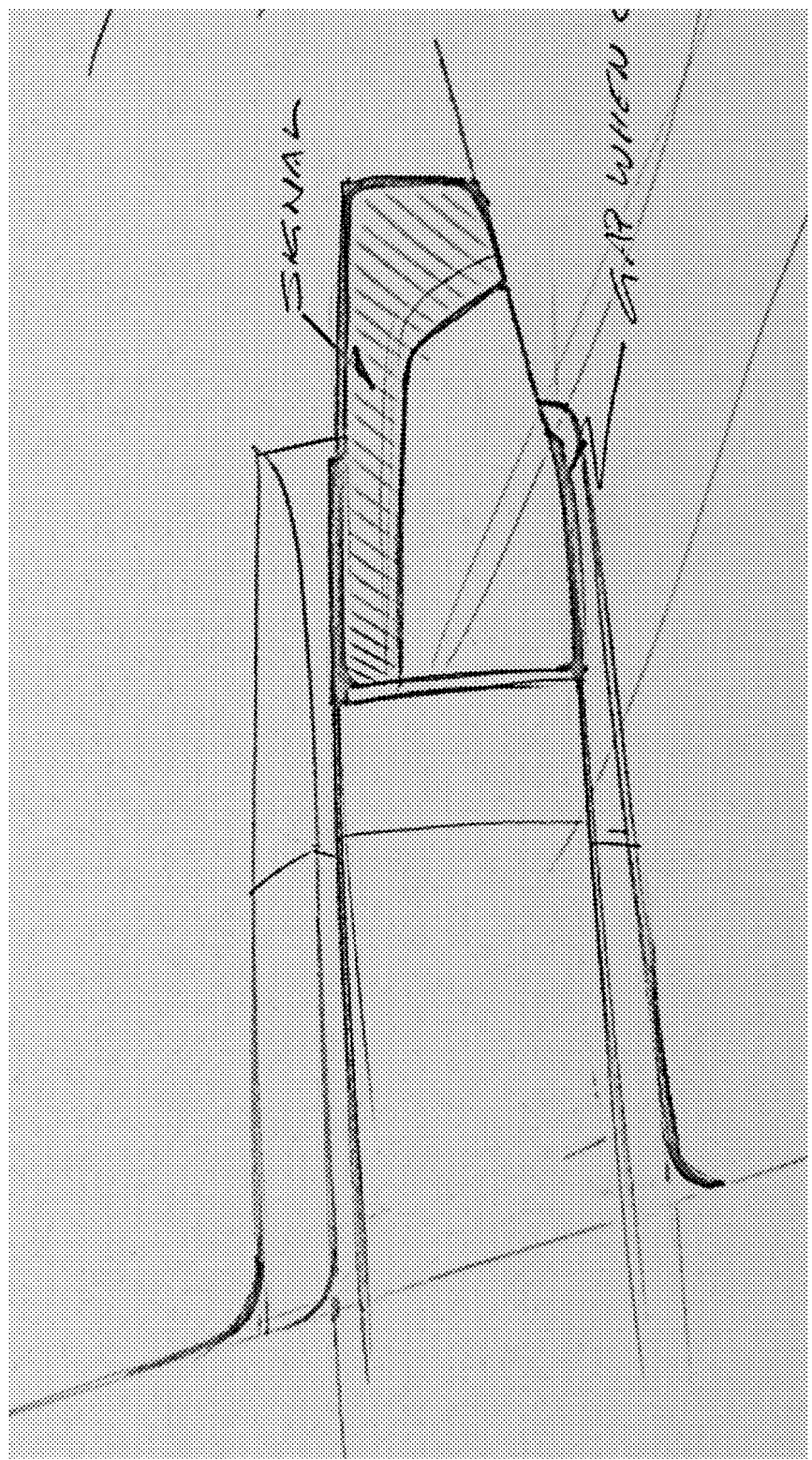
FIG. 38 is a perspective view of a camera housing incorporating a turn signal indicator in accordance with the present invention.
Figure 39:
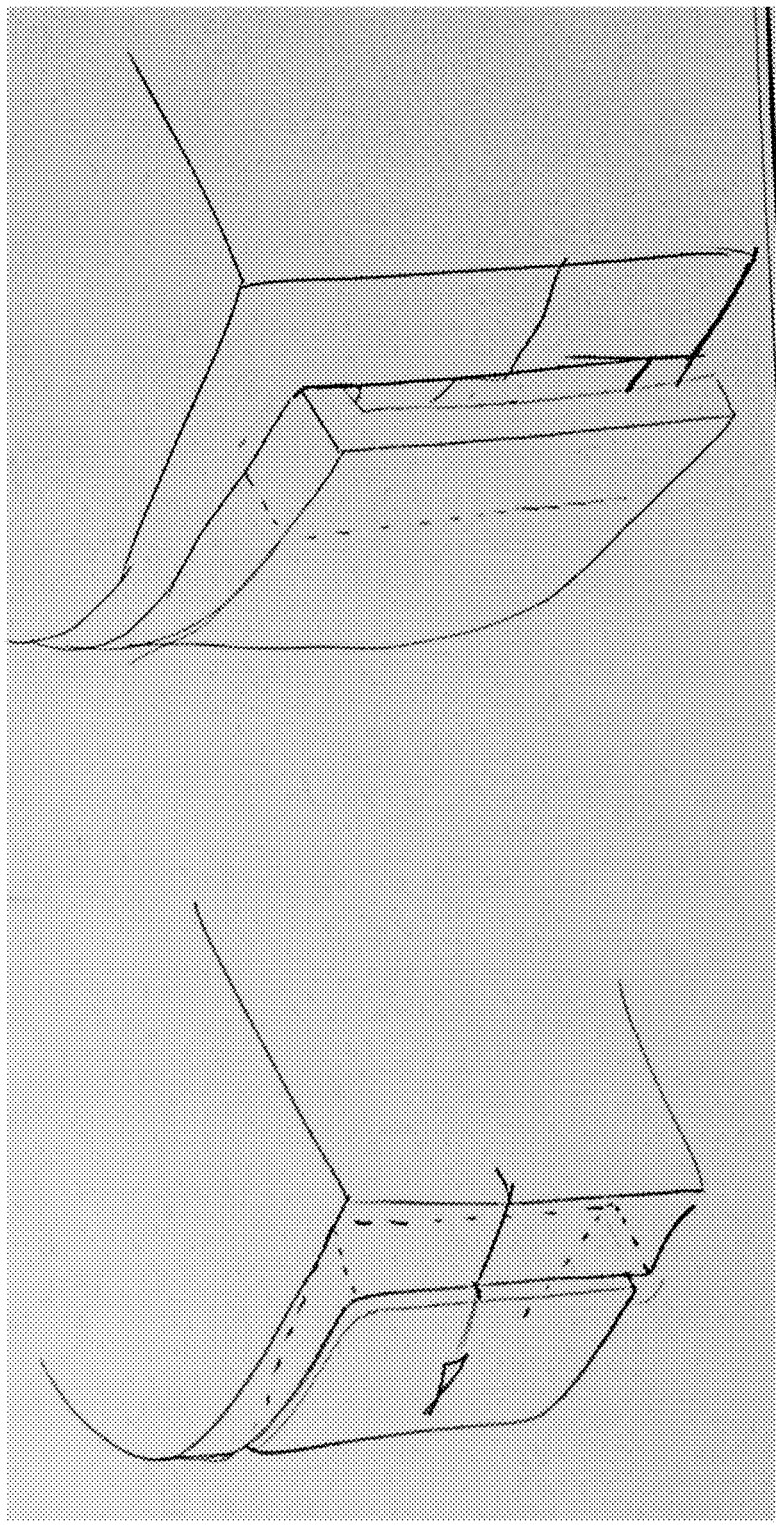
FIG. 39 shows perspective views of a camera housing incorporating a visor to shade the camera lens from direct sunlight in accordance with the present invention.

Optionally, and such as shown in FIGS. 37-39, the camera may be mounted at a portion of a housing that folds or flips in and out of the primary housing. Being that the full assembly may not protrude substantially beyond the vehicle body, a full power folding housing or assembly may not be necessary. However, having just the camera portion extend or retract allows for a safer and more robust integration. By retracting the camera, the lens or lens cover would be protected from scratches and the elements. The housing could include a wiper (much like a windshield wiper) that would remove the water droplets from the lens or lens cover when retracted/extended (such as by utilizing aspects of the camera systems described in U.S. Pat. No. 7,965,336, which is hereby incorporated herein by reference in its entirety). The movable housing may also be manually extendable and retractable and may be manually pushed in, which could save the camera and housing from damage if it were to come into contact with an object.

Optionally, such a movable portion of the housing may also integrate a turn signal indicator (such as shown in FIG. 38). Optionally, a visor may be included at the camera housing to shade the camera lenses from direct sunlight (such as shown in FIG. 39). This folding mechanism would present itself when the vehicle is unlocked and then retract when the vehicle is locked. Optionally, there may also be a user input or button for actuating the folding mechanism if the driver wished to wipe the lens off. Optionally, the camera system may use machine vision to detect rain drops on the lens or lens cover surface and automatically retract and extend to wipe the surface clean or otherwise function to clean the lens of the camera (such as by utilizing aspects of the systems described in U.S. Publication Nos. US-2014-0232869; US-2014-0104426 and/or US-2013-0300869, which are hereby incorporated herein by reference in their entireties).

Whether referred to as a mirror housing with a camera or a camera housing with a mirror, it is important to acknowledge that many features that are common today in an exterior rearview mirror assembly may also find a place with the camera monitoring systems of the present invention. The geometry of the housing at and protruding from the side of the vehicle provides an ideal location or features such as ground illumination light modules, logo projection modules, and turn signal indicators. If the camera were mounted too close to the vehicle side (such as just off the sheet metal of the door), a ground illuminator may not be able to light up the area closest to the vehicle (adjacent to the tires) and a turn signal may not be visible from as large of a viewing angle. Other useful features may include a powerfold actuator, a mirror reflective element (to meet federal regulations or provide supplemental/fail-safe vision), a painted housing and/or a skull cap and/or the like.

Figure 40:
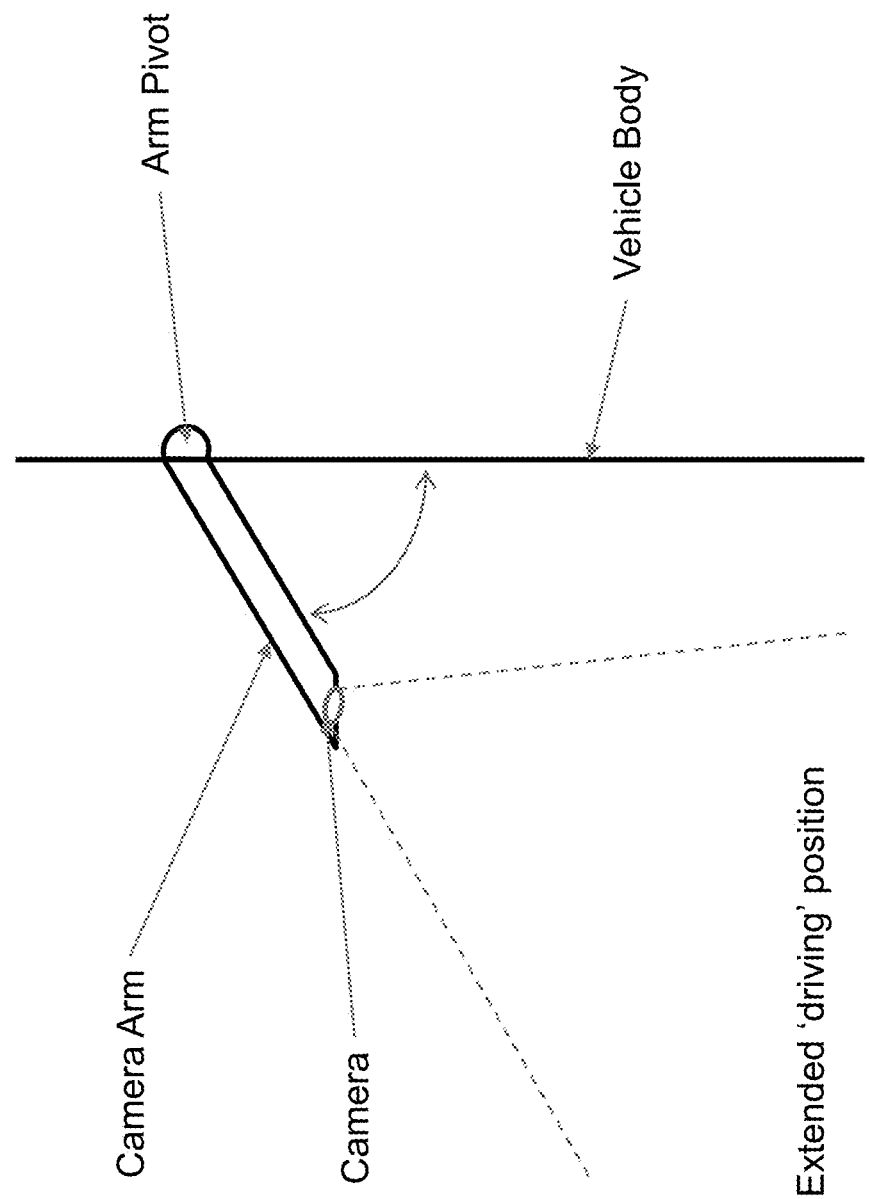
FIG. 40 is a plan view of a pivotable arm that houses a camera in accordance with the present invention, shown with the arm extended to a driving or use position.
Figure 41:
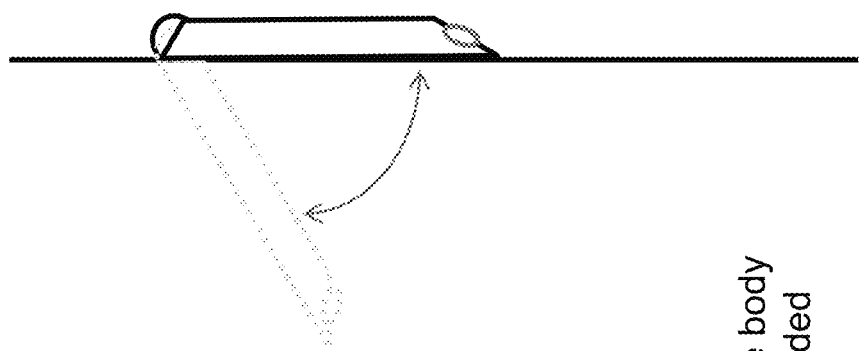
FIG. 41 is a plan view of the pivotable arm and camera of FIG. 40, shown with the arm retracted.
Figure 42:
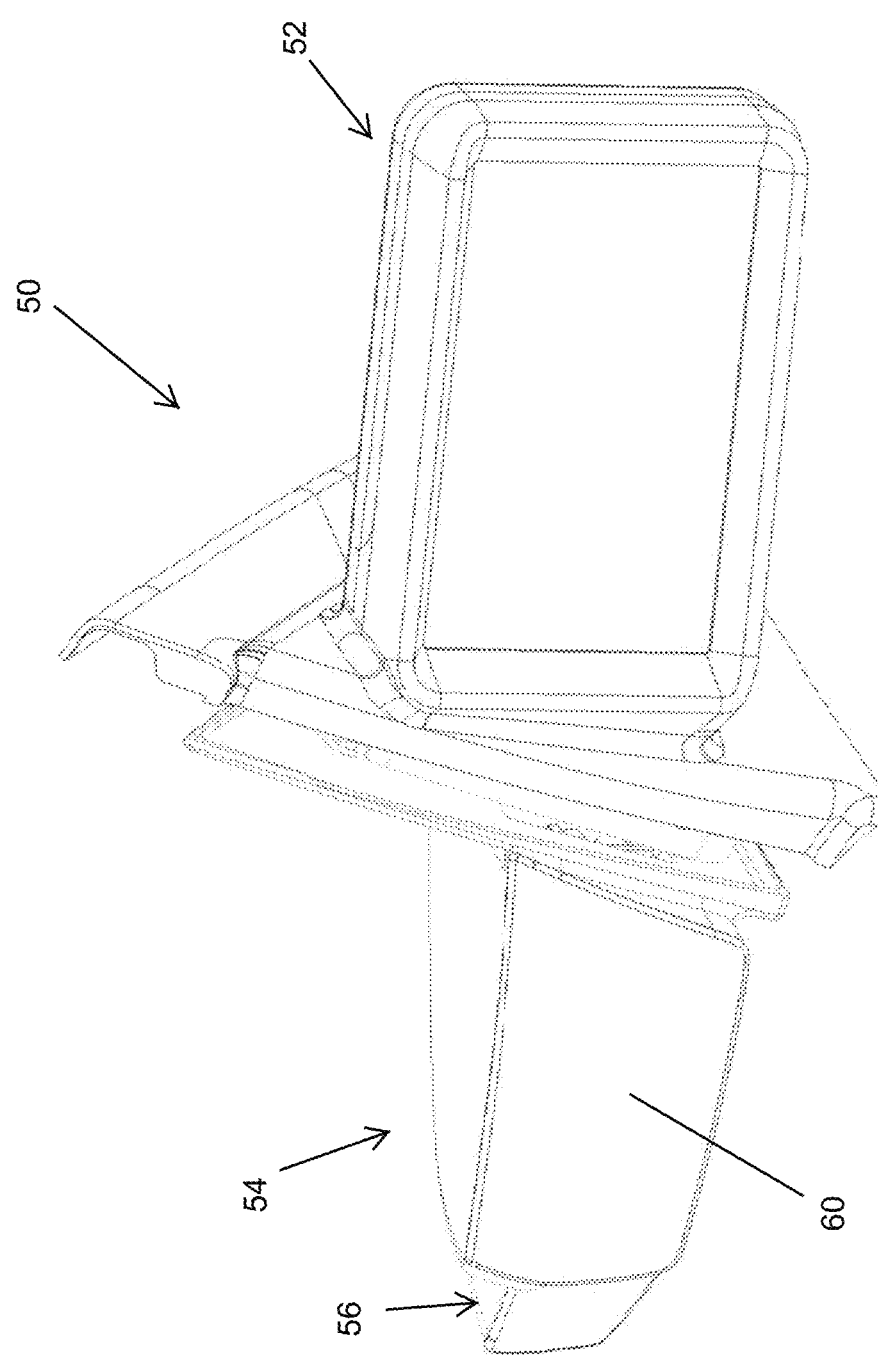
FIGS. 42 and 43 are perspective views of another camera and monitor system of the present invention.
Figure 43:
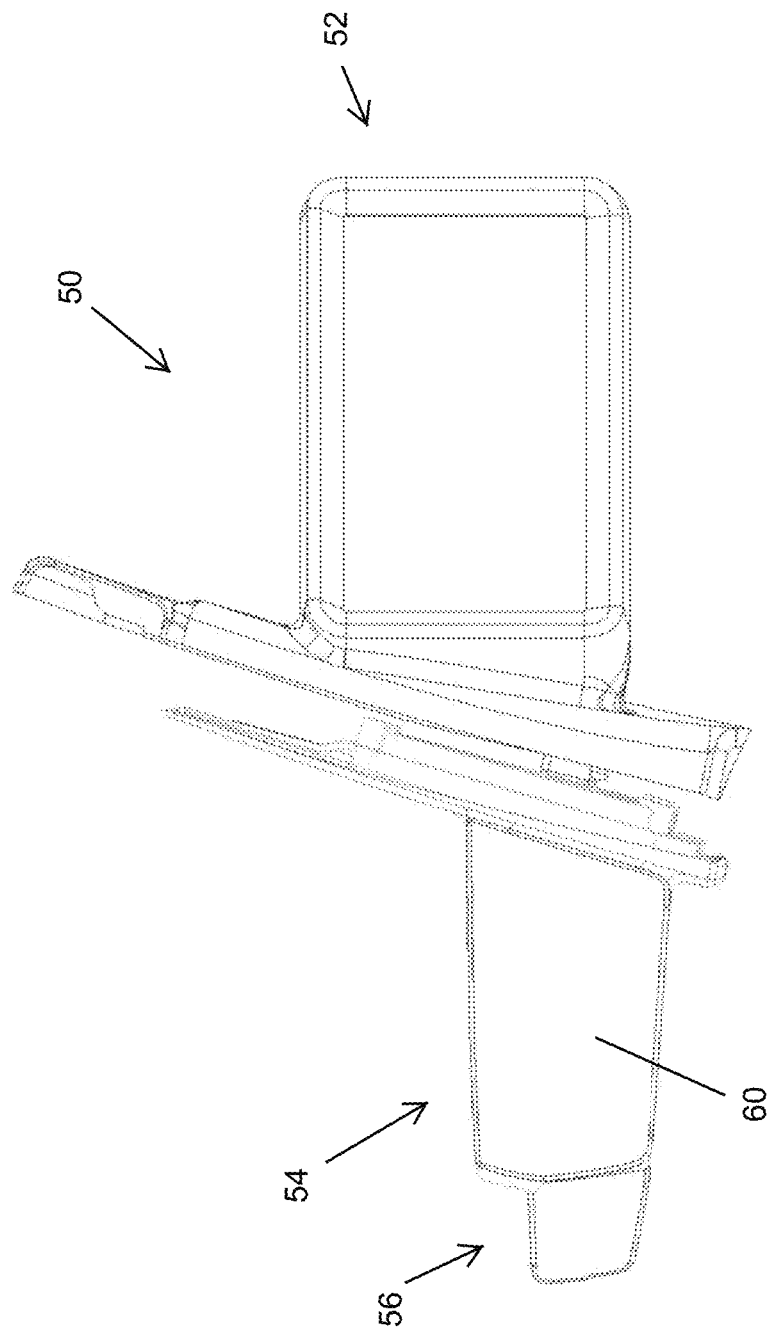
Figure 44:
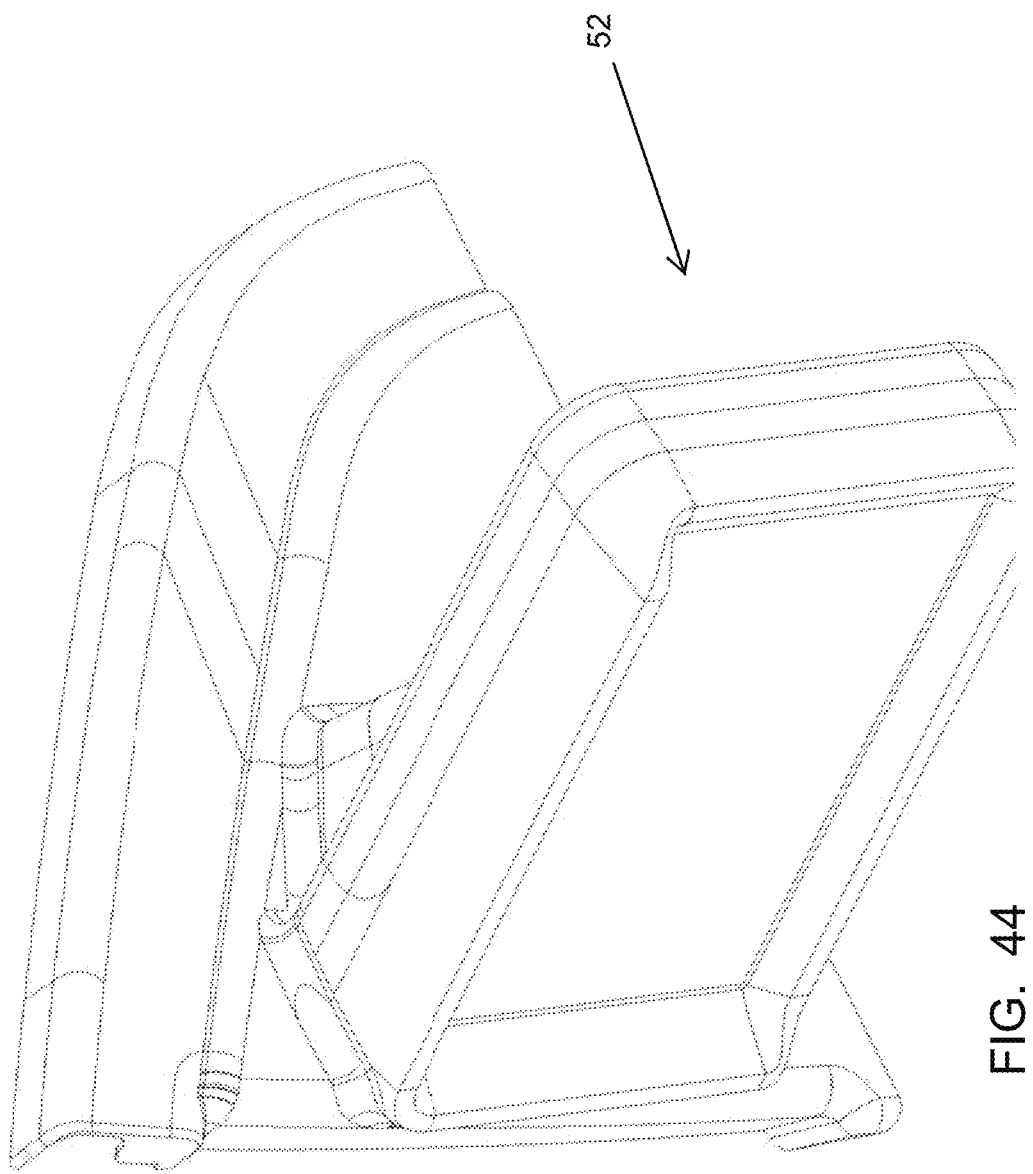
FIGS. 44-51 are perspective views of the display or monitor of the system of FIGS. 42 and 43.
Figure 45:
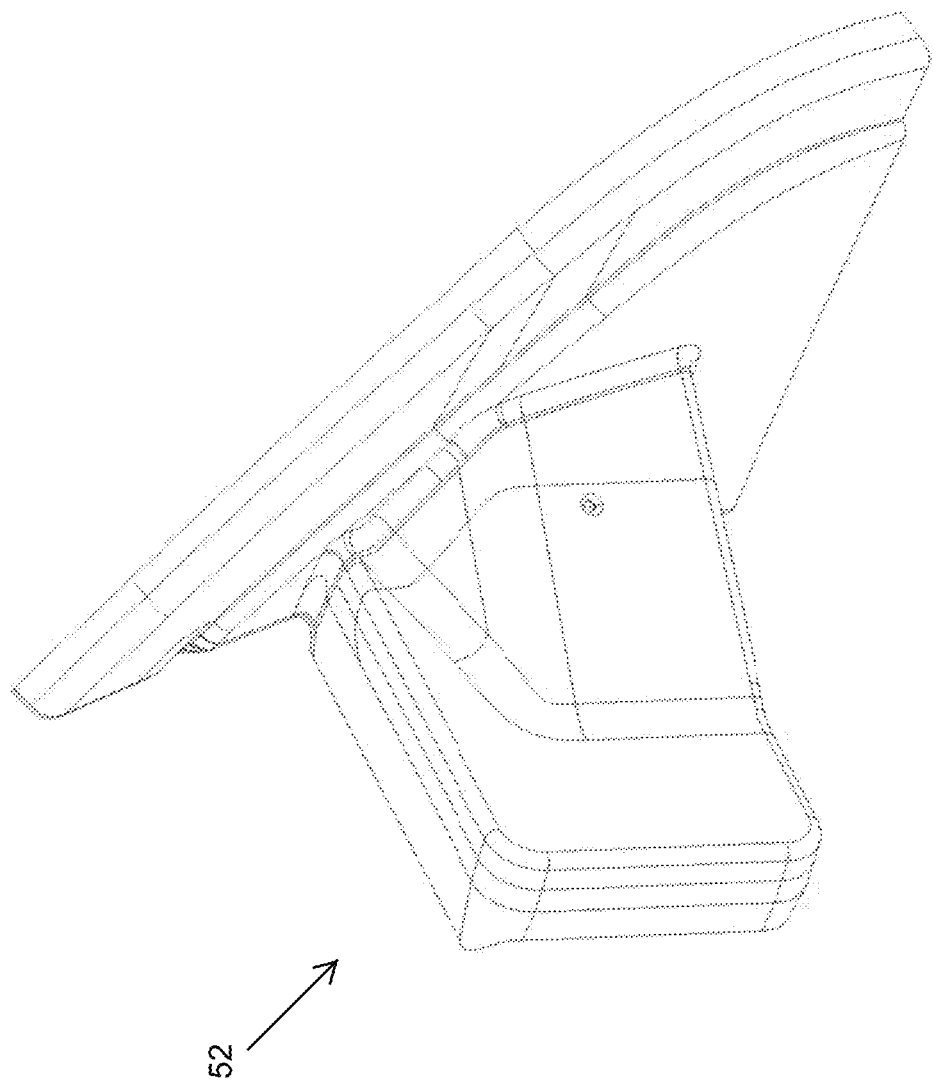
Figure 46:
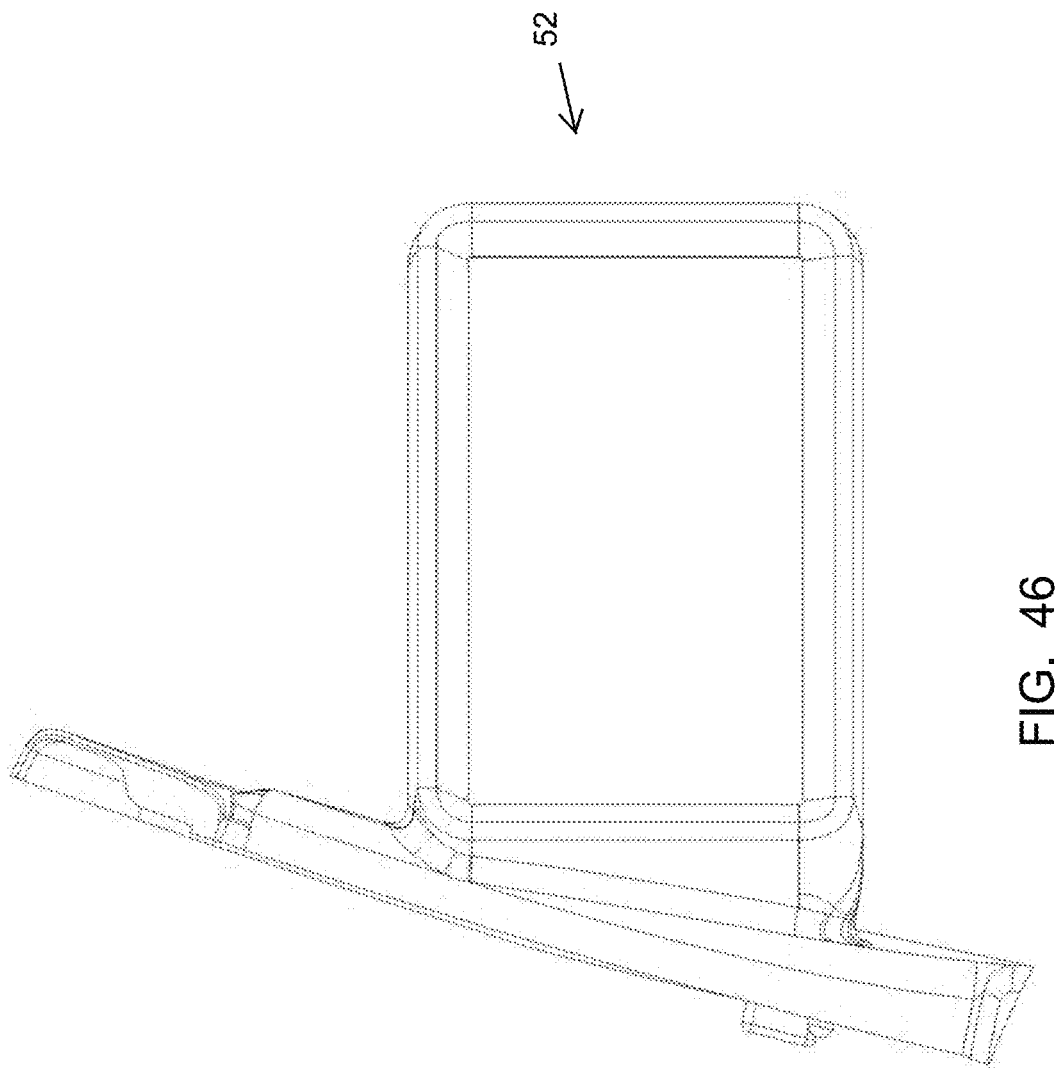
Figure 47:
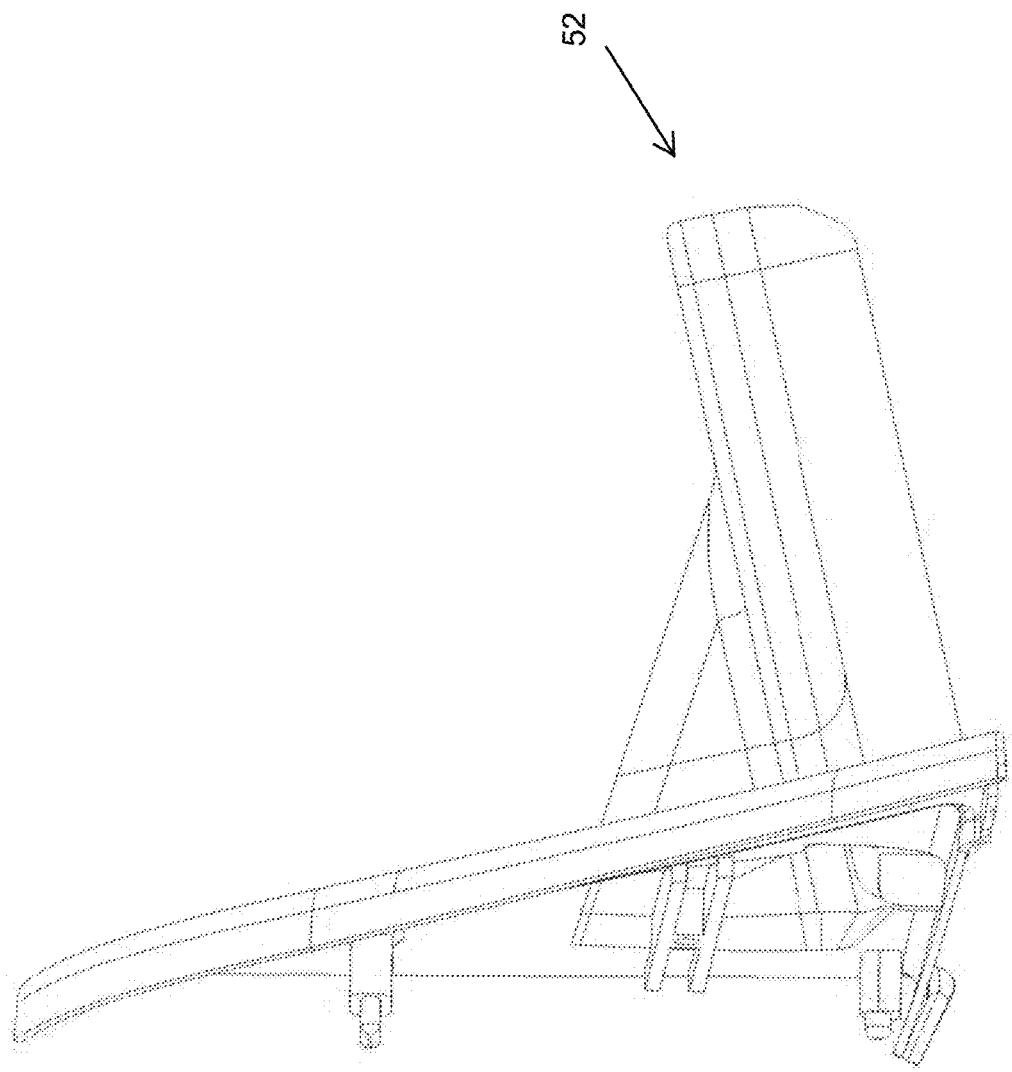
Figure 48:
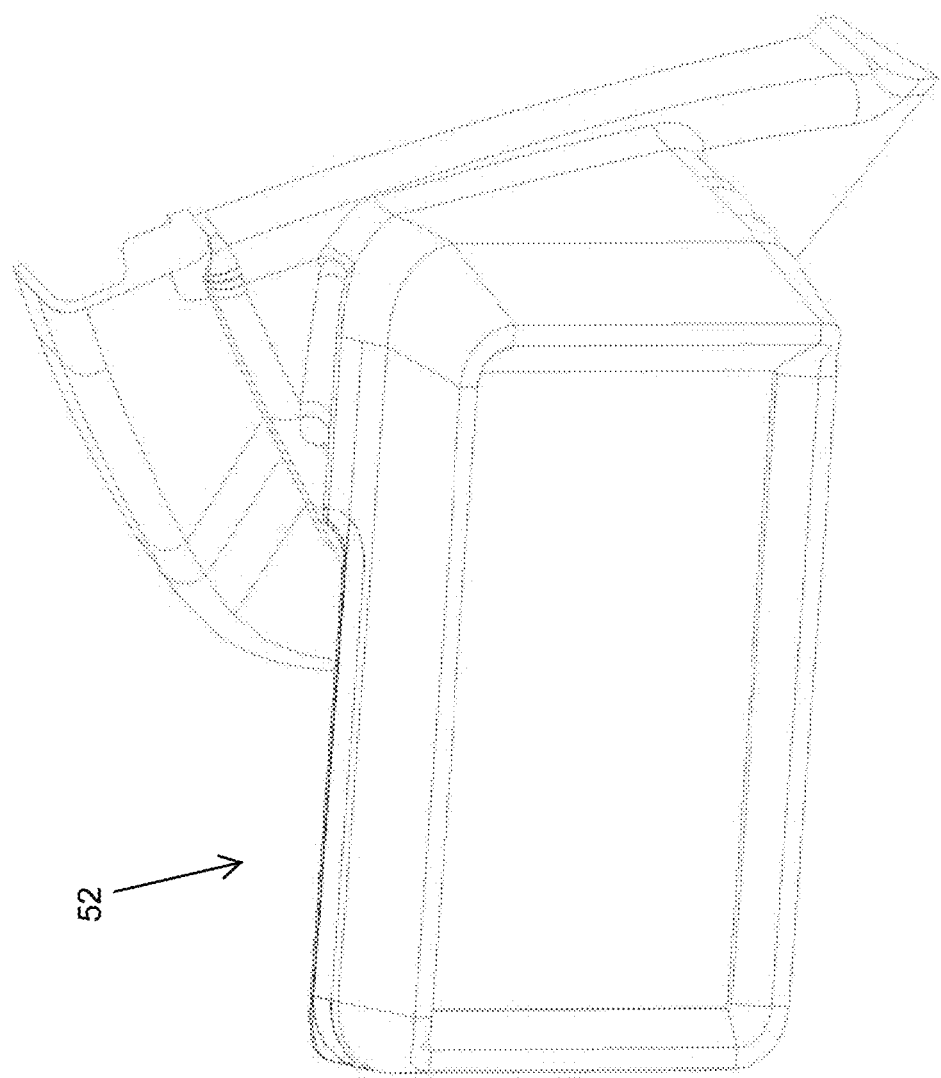
Figure 49:
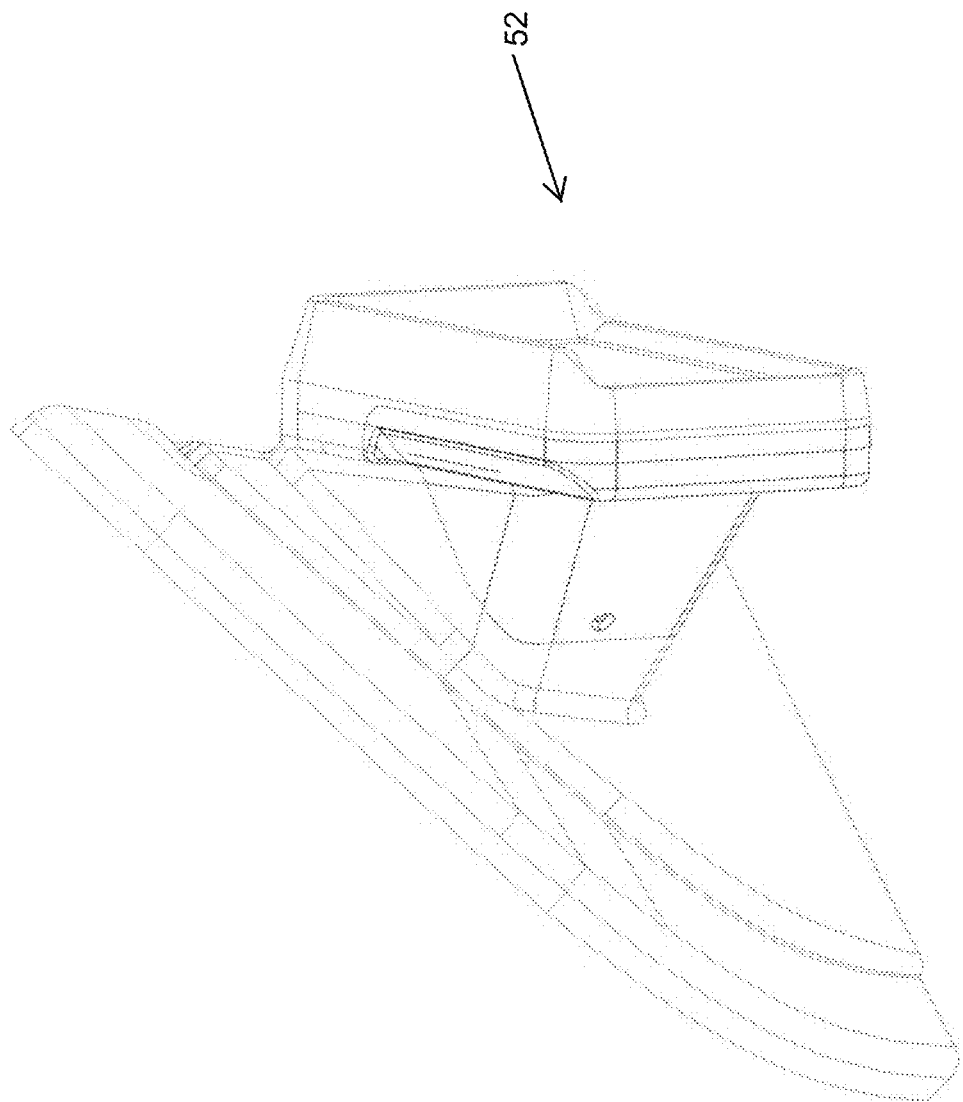
Figure 50:
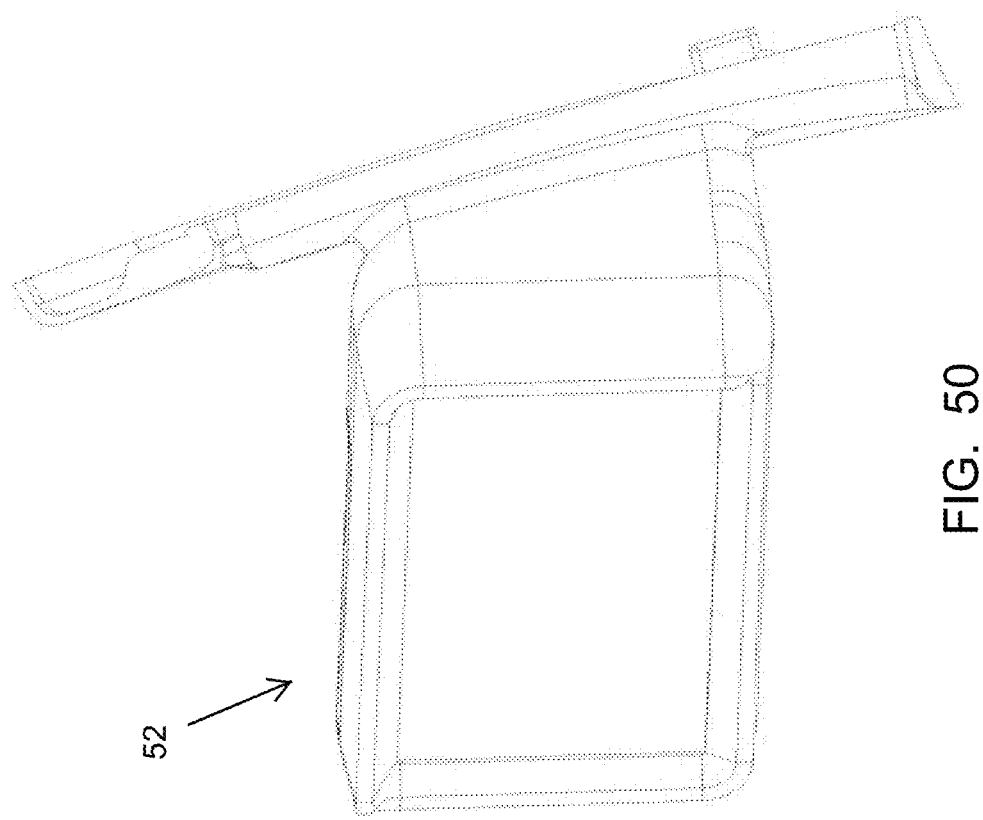
Figure 51:
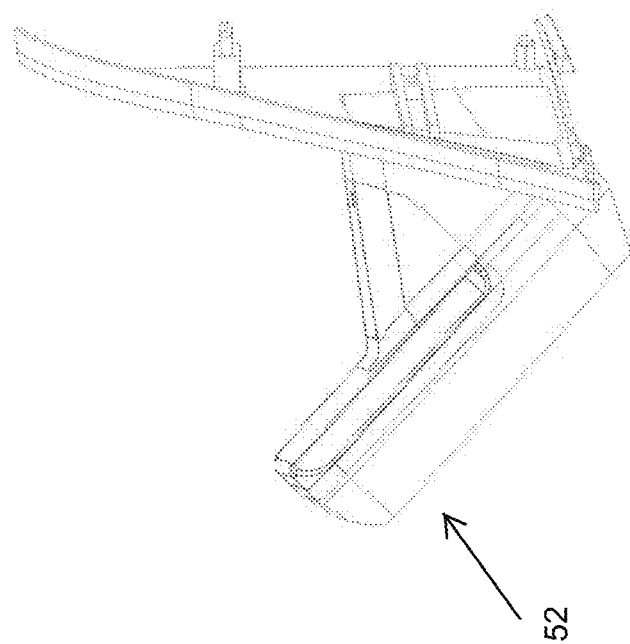
Figure 52:
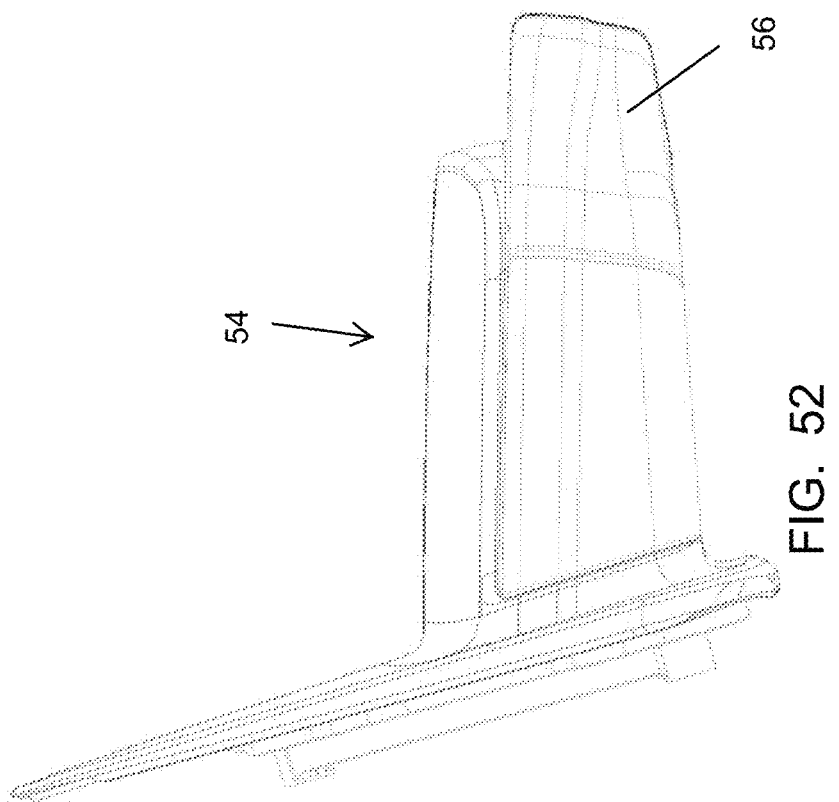
FIGS. 52-63 are perspective views of the camera and mirror of the system of FIGS. 42 and 43.
Figure 53:
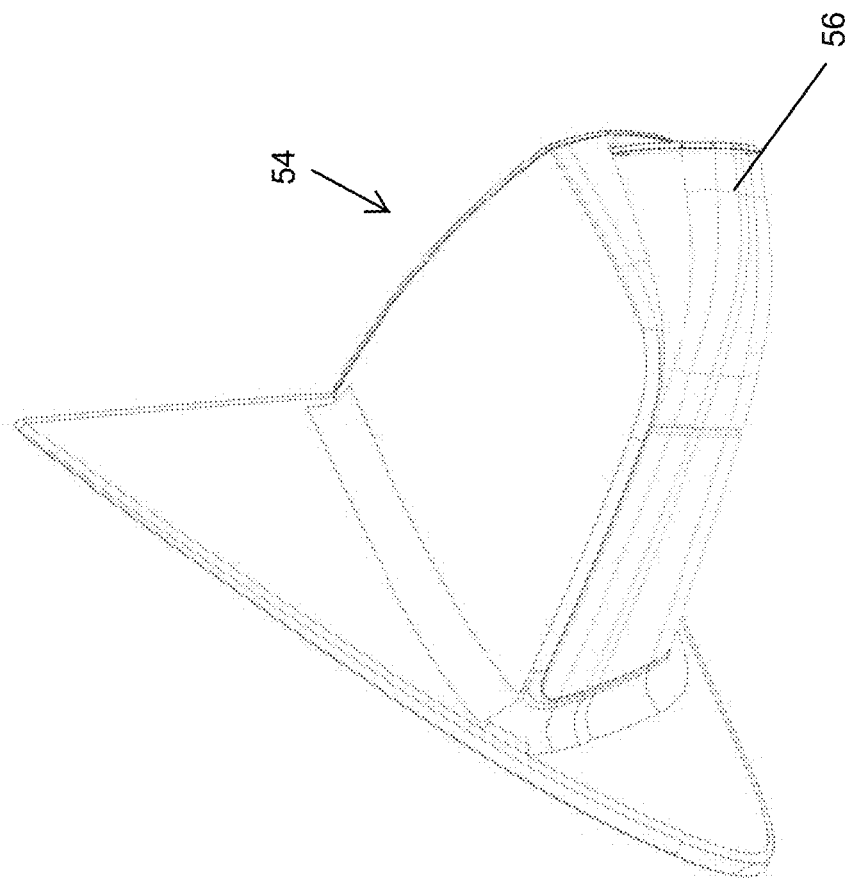
Figure 54:
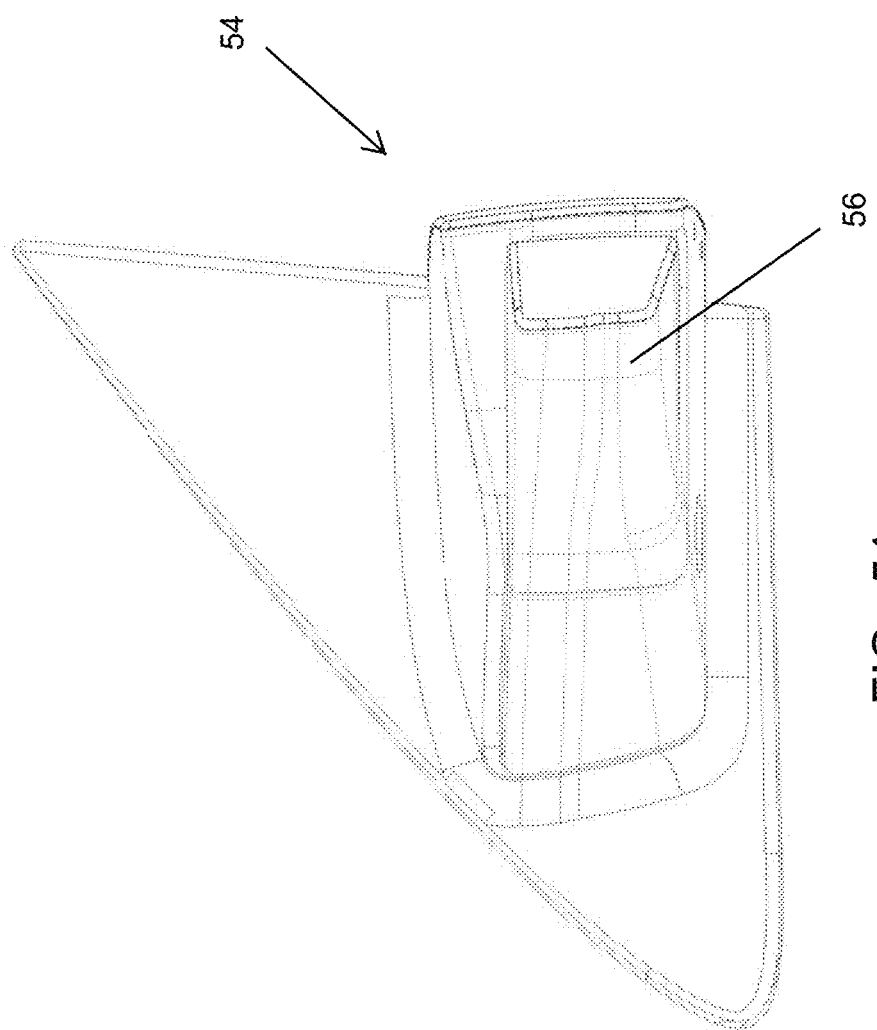
Figure 55:
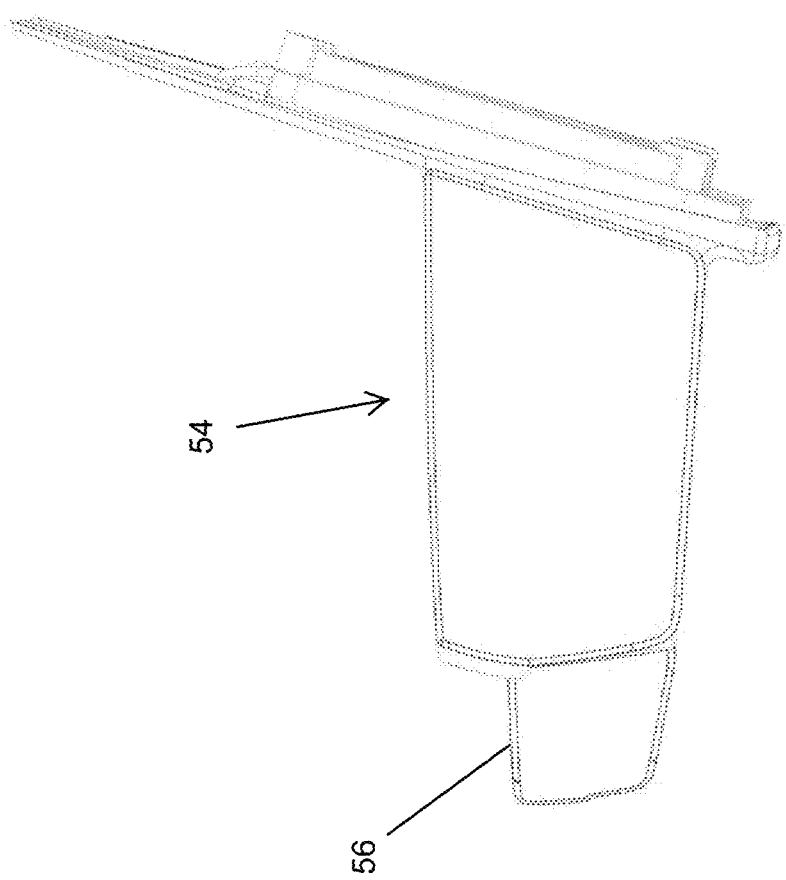
Figure 56:
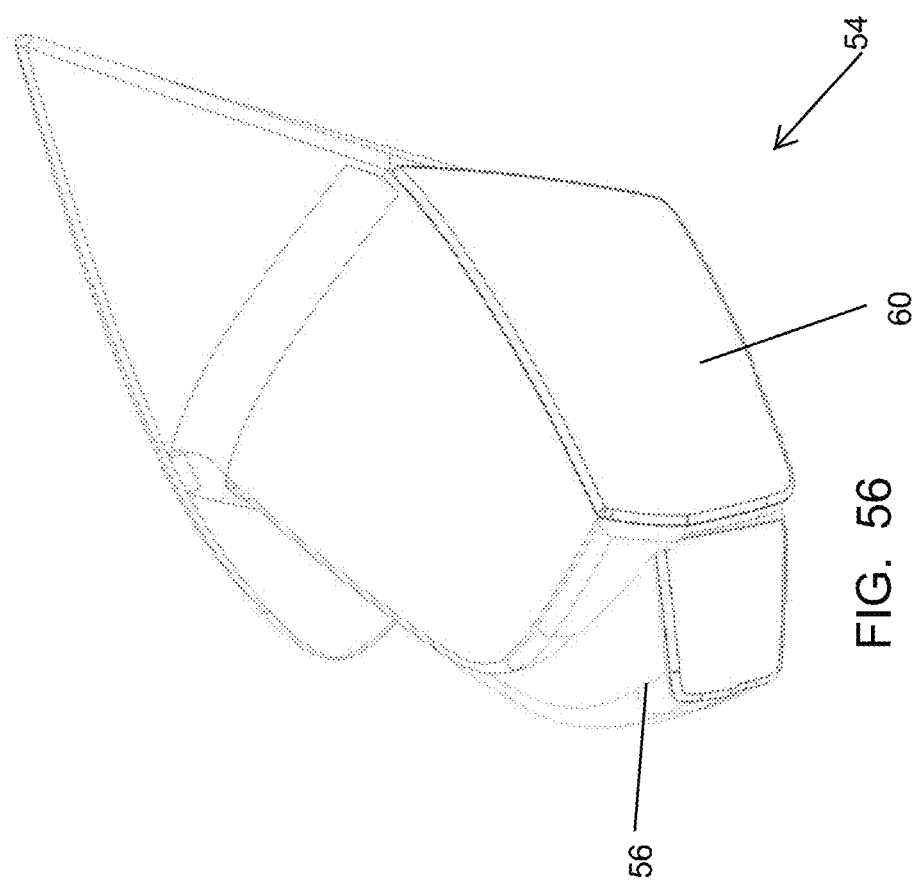
Figure 57:
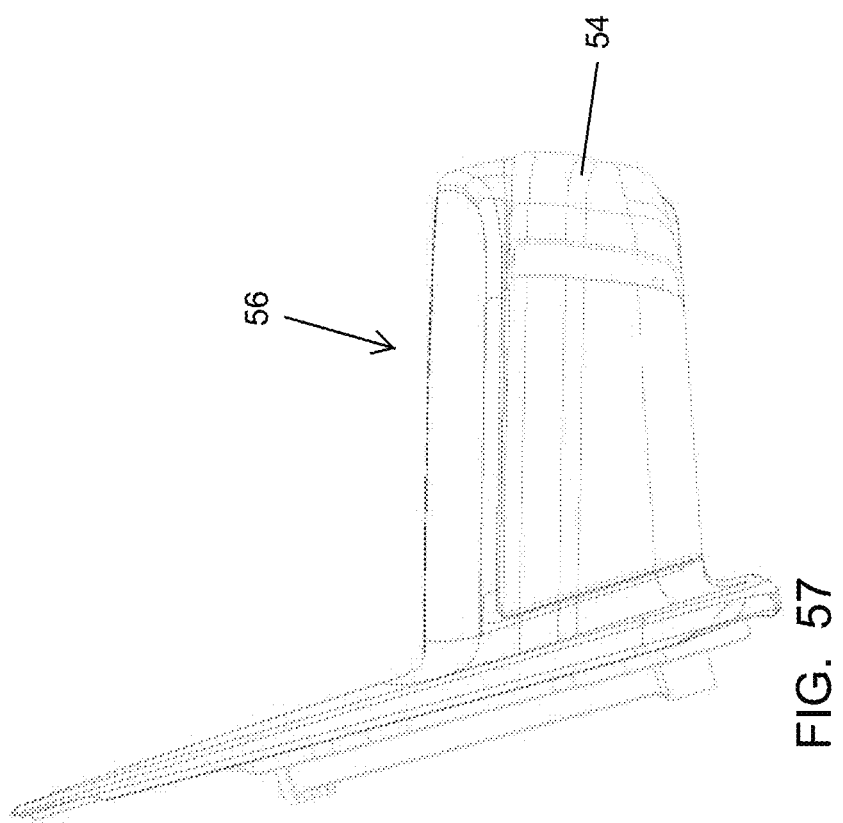
Figure 58:
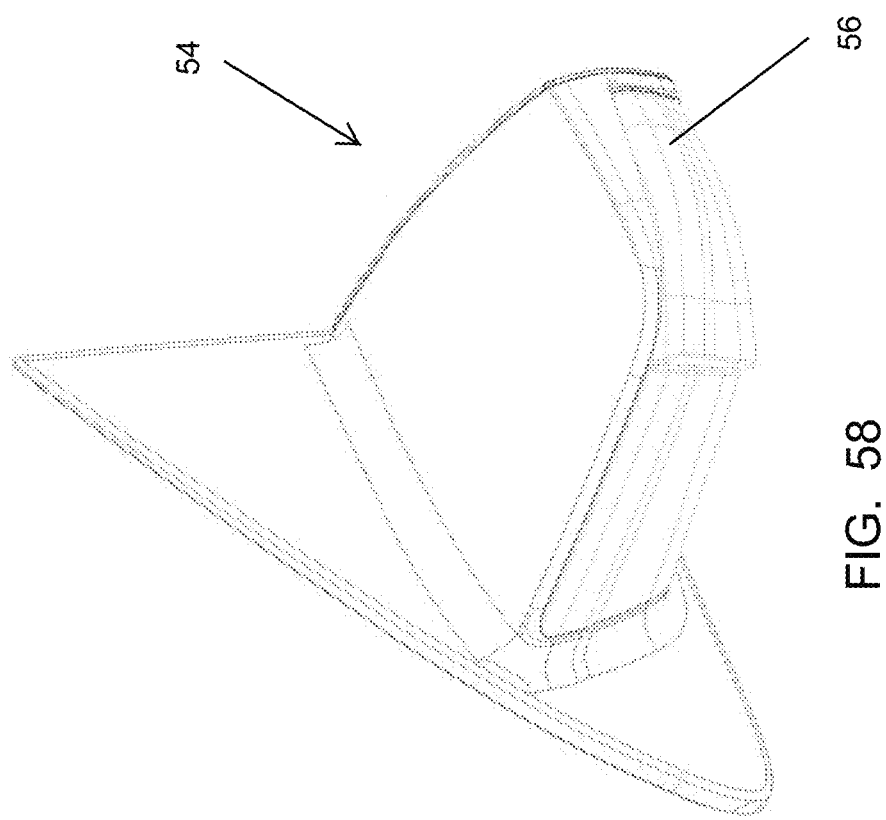
Figure 59:
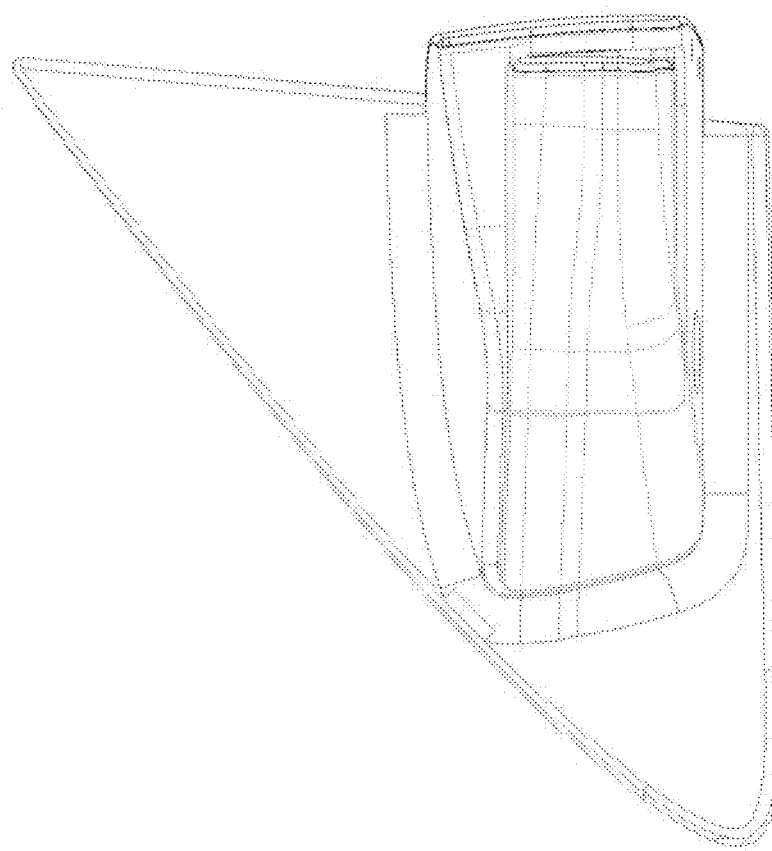
Figure 60:
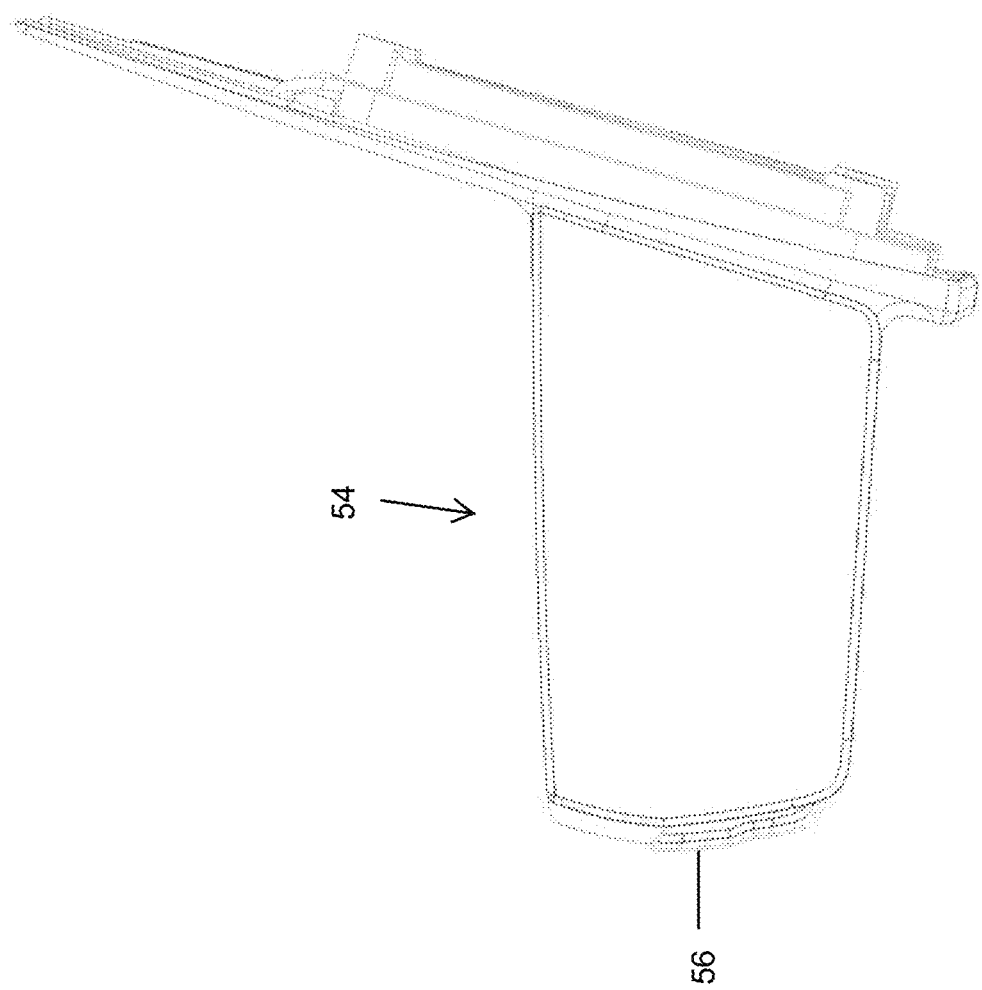
Figure 61:
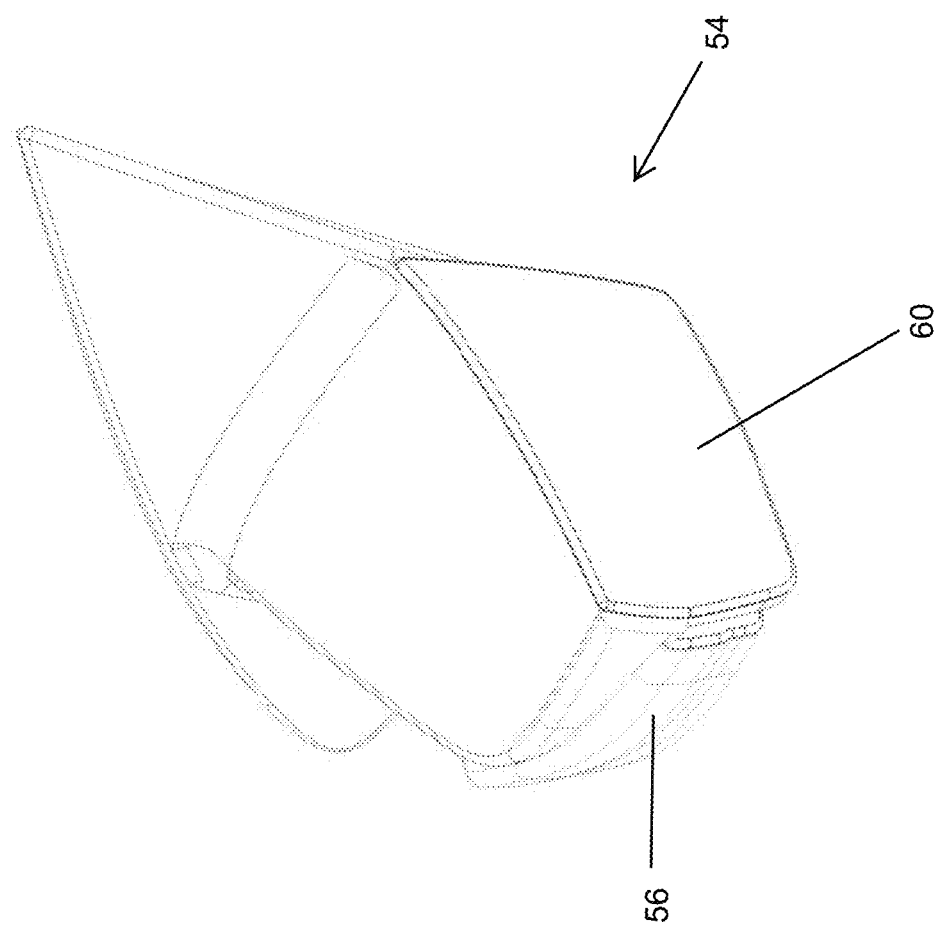
Figure 62:
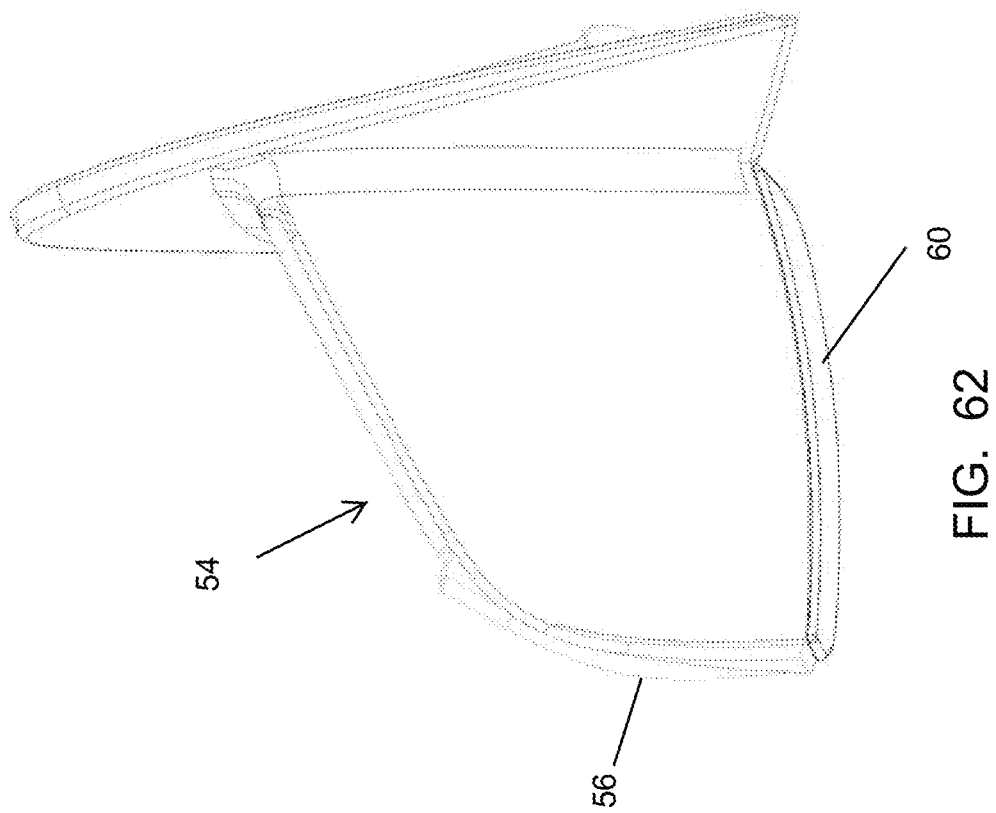
Figure 63:
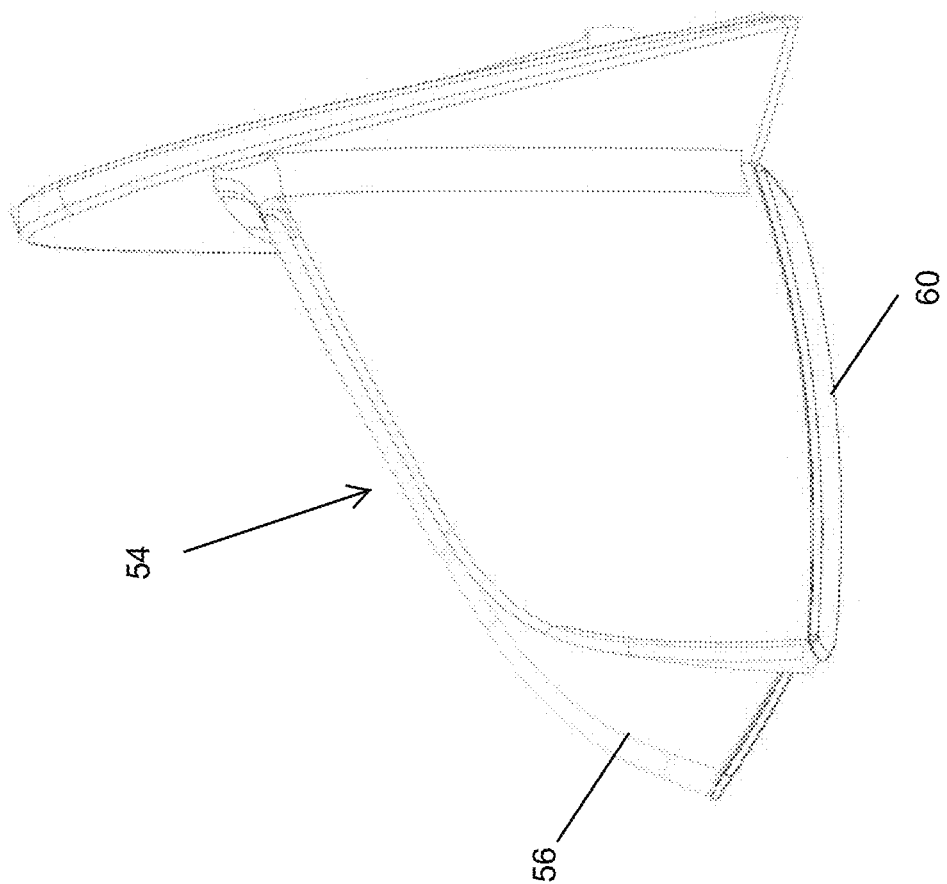

Optionally, and with reference to FIGS. 40 and 41, the camera housing may comprise or include an arm with a pivot near or inside the vehicle body that folds flush to the body when not in use. The arm could be folded in (FIG. 41) when the vehicle is in park to protect the camera. The arm could also be folded in when not needed in certain driving situations such as autonomous driving. For example, when the vehicle takes over from the driver, the arms may be retracted. In order to avoid slow speed collisions with the camera arm (such as, for example, when backing out of a garage), the camera could be used to sense an impending collision and fold out of the way. The arm may provide multiple rotation positions for various driving scenarios. For pulling a trailer, the arm could rotate further outboard (such as shown in FIG. 40) to provide a better field of view along the trailer. For normal driving without the trailer, it could rotate to a smaller angle and still provide adequate field of view alongside and behind the vehicle. The extendable and retractable arm may utilize aspects of the mirror and/or camera systems described in U.S. patent application Ser. No. 15/142,194, filed Apr. 29, 2016, now U.S. Pat. No. 9,676, 336, and/or U.S. Publication Nos. US-2015-0360615 and/or US-2015-0224930, and/or U.S. Pat. Nos. 5,483,385; 6,116, 743; 6,213,609; 6,239,928; 6,276,808; 6,325,518; 6,394,616 and/or 6,497,491, which are hereby incorporated herein by reference in their entireties.

Optionally, and such as shown in FIGS. 42-67, a camera/mirror and display module or unit 50 is configured to mount at a sail portion of a vehicle door, such that the display screen 52 is disposed inside the vehicle and the mirror and camera assembly 54 is disposed at the exterior of the side of the vehicle. The display screen or unit 52 is shown in FIGS. 44-51, while the mirror and camera assembly 54 is shown in FIGS. 52-65. In the illustrated embodiment, the camera is disposed in a flip out element or casing portion 56 that pivots to move the camera between a retracted state (FIGS. 57-62 and 64), where the camera is disposed in the mirror casing and the outer portion of the flip out element provides the outer surface of the mirror casing so as to conceal or render covert the camera, and a protruding or use state (FIGS. 42, 43, 52-56, 63 and 65-67), where the flip out element is flipped outwardly so the camera has an exterior field of view sideward and/or rearward of the vehicle. The mirror 60 of the mirror and camera assembly 54 comprises a curved wide angle mirror so as to provide an auxiliary mirror or blind spot mirror or spotter mirror for the driver. Thus, the profile of the mirror and camera assembly 54 may be substantially reduced as compared to conventional exterior mirrors. FIGS. 68-71 show comparisons of the reduced profile exterior mirror and camera unit as compared to conventional exterior mirrors.

Figure 64:
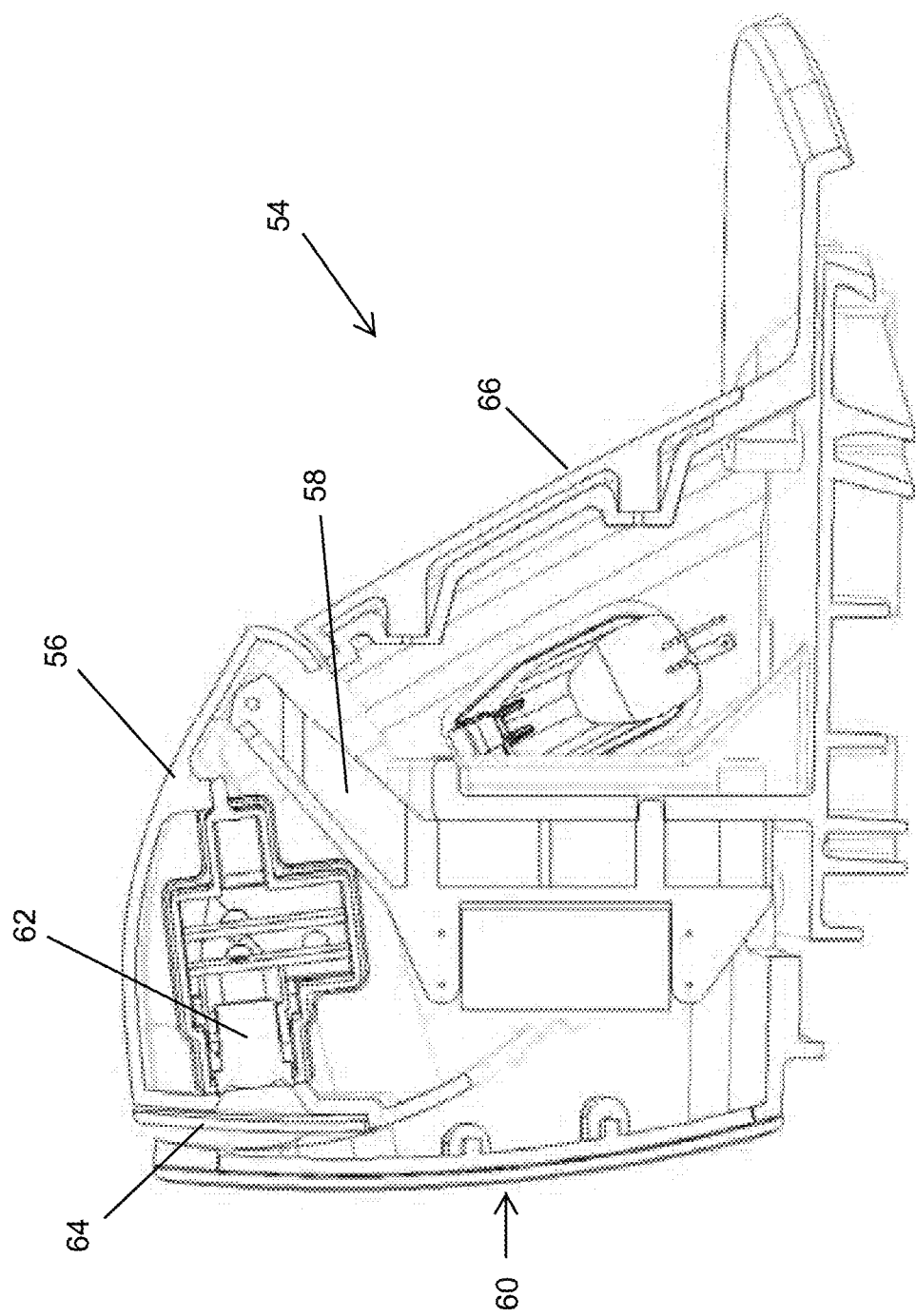
FIG. 64 is a sectional view of the camera and mirror of FIGS. 52-63, showing the camera in a retracted position.
Figure 65:
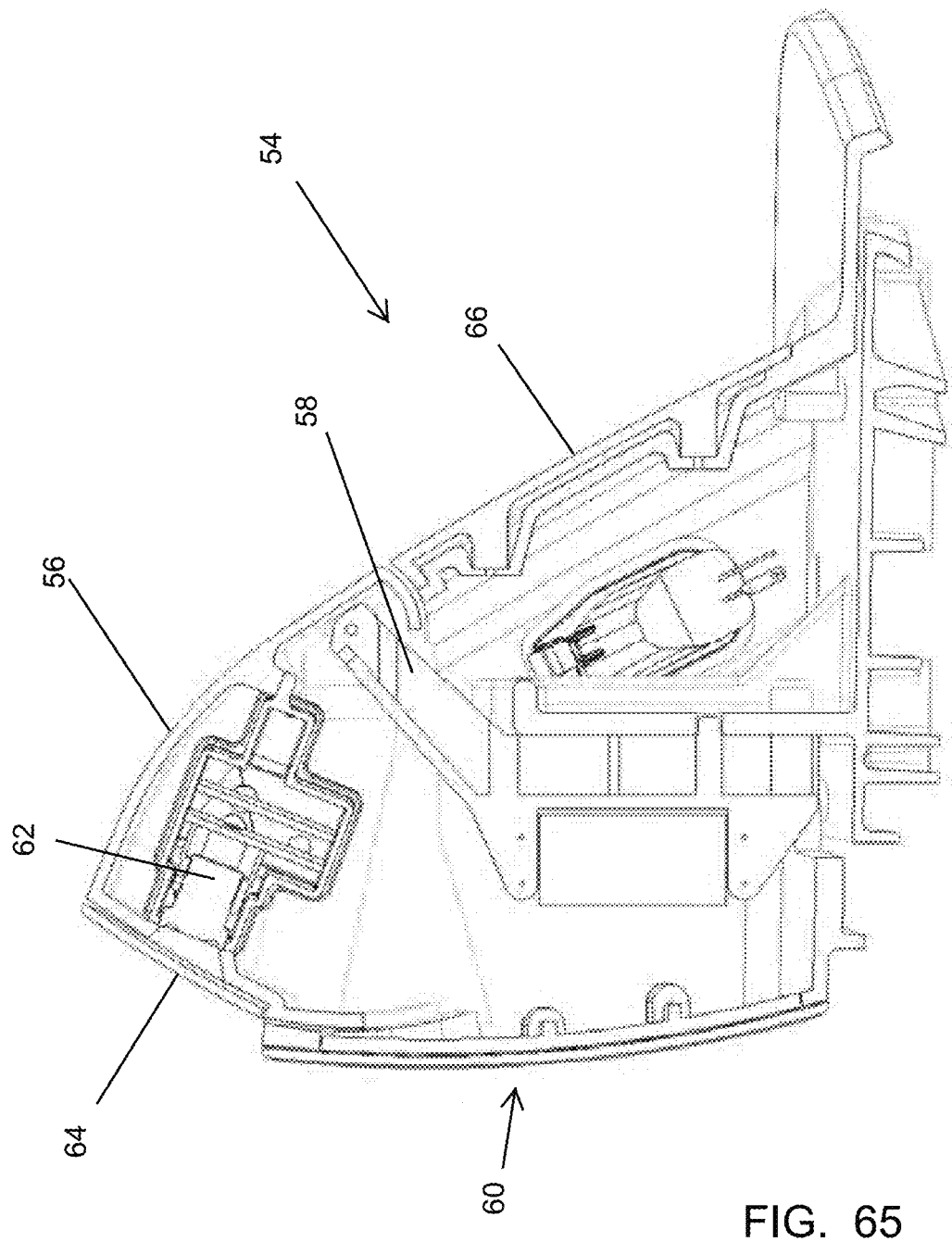
FIG. 65 is another sectional view of the camera and mirror of FIGS. 52-63, showing the camera in its extended position.
Figure 66:
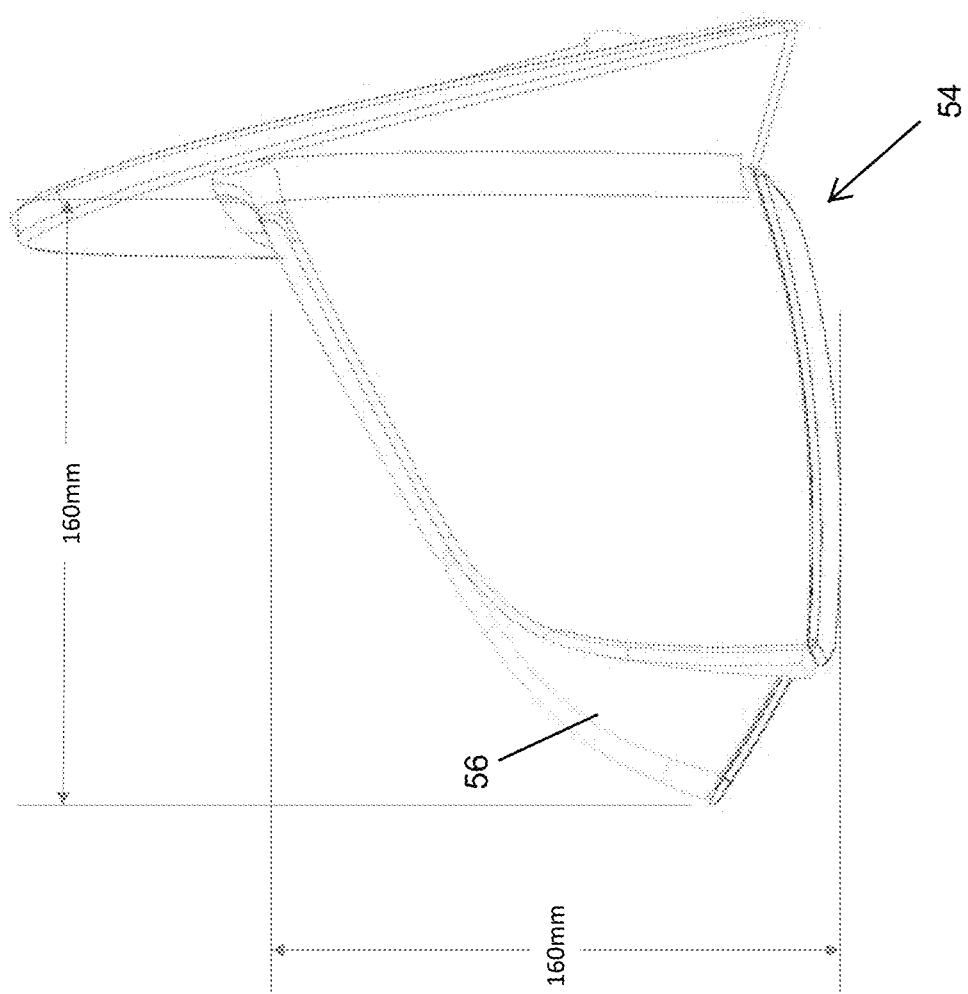
FIG. 66 is a plan view of the camera and mirror of FIGS. 52-63, showing exemplary dimensions.
Figure 67:
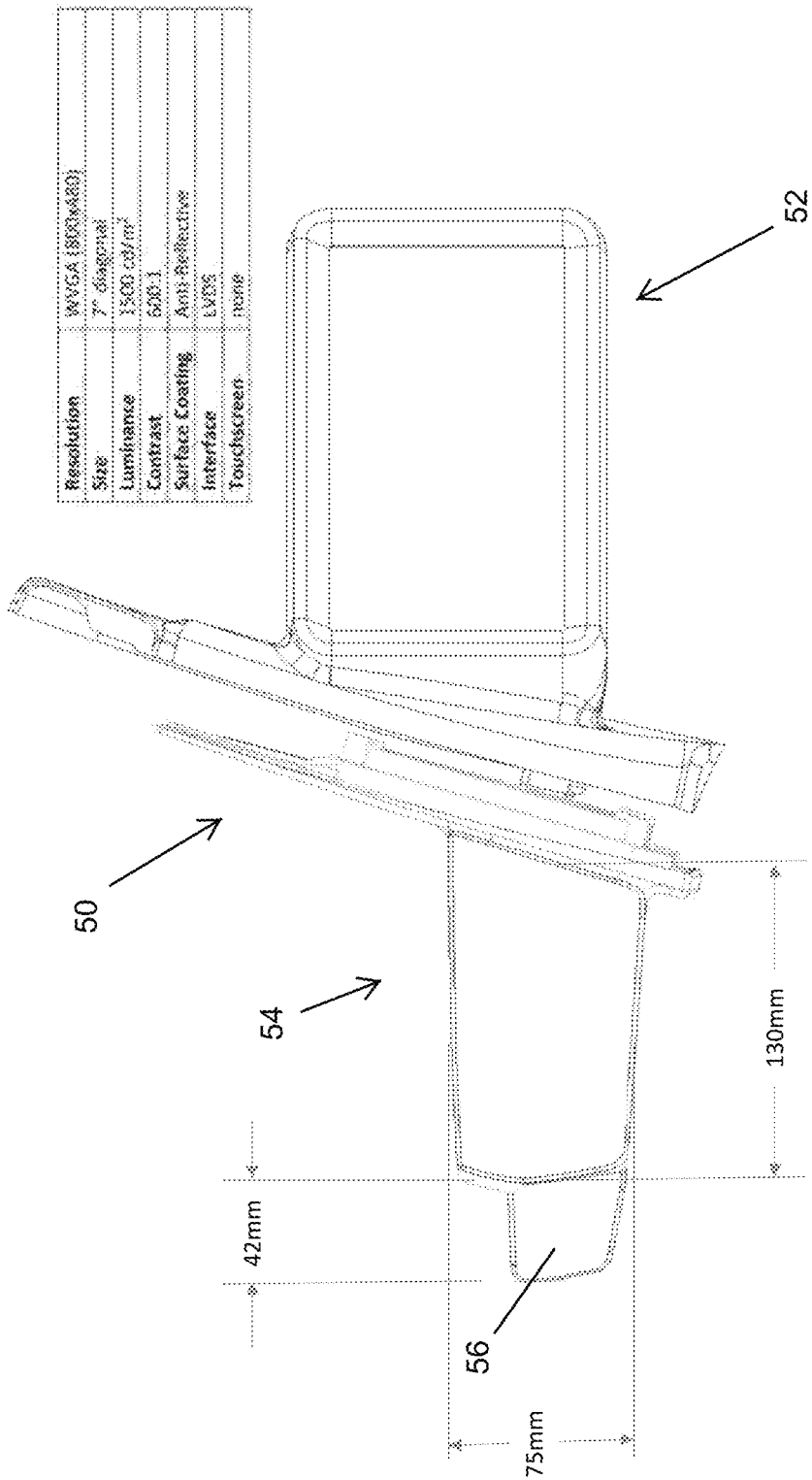
FIG. 67 is a perspective view of the camera and monitor system or module of FIGS. 42 and 43, showing exemplary dimensions.
Figure 68:
Figure 70:
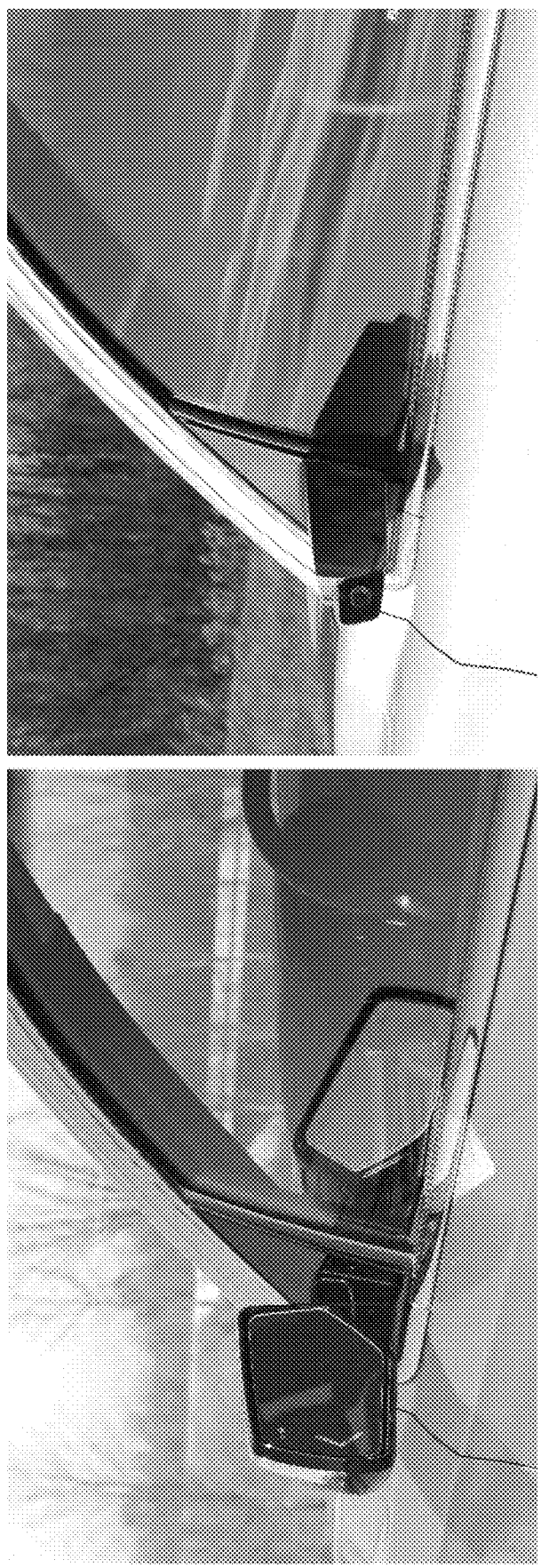

As shown in FIGS. 64 and 65, the flip out portion 56 is pivotally mounted at a structure 58 in the mirror housing or casing 66, whereby the flip out portion pivots about a generally vertical pivot axis. The flip out portion houses the camera module 62 (having an imager and lens) and includes an outer cover element 64 to protect the camera and lens when in the extended or use state. When retracted, the outer surface of the flip out portion 56 generally corresponds with the outer surface of the mirror case 66, and when in its use state, the outer surface of the flip out portion generally corresponds with the outer surface of the front part of the mirror case, such that in both orientations, the flip out portion and mirror case provide a generally continuous outer surface.

Figure 72:
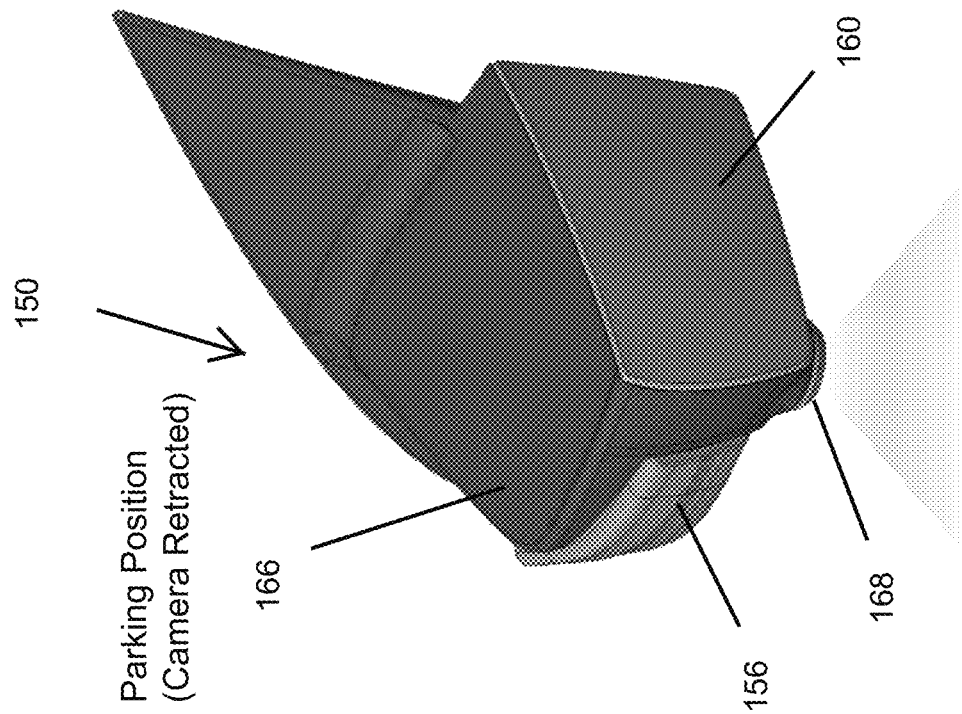
FIG. 72 is a perspective view of another camera and mirror module of the present invention, shown with the camera in an extended position.
Figure 73:
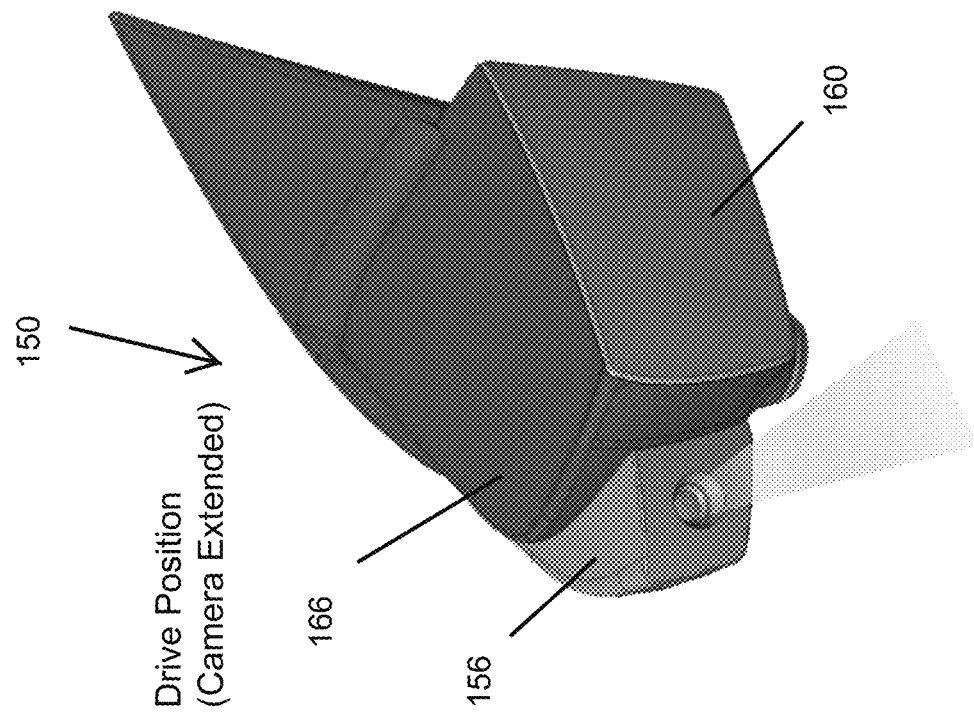
FIG. 73 is another perspective view of the camera and mirror module of FIG. 72, shown with the camera in a retracted position.
Figure 74:
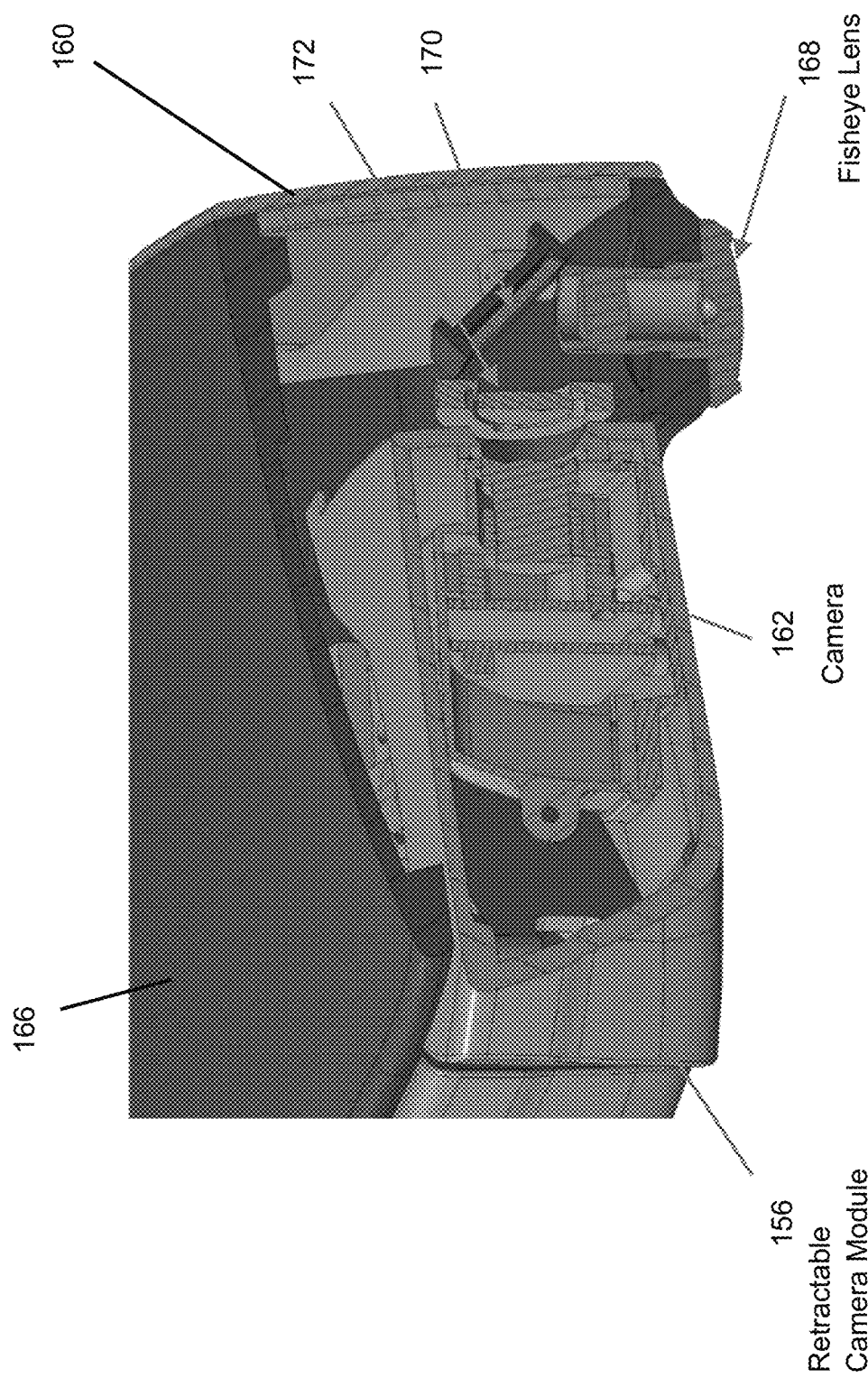
FIG. 74 is a sectional view of the camera and mirror module of FIG. 73.

Optionally, a camera/mirror system of the present invention may provide a camera with a dual view function. For example, and such as shown in FIGS. 72-74, a camera and auxiliary mirror module or unit 150 includes a mirror 160 and mirror case 166, with a camera module 162 in a flip out module or element 156. When the flip out module is flipped outwardly or protruding from the mirror case 166 (FIG. 72), the camera is directed generally rearwardly along the side and rear of the vehicle, and when the flip out module is retracted into the mirror case (FIG. 73), the camera views generally downwardly towards the ground area at the side of the vehicle (such as for a surround view vision system of the vehicle).

As shown in FIG. 74, the module or unit 150 includes a downwardly directed surround lens 168 (such as a fisheye lens) disposed at a lower portion of the mirror casing 166. An angled mirror 170 and a correction lens 172 are disposed along and define an optical path between the camera 162 and the lens 168. Thus, when the camera 162 is retracted, it views through the correction lens 172 and at the mirror element 170 so that the camera views through the lens 168 and towards the ground area at the side of the vehicle.

Figure 77:
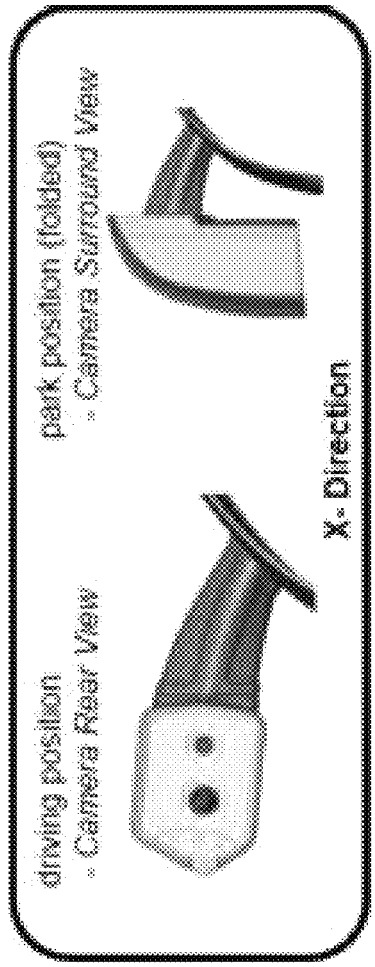
FIG. 77 are views of the camera and mirror module of FIG. 75, shown in the rearward viewing position and in the downward viewing position.
Figure 76:
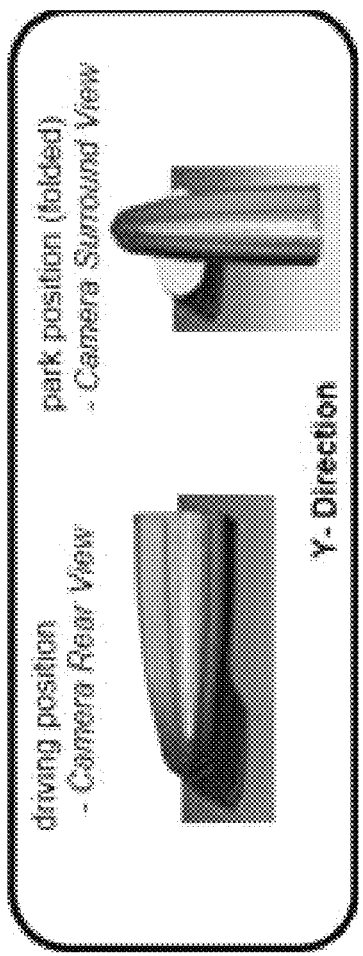
FIG. 76 are views of the camera and mirror module of FIG. 75, shown in the rearward viewing position and in a downward viewing position.
Figure 75:
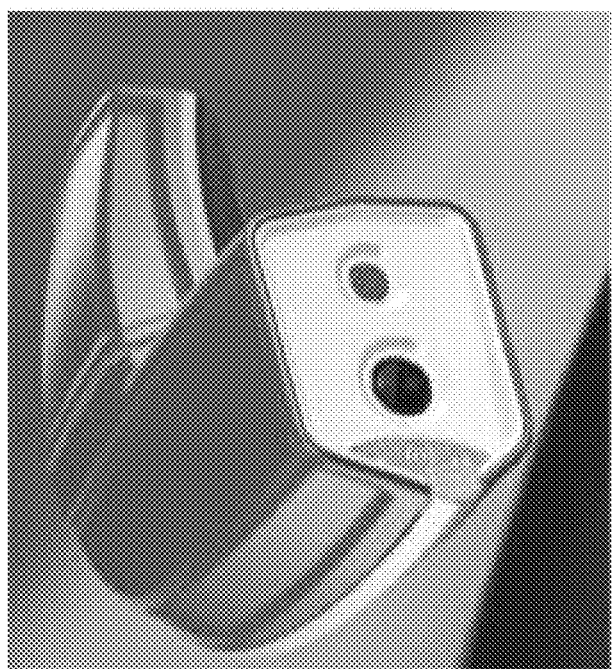
FIG. 75 is a perspective view of another camera and mirror module of the present invention, shown with the camera in a rearward viewing or driving position.

Thus, the present invention uses an optical lens and mirror to change the angle and field-of-view of the camera for function of rearview and surround view (or 360 view). Optionally, and such as shown in FIGS. 75-77, the mirror and camera assembly or module may comprise an arm that rotates between the rearward viewing position (where the camera views rearwardly and/or sidewardly of the vehicle) and the downward viewing position (where the camera views generally downwardly for a surround view vision system). Optionally, the module may have a fixed camera with a wide field of view and a very high resolution (such as greater than 2 MP), and a processor may crop out the rearward portion for the camera/monitor function and show all of the field of view or lower portion of the field of view for the surround view function.

Figure 78:
FIG. 78 is a perspective view of another camera and mirror module of the present invention, shown with the camera disposed behind the mirror reflective element and viewing therethrough.

Optionally, the camera may be located behind the mirror reflective element (rather than behind a separate cover glass), such as shown in FIG. 78. The camera thus provides view through a transflective (partially transmissive and partially reflective) reflective coating at the mirror reflective element, whereby the camera is not viewable by the driver viewing the mirror reflective element. Optionally, a portion of the mirror reflector coating may be ablated or removed to allow the camera to 'see' through the glass/mirror.

In the event that the cameras mounted at the side of the vehicle fail, the electronic control unit (ECU)/monitor may automatically adjust to display images captured by a rear/backup camera or other camera mounted at the rear of the vehicle (such as a full-size-video display interior mirror camera or the like). Then, even when the camera fails, the side view monitor or display may still display images relevant to the driver of the vehicle to assist in driving the vehicle. The display may display a message or alert to warn the driver that the displayed images are derived from a different camera than the side camera associated with that monitor or display.

A high dynamic range imager (>100 dB) is recommended to produce sufficient quality images for the CMS. Some example scene dynamic ranges are shown below:

| Scene | Dynamic Range |
| --- | --- |
| Night time | 100 dB |
| Exiting a parking ramp | 70 dB |
| Daylight - typical road scene | 20 dB |
| Daylight - overpass | 41 dB |

Imagers with different dynamic ranges were tested to evaluate performance in these types of scenarios. For example, the Aptina AR0132AT has 115 dB HDR and 1.2 MP resolution, and the MT9V023 has approximately 60 dB dynamic range and is VGA (640×480) resolution.

A 1.2 MP or greater resolution is desired to ensure sufficient image quality. High resolution is desirable for the dynamic FOV user interface since the image is cropped and scaled when showing the narrow FOV. Higher resolution will also improve algorithm performance for vehicles at further distances.

Tone mapping is desired to convert the high dynamic range image into the dynamic range of the display. Tone mapping is not required on the processing unit. The Aptina AR0132AT includes a co-processor (AP101AT) while the Omnivision OV10640 does tone mapping within the imager. Either of these architectures is acceptable for the CMS of the present invention.

A 45 degree system FOV is achievable without introducing a large amount of image distortion. This eliminates the need for the image to be post-processed to remove distortion. It is recommended that the have less than about three percent distortion.

Care should be taken when designing or selecting the lens and mount to ensure that they can maintain sufficient image quality over the required temperature range. The design must have an athermalized optical stack. An athermalized optical stack has minimized performance variation over temperature. It requires careful choice of the materials and distribution of the optical powers. Athermalization can be accomplished with same-material designs that maintain performance by scaling as the temperature changes, with dissimilar materials (called passive athermalization) which often scale in opposite directions as the temperature changes, or with active control of focus where the focus of the system is adjusted with temperature, usually with motor-driven mechanisms. Generally, athermalized optical stacks do not include plastic components. It may also be advantageous to incorporate an optical stack heater that can minimize the temperature swing the optical stack experiences. Including a heater may have the added benefit of providing some de-frost capability.

Figure 79:
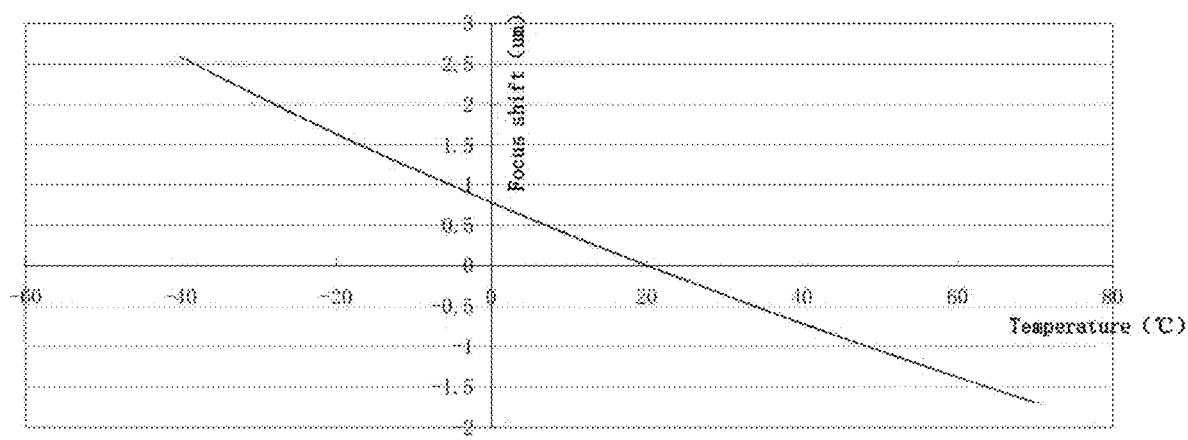
FIG. 79 is a graph showing focus shift relative to temperature for an example temperature stable lens suitable for use in the system of the present invention.

FIG. 79 shows focus shift over temperature for an example temperature stable lens. The amount of tolerable focus shift is a function of the required image quality, the size of the image sensor pixel, and the required manufacturing tolerances.

The role of the algorithms is to process the incoming images from the camera and determine information about the scene that is then provided to the driver through the UI. Depending on the UI concept that is implemented, the algorithm requirements will be different. The following table relates the UI features to the required algorithm functions.

| UI Feature | Algorithm Function Required |
|---|---|
| Smart Overlay - Vehicle Masking | Detect vehicle and its extents |
| Smart Overlay - Scenario Detection | Adjacent valid lane detection |
| Dynamic FOV - Blind Spot Indicator | Blind spot detection |
| Wide FOV - Distance Indication Bar | Accurate vehicle distance estimation |

Vehicle detection is used to mask off the overlays and is an input to distance estimation. In order to mask overlays, vehicle detection should be able to determine which pixels in the image correspond to a vehicle. Detection is only required in the lane immediately next to the CMS. An area of up to a selected number pixels around the vehicle may be misclassified. Vehicle detection should function at distances up to 75 feet from the rear bumper. Vehicle detection must be able to detect a range of vehicle types, including passenger cars, trucks, semi-trucks, and motorcycles.

Adjacent lane detection is used to enable or disable the overlay depending on whether there is a valid lane beside the CMS. Adjacent lane detection may determine whether the lane beside the CMS is a lane which may contain vehicles traveling in the same direction as the CMS vehicle.

Blind spot detection is used to activate the blind spot warning for the dynamic FOV concept. Blind spot detection may determine whether a vehicle is located in the lane beside the CMS. A vehicle should be detected as in the blind spot until it enters the peripheral vision of the driver and/or exits the FOV of the camera.

Distance estimation is used to control the distance bar in the wide FOV UI concept. It is only required for vehicles which are successfully detected by the vehicle detection algorithm. Distance estimation may detect the distance between another vehicle and the rear bumper of the vehicle with the CMS. Distance estimations may only be required for vehicles within the overlay area. Distance estimation may function for distances ranging from about 0 feet to about 75 feet from the rear bumper of the equipped vehicle.

There are two broad categories of algorithms for vehicle and blind spot detection: appearance and motion. Appearance based approaches attempt to detect vehicle based on how they look. These techniques tend to be based on processing of a single frame of captured image data. Two further sub-categories are heuristic and learned algorithms. Heuristic algorithms attempt to detect vehicles based on features that are humanly visible, such as symmetry, shadows, entropy, and the like. Learned algorithms typically include extracting a generic high level description of an area and then running the features through a classification model to determine whether the area contains a vehicle or not. The classification model is learned by 'showing' the algorithm large numbers of positive and negative example areas.

Motion based approaches use information frame to frame in order to describe the motion that is occurring in a scene. Typically this is done with optical flow. These approaches look for areas of the image which exhibit motion either relative to the ego vehicle or relative to the ground. Some additional filtering of these areas is typically done by requiring certain sizes and persistence in order to reduce false positive detections.

| | Benefits | Drawbacks |
|---|---|---|
| Appearance Based - Heuristic | Simple to implement  Low processing requirements | Susceptible to lighting and weather variations  Susceptible to false positives  Separate night algorithm required |
| Appearance Based - | Highest potential performance | Large dataset |

|  | Benefits | Drawbacks |
| --- | --- | --- |
| Learned | Can be applied to both day and night | Can be computationally expensive<br>May need multiple classifiers for different perspectives |
| Motion Based | Small dataset<br>Single approach for different perspectives | Computationally expensive<br>Susceptible to false positives (vibration, road variation, etc.)<br>Poor performance in low light (i.e. only headlights visible |

There are two broad categories of algorithms for distance estimation with a monocular camera: size and position. Within these categories there are a very wide range of approaches to improve accuracy and robustness. Detecting distance based on size is problematic due to the wide range of vehicle sizes. The width of vehicles may vary from about 1.4 m to about 2.6 m, which can result in errors up to 30 percent. This does not mean that size cannot be used at all, but it does highlight that it may only be one piece of a distance estimation solution.

Detecting distance based on position can provide good results but there are a number of aspects which degrade system performance. One of the primary issues is that a 'flat road' assumption is typically made, which is violated significantly when hills are present. To combat this, some estimation of the horizon can be done to correct for changes in the angle of the camera relative to the ground. The method is also sensitive to camera calibration, particularly as the detection distance increases.

A display with about a 6.5 inch diagonal or greater is desired. Magnification is one of the primary factors when selecting display size. The following table shows some example FOV and display size combinations along with the driver side magnification.

| FOV (degrees) | Display Size (in) | Magnification |
| --- | --- | --- |
| 15 | 5 | 2:1 |
| 15 | 6.5 | 1.5:1 |
| 15 | 8 | 1:1 |
| 46 | 5 | 6:1 |
| 46 | 6.5 | 4.6:1 |
| 46 | 8 | 3:1 |

Comparisons between anti-glare and anti-reflection coatings have been conducted to evaluate the relative performance. Anti-reflection coating performs significantly better under direct sunlight.

Brightness can help improve contrast in high brightness situations, but significantly less so than a high performance coating. If an anti-reflective (AR) coating is used, the brightness required is significantly less than an anti-glare (AG) coating. For the AG displays, the contrast is improved by approximately 0.3 per 1000 cd/m$^2$ increase in brightness for direct sunlight.

Camera 20 may comprise any suitable imaging sensor or camera, such as a pixelated imaging array or the like, such as a CMOS imaging array sensor, a CCD sensor or other sensors or the like, such as a camera or sensor of the types disclosed in commonly assigned, U.S. Pat. Nos. 7,965,336; 5,550,677; 5,760,962; 6,097,023 and 5,796,094, which are hereby incorporated herein by reference in their entireties. Optionally, the camera may comprise a stereo imaging camera or the like, such as by utilizing aspects of the imaging systems described in U.S. Pat. Nos. 6,396,397 and/or 5,796,094, which are hereby incorporated herein by reference in their entireties.

Optionally, the camera may comprise an infrared or near infrared light sensitive camera and may be suitable for capturing images in low lighting conditions, and/or the camera may include or be associated with an illumination source (such as an infrared or near-infrared light emitting illumination source that, when actuated to emit infrared or near-infrared light at the side of the vehicle, enhances the camera's performance but is not visible or discernible to the driver of the vehicle), such as by utilizing aspects of the cameras described in U.S. Pat. Nos. 7,965,336; 5,550,677; 5,760,962; 6,097,023 and 5,796,094, which are hereby incorporated herein by reference in their entireties.

Although shown and described as being incorporated at the exterior rearview mirror assembly, it is envisioned that the camera may be disposed elsewhere at the vehicle, such as at a side portion of the vehicle, and having a sideward and rearward field of view. Optionally, the camera may have a wide angle field of view at the side of the vehicle and/or may have an adjustable field of view and/or may capture images for use in other vision systems, such as for use in a top-down view or bird's-eye view vision system of the vehicle or a surround view vision system at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Optionally, the display may be mounted elsewhere in the vehicle and/or at the vehicle door or vehicle door opening, such as at the A pillar of the vehicle, or at the top of the instrument panel of the vehicle, or at the steering column of the vehicle, or at or in the headliner of the vehicle and/or the like. Optionally, as an alternative to a self-contained display monitor, the mirror and camera and display system of the present invention may provide a docking station (such as at or near the vehicle door and/or door opening of the vehicle) for a cell phone (or tablet or other personal portable display capable device), where the cell phone or personal display device may be docked or connected so that the display screen of the personal display device may function as the display and may display the images captured by the camera.

The display screen 22 preferably displays the captured video images at the entire viewable portion of the display screen, in order to provide relatively large displayed images for viewing by the driver of the vehicle while the driver is normally operating the vehicle. In the illustrated embodiment, the user inputs are touch or proximity sensors disposed at a portion of the display screen. The video display screen, when normally operating to display video images captured by the mirror camera 20, may display the video images over the entire display portion or active portion of the display screen and, responsive to a user input (such as a user or driver touching a portion of the display screen or touch screen), may display icons or indicia at a portion of the display screen 22 to indicate where the user can touch to actuate or control the display settings or the like. The user inputs or touch sensors may comprise any suitable sensors or inputs, and may utilize aspects of the inputs and sensors described in U.S. Pat. Nos. 7,224,324; 7,253,723; 7,255,451 and/or 8,154,418, and/or International Publication Nos. WO 2012/051500; WO 2010/124064; WO 2011/044312; WO 2013/071070 and/or WO 2013/126719, which are hereby incorporated herein by reference in their entireties.

Optionally, the vision system 10 may include or be associated with a blind spot monitoring or side object detection system that detects the presence of an object or vehicle in the side lane adjacent to the vehicle and that generates an alert to the driver of the vehicle to alert the driver of the detected object or vehicle if the driver is making a lane change into the side lane where the object or vehicle is detected in or approaching. The display screen 22 may be operable to display alerts or warnings or graphic overlays to indicate to the driver that a vehicle or object is detected in the side lane or that the driver is making an unsafe lane change or the like. Thus, the alert or indication at the display screen may function as a lane change assist (LCA) indicator or indicators and/or a blind spot indicator or indicators. The blind spot alerts may be activated when an object is detected (such as via utilizing aspects of the side object or blind spot detection systems or the like such as described in U.S. Pat. Nos. 7,881,496; 7,492,281; 7,720,580; 7,038,577; 6,882,287; 6,198,409; 5,929,786 and/or 5,786,772, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the alert or indication may function as a lane change assist alert or indication, where the host vehicle may be detected to be moving into an adjacent lane without the turn signal being activated, and an object or vehicle may be detected at the adjacent lane, whereby the LCA alert may be activated and displayed at the display screen to provide an alert to the driver of the lane change to assist the driver in avoiding unintentional lane changes and/or lane changes when a vehicle or object is detected in the adjacent lane.

The exterior video mirror of the present invention thus replaces a spotter mirror at an exterior rearview mirror assembly with a small video display screen (such as a small thin film transistor (TFT) video display screen or the like) and controller electronics for controlling and operating the video display screen. The video display screen is operable to display video images, such as images captured by a side camera of the vehicle so that the video display screen displays images of the side region or blind zone of the vehicle, or may display other display information for viewing by the driver of the vehicle while normally operating the vehicle. The exterior mirror video display may provide a display with a low-cost graphic controller, which provides flexibility and integration of features. For example, the video display may be turned on or off depending on the desires or needs of the driver so that, when a wide angle spotter mirror is not desired, the entire exterior mirror reflective element surface area may be used to provide the driver with a rearward field of view (whereas a typical wide angle spotter mirror is always present and taking up a portion or corner region of the mirror reflective element regardless of whether or not the driver wishes to use the wide angle spotter reflector.

Also, the video display screen of the present invention allows the displayed content at the wide angle spotter region of the mirror assembly to be varied or selected to display information appropriate to the current driving conditions or as the driver and/or manufacturer has selected. For example, when the vehicle is being normally driven on a road, the video display may be operable to display the view gathered by a blindzone or other rearward-facing camera of the vehicle. Optionally, for example, when an approaching vehicle enters the blindzone area of the equipped vehicle, the video display screen may be operable to display a warning icon or the like to alert the driver of the vehicle (and may provide a graphic overlay or may otherwise highlight a detected object or vehicle, such as by changing the color of or brightness of the detected object or vehicle, to enhance the driver's cognitive awareness of the detected object or vehicle). Optionally, the video display screen may be operable or selectively operable to display other information or alerts or warnings or the like, such as in response to one or more sensors or data inputs, and may display information such as range-to-object, tire pressure, road hazards, lane departure warnings, and/or the like. Optionally, the video display screen may be operable to display an auxiliary blinker or turn signal indicator (and thus obviating other fixed LEDs or the like that are typically used to provide such a function). Optionally, the video display screen may display vehicle information or brand information, such as for part of an automobile manufacture's branding or "surprise-and-delight" feature, where the display screen may function to display logos or other graphics that may be displayed when the user activates a key fob or when the ignition is activated to start the vehicle or the like. Thus, the video display screen may operate to display a wide angle spotter field of view and may display an alert or icon or the like and may display other information for viewing by the driver of the vehicle, all via a single display screen disposed at a wide angle spotter mirror reflector region of the exterior rearview mirror assembly (thereby obviating other display devices or backlighting elements or the like at or in the rearview mirror assembly).

Optionally, the display may utilize aspects of the displays of the types disclosed in U.S. Pat. Nos. 5,530,240 and/or 6,329,925, which are hereby incorporated herein by reference in their entireties, and/or of display-on-demand or transflective type displays, such as the types disclosed in U.S. Pat. Nos. 7,855,755; 7,777,611; 7,626,749; 7,581,859; 7,446,924; 7,446,650; 7,370,983; 7,338,177; 7,274,501; 7,255,451; 7,195,381; 7,184,190; 6,690,268; 5,668,663 and/or 5,724,187, and/or in U.S. Publication No. US-2006-0050018, and/or International Publication No. WO 2004/058540, which are all hereby incorporated herein by reference in their entireties. The display may be viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like.

Optionally, the exterior rearview mirror assembly may also or otherwise include another accessory thereat, such as a blind spot indicator and/or a turn signal indicator and/or a light module or assembly and/or the like (such as indicators and lighting devices that may utilize aspects of the devices described in U.S. Pat. Nos. 8,764,256; 8,333,492; 7,581,859; 7,289,037; 6,227,689; 6,582,109; 5,371,659; 5,497,306; 5,669,699; 5,823,654; 6,176,602 and/or 6,276,821, and/or U.S. Publication No. US-2006-0061008, and/or International Publication No. WO 2006/124682, which are all hereby incorporated herein by reference in their entireties. Optionally, the exterior rearview mirror assembly may include a wide angle reflector at or integral with the reflective element, such as by utilizing aspects of the elements described in U.S. Pat. Nos. 7,748,856; 7,255,451; 7,195,381; 6,717,712; 7,126,456; 6,315,419; 7,097,312 and/or 6,522,451, which are hereby incorporated herein by reference in their entireties.

Although shown and described as being located at a driver side exterior mirror, the exterior mirror wide angle display of the present invention may also or otherwise be located at the passenger side exterior mirror, if desired. The display screen and control may utilize aspects of the blind spot detection systems described in U.S. Pat. Nos. 8,786,704; 7,720,580; 7,626,749; 7,581,859; 7,492,281; 7,038,577; 6,882,287; 6,198,409; 5,929,786 and/or 5,786,772, and/or U.S. Publication No. US-2006-0061008, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular vision system, said vehicular vision system comprising:
   a camera disposed at an exterior portion of a body side of a vehicle equipped with said vehicular vision system, said camera viewing at least sideward and rearward of the equipped vehicle;
   wherein, with the equipped vehicle traveling along a traffic lane of a road, said camera views an exterior scene that includes at least (i) a portion of the body side of the equipped vehicle at which said camera is mounted and (ii) a portion of another traffic lane adjacent to the traffic lane along which the equipped vehicle is traveling;
   wherein said camera captures frames of image data;
   a control disposed at the equipped vehicle, said control comprising an image processor for processing frames of image data captured by said camera;
   a video display screen disposed in an interior cabin of the equipped vehicle and viewable by a driver of the equipped vehicle seated in a driver seat of the equipped vehicle;
   wherein the video display screen is disposed laterally sideward from a longitudinal centerline of the equipped vehicle toward the body side of the equipped vehicle at which said camera is disposed;
   wherein the video display screen displays video images derived from frames of image data captured by said camera;
   wherein the displayed video images are representative of at least a portion of the exterior scene viewed by said camera;
   wherein said control is operable to determine presence of another vehicle traveling along the other traffic lane of the road;
   wherein, as the equipped vehicle is driven along the road, and when said control does not determine presence of another vehicle traveling along the other traffic lane, the video display screen displays video images representative of a first portion of the exterior scene viewed by said camera;
   wherein the displayed video images representative of the first portion show to the driver viewing the video display screen the first portion of the exterior scene viewed by said camera;
   wherein, as the equipped vehicle is driven along the road, and responsive to determination by said control that another vehicle is traveling along the other traffic lane and is approaching the equipped vehicle from rearward of the equipped vehicle, the video display screen displays video images representative of a second portion of the exterior scene viewed by said camera, the second portion of the exterior scene viewed by said camera including the determined other vehicle;
   wherein the displayed video images representative of the second portion show to the driver viewing the video display screen the second portion of the exterior scene viewed by said camera;
   wherein the second portion of the exterior scene viewed by said camera is a smaller portion of the exterior scene viewed by said camera than is the first portion of the exterior scene viewed by said camera;
   wherein, as the equipped vehicle is driven along the road, and responsive to the determination by said control that the other vehicle is traveling along the other traffic lane and is approaching the equipped vehicle from rearward of the equipped vehicle, the video display screen displays a graphic overlay overlaying the displayed video images representative of the second portion of the exterior scene to indicate to the driver of the equipped vehicle location of the determined other vehicle relative to the body side of the equipped vehicle at which said camera is disposed;
   wherein the displayed graphic overlay comprises a perspectively-rendered overlay having a longitudinally extending line segment that is parallel to a displayed body side portion of the equipped vehicle and a plurality of laterally extending line segments that extend laterally outwardly from the longitudinally extending line segment at spaced apart intervals along the longitudinally extending line segment;
   wherein the longitudinally extending line segment as shown to driver of the equipped vehicle viewing the video display screen is spaced at a displayed distance representative of three feet or less from the displayed body side portion of the equipped vehicle; and
   wherein frames of image data captured by said camera are processed at said control to limit flickering in the video images as displayed at the video display screen.

2. The vehicular vision system of claim 1, wherein the video display screen has a display area viewable by the driver, and wherein, when the video display screen displays video images representative of the first portion of the exterior scene viewed by said camera, the displayed video images representative of first portion of the exterior scene fill the display area of the video display screen.

3. The vehicular vision system of claim 2, wherein, when the video display screen displays video images representative of the second portion of the exterior scene viewed by said camera, the displayed video images representative of second portion of the exterior scene fill the display area of the video display screen.

4. The vehicular vision system of claim 1, wherein said control determines presence of the other vehicle traveling along the other traffic lane of the road via processing at said control of frames of image data captured by said camera.

5. The vehicular vision system of claim 1, wherein said control determines presence of the other vehicle traveling along the other traffic lane of the road via a blind spot detection system of the equipped vehicle.

6. The vehicular vision system of claim 1, wherein the displayed video images are derived from a rolling average of frames of image data captured by said camera to limit flickering in the video images as displayed at the video display screen.

7. The vehicular vision system of claim 1, wherein the plurality of laterally extending line segments comprises a closest laterally extending line segment that appears closer to the rear of the equipped vehicle when displayed on the video display screen than any other of the laterally extending line segments of the plurality of laterally extending line segments, and wherein the closest laterally extending line segment is spaced on the video display screen at a distance representative of at least twelve feet rearward of the equipped vehicle.

8. The vehicular vision system of claim 1, wherein said control adjusts the displayed portion of the exterior scene that is being displayed by the video display screen responsive at least in part to a driver monitoring system of the equipped vehicle.

9. The vehicular vision system of claim 8, wherein said control adjusts the displayed portion of the exterior scene that is being displayed by the video display screen responsive at least in part to determination by the driver monitoring system of the equipped vehicle of a movement of a head of the driver of the equipped vehicle.

10. The vehicular vision system of claim 1, wherein said control adjusts the displayed portion of the exterior scene that is being displayed by the video display screen responsive at least in part to a global positioning system of the equipped vehicle.

11. The vehicular vision system of claim 1, wherein said control adjusts the displayed portion of the exterior scene that is being displayed by the video display screen responsive at least in part to actuation of a turn signal indicator of the equipped vehicle.

12. The vehicular vision system of claim 1, wherein said control adjusts the displayed portion of the exterior scene that is being displayed by the video display screen responsive at least in part to a lane departure detection system of the equipped vehicle.

13. The vehicular vision system of claim 1, wherein said control adjusts the displayed portion of the exterior scene that is being displayed by the video display screen responsive at least in part to a blind spot detection system of the equipped vehicle.

14. The vehicular vision system of claim 1, wherein the video display screen comprises a driver-side display disposed left of the driver of the equipped vehicle toward a left body side of the equipped vehicle.

15. The vehicular vision system of claim 14, wherein the video display screen is disposed between the driver of the equipped vehicle and a driver-side A-pillar of the equipped vehicle.

16. The vehicular vision system of claim 1, wherein the video display screen comprises a passenger-side display disposed right of the longitudinal centerline of the equipped vehicle toward a right body side of the equipped vehicle.

17. The vehicular vision system of claim 16, wherein the video display screen is disposed between the longitudinal centerline of the equipped vehicle and a passenger-side A-pillar of the equipped vehicle.

18. The vehicular vision system of claim 1, wherein the laterally extending line segments of the graphic overlay extend laterally and at least partially overlay a video-displayed side lane region adjacent to the equipped vehicle.

19. The vehicular vision system of claim 18, wherein the laterally extending line segments of the graphic overlay are different color from one another and are color-coded to indicate degree of potential hazard.

20. The vehicular vision system of claim 1, wherein spacing between the laterally extending line segments of the graphic overlay is varied responsive at least in part to a speed of the equipped vehicle.

21. The vehicular vision system of claim 1, wherein the graphic overlay comprises an alert icon that changes responsive to a determination by said vehicular vision system of a lane change risk based at least in part on determination that the other vehicle is traveling along the other traffic lane and is approaching the equipped vehicle from rearward of the equipped vehicle.

22. The vehicular vision system of claim 1, wherein the graphic overlay comprises a distance indicator that enhances the driver's ability to determine a distance to the determined other vehicle displayed by the video display screen.

23. The vehicular vision system of claim 1, wherein, responsive to a determination by said vehicular vision system of a lane change risk based at least in part on determination that the other vehicle is traveling along the other traffic lane and is approaching the equipped vehicle from rearward of the equipped vehicle, the graphic overlay comprises an alert bar that indicates a degree of the lane change risk.

24. The vehicular vision system of claim 1, wherein responsive to a determination by said vehicular vision system of a lane change risk based at least in part on determination that the other vehicle is traveling along the other traffic lane and is approaching the equipped vehicle from rearward of the equipped vehicle, the video display screen changes a tint of the displayed video images based on the determined lane change risk.

25. The vehicular vision system of claim 1, wherein, responsive to determination that the other vehicle is traveling along the other traffic lane and is approaching the equipped vehicle from rearward of the equipped vehicle, the video display screen also displays video images representative of the first portion of the exterior scene viewed by said camera.

26. The vehicular vision system of claim 25, wherein the displayed video images representative of the second portion of the exterior scene viewed by said camera are displayed at a portion of a display area of the video display screen while the video display screen also displays video images representative of the first portion of the exterior scene viewed by said camera at another portion of the display area of the video display screen.

27. The vehicular vision system of claim 26, wherein, when the video display screen displays video images representative of the second portion of the exterior scene viewed by said camera, the video display screen displays an overlay demarcating the displayed video images representative of the first portion of the exterior scene viewed by said camera.

28. The vehicular vision system of claim 1, wherein, when the video display screen displays video images representative of the second portion of the exterior scene viewed by said camera, the video display screen does not display video images representative of the first portion of the exterior scene viewed by said camera.

29. The vehicular vision system of claim 1, further comprising a camera support arm comprising (i) a pivot end that is pivotally mounted at the exterior portion of the body side of the equipped vehicle and (ii) a distal end distal from the pivot end, wherein said camera is disposed at the distal end of said camera support arm, and wherein said camera support arm is pivotable between an extended position, where said camera support arm extends laterally outward from the exterior portion of the body side of the equipped vehicle, and a folded position, where said camera support arm is folded at the exterior portion of the body side of the equipped vehicle.

30. The vehicular vision system of claim 29, wherein, with said camera support arm in the folded position, said camera support arm is disposed at least partially within the exterior portion of the body side of the equipped vehicle.

31. A vehicular vision system, said vehicular vision system comprising:
  a left-side camera disposed at an exterior portion of a left-body side of a vehicle equipped with said vehicular vision system, said left-side camera viewing at least sideward and rearward of the equipped vehicle;
  wherein, with the equipped vehicle traveling along a traffic lane of a road, said left-side camera views a left-side exterior scene that includes at least (i) a portion of the left-body side of the equipped vehicle and (ii) a portion of a left-side traffic lane adjacent to the traffic lane along which the equipped vehicle is traveling;
  wherein said left-side camera captures frames of image data;
  a right-side camera disposed at an exterior portion of a right-body side of the equipped vehicle, said right-side camera viewing at least sideward and rearward of the equipped vehicle;
  wherein, with the equipped vehicle traveling along the traffic lane of the road, said right-side camera views a right-side exterior scene that includes at least (i) a portion of the right-body side of the equipped vehicle and (ii) a portion of a right-side traffic lane adjacent to the traffic lane along which the equipped vehicle is traveling;
  wherein said right-side camera captures frames of image data;
  a control disposed at the equipped vehicle, said control comprising an image processor for processing frames of image data captured by said left-side camera and for processing frames of image data captured by said right-side camera;
  a left-side video display screen disposed in an interior cabin of the equipped vehicle and viewable by a driver of the equipped vehicle seated in a driver seat of the equipped vehicle;
  wherein the left-side video display screen is disposed laterally leftward relative to a longitudinal centerline of the equipped vehicle toward the left-body side of the equipped vehicle and left of the driver of the equipped vehicle;
  wherein the left-side video display screen displays video images derived from frames of image data captured by said left-side camera;
  wherein the video images displayed by the left-side video display screen are representative of at least a portion of the left-side exterior scene viewed by said left-side camera;
  a right-side video display screen disposed in the interior cabin of the equipped vehicle and viewable by the driver of the equipped vehicle;
  wherein the right-side video display screen is disposed laterally rightward relative to the longitudinal centerline of the equipped vehicle toward the right-body side of the equipped vehicle and right of the driver of the equipped vehicle;
  wherein the right-side video display screen displays video images derived from frames of image data captured by said right-side camera;
  wherein the video images displayed by the right-side video display screen are representative of at least a portion of the right-side exterior scene viewed by said right-side camera;
  wherein said control is operable to determine presence of another vehicle traveling along the left-side traffic lane of the road or along the right-side traffic lane of the road;
  wherein, as the equipped vehicle is driven along the road, and when said control does not determine presence of another vehicle traveling along the left-side traffic lane, the left-side video display screen displays video images representative of a left-side first portion of the left-side exterior scene viewed by said left-side camera;
  wherein the displayed video images representative of the left-side first portion show to the driver viewing the left-side video display screen the left-side first portion of the left-side exterior scene viewed by said left-side camera;
  wherein, as the equipped vehicle is driven along the road, and when said control does not determine presence of another vehicle traveling along the right-side traffic lane, the right-side video display screen displays video images representative of a right-side first portion of the right-side exterior scene viewed by said right-side camera;
  wherein the displayed video images representative of the right-side first portion show to the driver viewing the right-side video display screen the right-side first portion of the right-side exterior scene viewed by said right-side camera;
  wherein, as the equipped vehicle is driven along the road, and responsive to determination by said control that the determined other vehicle is traveling along the left-side traffic lane of the road and is approaching the equipped vehicle from rearward of the equipped vehicle, the left-side video display screen displays video images representative of a left-side second portion of the left-side exterior scene viewed by said left-side camera, the left-side second portion of the left-side exterior scene viewed by said left-side camera including the determined other vehicle;
  wherein the displayed video images representative of the left-side second portion show to the driver viewing the left-side video display screen the left-side second portion of the left-side exterior scene viewed by said left-side camera;
wherein the left-side second portion of the left-side exterior scene viewed by said left-side camera is a smaller portion of the left-side exterior scene viewed by said left-side camera than is the left-side first portion of the left-side exterior scene viewed by said left-side camera;
wherein, as the equipped vehicle is driven along the road, and responsive to determination by said control that the determined other vehicle is traveling along the right-side traffic lane of the road and is approaching the equipped vehicle from rearward of the equipped vehicle, the right-side video display screen displays video images representative of a right-side second portion of the right-side exterior scene viewed by said right-side camera, the right-side second portion of the right-side exterior scene viewed by said right-side camera including the determined other vehicle;
wherein the displayed video images representative of the right-side second portion show to the driver viewing the right-side video display screen the right-side second portion of the right-side exterior scene viewed by said right-side camera;
wherein the right-side second portion of the right-side exterior scene viewed by said right-side camera is a smaller portion of the right-side exterior scene viewed by said right-side camera than is the right-side first portion of the right-side exterior scene viewed by said right-side camera;
wherein, as the equipped vehicle is driven along the road, and responsive to the determination by said control that the other vehicle is traveling along the left-side traffic lane and is approaching the equipped vehicle from rearward of the equipped vehicle, the left-side video display screen displays a graphic overlay overlaying the displayed video images representative of the left-side second portion of the left-side exterior scene viewed by said left-side camera to indicate to the driver of the equipped vehicle location of the determined other vehicle relative to the left-body side of the equipped vehicle at which said left-side camera is disposed;
wherein, as the equipped vehicle is driven along the road, and responsive to the determination by said control that the other vehicle is traveling along the right-side traffic lane and is approaching the equipped vehicle from rearward of the equipped vehicle, the right-side video display screen displays a graphic overlay overlaying the displayed video images representative of the right-side second portion of the right-side exterior scene viewed by said right-side camera to indicate to the driver of the equipped vehicle location of the determined other vehicle relative to the right-body side of the equipped vehicle at which said right-side camera is disposed;
wherein frames of image data captured by said left-side camera are processed at said control to limit flickering in the video images as displayed at the left-side video display screen; and
wherein frames of image data captured by said right-side camera are processed at said control to limit flickering in the video images as displayed at the right-side video display screen.

32. The vehicular vision system of claim 31, wherein each of the left-side video display screen and the right-side video display screen has a display area viewable by the driver, and wherein, when the respective left-side video display screen and the right-side video display screen displays video images representative of the respective left-side first portion or right-side first portion of the respective left-side exterior scene or right-side exterior scene, the displayed video images representative of the respective first portion fill the display area of the respective video display screen.

33. The vehicular vision system of claim 32, wherein, when each of the left-side video display screen and the right-side video display screen displays video images representative of the second portion of the respective left-side exterior scene or right-side exterior scene viewed by the respective left-side camera or right-side camera, the displayed video images representative of the respective second portion fill the display area of the respective video display screen.

34. The vehicular vision system of claim 31, wherein said control determines presence of the other vehicle via processing at said control of frames of image data captured by said left-side camera or said right-side camera.

35. The vehicular vision system of claim 31, wherein said control determines presence of the other vehicle via a blind spot detection system of the equipped vehicle.

36. The vehicular vision system of claim 31, wherein the video images displayed by the left-side video display screen are derived from a rolling average of frames of image data captured by said left-side camera to limit flickering in video images as displayed at the left-side video display screen, and wherein the video images displayed by the right-side video display screen are derived from a rolling average of frames of image data captured by said right-side camera to limit flickering in video images as displayed at the right-side video display screen.

37. The vehicular vision system of claim 31, wherein said control adjusts the displayed portion of the respective exterior scene that is being displayed by the respective video display screen responsive at least in part to a driver monitoring system of the equipped vehicle.

38. The vehicular vision system of claim 37, wherein said control adjusts the displayed portion of the respective exterior scene that is being displayed by the respective video display screen responsive at least in part to determination by the driver monitoring system of the equipped vehicle of a movement of a head of the driver of the equipped vehicle.

39. The vehicular vision system of claim 31, wherein said control adjusts the displayed portion of the respective exterior scene that is being displayed by the respective video display screen responsive at least in part to a global positioning system of the equipped vehicle.

40. The vehicular vision system of claim 31, wherein said control adjusts the displayed portion of the respective exterior scene that is being displayed by the respective video display screen responsive at least in part to actuation of a turn signal indicator of the equipped vehicle.

41. The vehicular vision system of claim 31, wherein said control adjusts the displayed portion of the respective exterior scene that is being displayed by the respective video display screen responsive at least in part to a lane departure detection system of the equipped vehicle.

42. The vehicular vision system of claim 31, wherein said control adjusts the displayed portion of the respective exterior scene that is being displayed by the respective video display screen responsive at least in part to a blind spot detection system of the equipped vehicle.

43. The vehicular vision system of claim 31, wherein the left-side video display screen is disposed between the driver of the equipped vehicle and a left-side A-pillar of the equipped vehicle.

44. The vehicular vision system of claim 31, wherein the right-side video display screen is disposed between the longitudinal centerline of the equipped vehicle and a right-side A-pillar of the equipped vehicle.

45. The vehicular vision system of claim 31, wherein the displayed graphic overlay comprises a perspectively-rendered overlay having a longitudinally extending line segment that is parallel to a respective displayed body side portion of the equipped vehicle and a plurality of laterally extending line segments that extend laterally outwardly from the longitudinally extending line segment at spaced apart intervals along the longitudinally extending line segment.

46. The vehicular vision system of claim 45, wherein the longitudinally extending line segment is spaced on the respective video display screen at a displayed distance representative of three feet or less from the displayed respective body side portion of the equipped vehicle.

47. The vehicular vision system of claim 46, wherein the plurality of laterally extending line segments comprises a closest laterally extending line segment that appears closer to the rear of the equipped vehicle when displayed on the respective video display screen than any other of the laterally extending line segments of the plurality of laterally extending line segments, and wherein the closest laterally extending line segment is spaced on the respective video display screen at a distance representative of at least twelve feet rearward of the equipped vehicle.

48. The vehicular vision system of claim 31, wherein, when the left-side video display screen displays video images representative of the second portion of the left-side exterior scene viewed by said left-side camera, the left-side video display screen does not display video images representative of the left-side first portion of the left-side exterior scene viewed by said left-side camera, and wherein, when the right-side video display screen displays video images representative of the second portion of the right-side exterior scene viewed by said right-side camera, the right-side video display screen does not display video images representative of the right-side first portion of the right-side exterior scene viewed by said right-side camera.

49. A vehicular vision system, said vehicular vision system comprising:
a left-side camera disposed at an exterior portion of a left-body side of a vehicle equipped with said vehicular vision system, said left-side camera viewing at least sideward and rearward of the equipped vehicle;
wherein, with the equipped vehicle traveling along a traffic lane of a road, said left-side camera views a left-side exterior scene that includes at least (i) a portion of the left-body side of the equipped vehicle and (ii) a portion of a left-side traffic lane adjacent to the traffic lane along which the equipped vehicle is traveling;
wherein said left-side camera captures frames of image data;
a right-side camera disposed at an exterior portion of a right-body side of the equipped vehicle, said right-side camera viewing at least sideward and rearward of the equipped vehicle;
wherein, with the equipped vehicle traveling along the traffic lane of the road, said right-side camera views a right-side exterior scene that includes at least (i) a portion of the right-body side of the equipped vehicle and (ii) a portion of a right-side traffic lane adjacent to the traffic lane along which the equipped vehicle is traveling;
wherein said right-side camera captures frames of image data;
a control disposed at the equipped vehicle, said control comprising an image processor for processing frames of image data captured by said left-side camera and for processing frames of image data captured by said right-side camera;
a left-side video display screen disposed in an interior cabin of the equipped vehicle and viewable by a driver of the equipped vehicle seated in a driver seat of the equipped vehicle;
wherein the left-side video display screen is disposed laterally leftward relative to a longitudinal centerline of the equipped vehicle toward the left-body side of the equipped vehicle and left of the driver of the equipped vehicle;
wherein the left-side video display screen displays video images derived from frames of image data captured by said left-side camera;
wherein the video images displayed by the left-side video display screen are representative of at least a portion of the left-side exterior scene viewed by said left-side camera;
a right-side video display screen disposed in the interior cabin of the equipped vehicle and viewable by the driver of the equipped vehicle;
wherein the right-side video display screen is disposed laterally rightward relative to the longitudinal centerline of the equipped vehicle toward the right-body side of the equipped vehicle and right of the driver of the equipped vehicle;
wherein the right-side video display screen displays video images derived from frames of image data captured by said right-side camera;
wherein the video images displayed by the right-side video display screen are representative of at least a portion of the right-side exterior scene viewed by said right-side camera;
wherein said control is operable to determine presence of another vehicle traveling along the left-side traffic lane of the road or along the right-side traffic lane of the road;
wherein said control determines presence of the other vehicle traveling along the left-side traffic lane of the road or along the right-side traffic lane of the road via a blind spot detection system of the equipped vehicle;
wherein, as the equipped vehicle is driven along the road, and when said control does not determine presence of another vehicle traveling along the left-side traffic lane, the left-side video display screen displays video images representative of a left-side first portion of the left-side exterior scene viewed by said left-side camera;
wherein the displayed video images representative of the left-side first portion show to the driver viewing the left-side video display screen the left-side first portion of the left-side exterior scene viewed by said left-side camera;
wherein, as the equipped vehicle is driven along the road, and when said control does not determine presence of another vehicle traveling along the right-side traffic lane, the right-side video display screen displays video images representative of a right-side first portion of the right-side exterior scene viewed by said right-side camera;

wherein the displayed video images representative of the right-side first portion show to the driver viewing the right-side video display screen the right-side first portion of the right-side exterior scene viewed by said right-side camera;

wherein, as the equipped vehicle is driven along the road, and responsive to determination by said control that the determined other vehicle is traveling along the left-side traffic lane of the road and is approaching the equipped vehicle from rearward of the equipped vehicle, the left-side video display screen displays video images representative of a left-side second portion of the left-side exterior scene viewed by said left-side camera, the left-side second portion of the left-side exterior scene viewed by said left-side camera including the determined other vehicle;

wherein the displayed video images representative of the left-side second portion show to the driver viewing the left-side video display screen the left-side second portion of the left-side exterior scene viewed by said left-side camera;

wherein the left-side second portion of the left-side exterior scene viewed by said left-side camera is a smaller portion of the left-side exterior scene viewed by said left-side camera than is the left-side first portion of the left-side exterior scene viewed by said left-side camera;

wherein, as the equipped vehicle is driven along the road, and responsive to determination by said control that the determined other vehicle is traveling along the right-side traffic lane of the road and is approaching the equipped vehicle from rearward of the equipped vehicle, the right-side video display screen displays video images representative of a right-side second portion of the right-side exterior scene viewed by said right-side camera, the right-side second portion of the right-side exterior scene viewed by said right-side camera including the determined other vehicle;

wherein the displayed video images representative of the right-side second portion show to the driver viewing the right-side video display screen the right-side second portion of the right-side exterior scene viewed by said right-side camera;

wherein the right-side second portion of the right-side exterior scene viewed by said right-side camera is a smaller portion of the right-side exterior scene viewed by said right-side camera than is the right-side first portion of the right-side exterior scene viewed by said right-side camera;

wherein, when the left-side video display screen displays video images representative of the second portion of the left-side exterior scene viewed by said left-side camera, the left-side video display screen does not display video images representative of the left-side first portion of the left-side exterior scene viewed by said left-side camera;

wherein, when the right-side video display screen displays video images representative of the second portion of the right-side exterior scene viewed by said right-side camera, the right-side video display screen does not display video images representative of the right-side first portion of the right-side exterior scene viewed by said right-side camera;

wherein, as the equipped vehicle is driven along the road, and responsive to the determination by said control that the other vehicle is traveling along the left-side traffic lane and is approaching the equipped vehicle from rearward of the equipped vehicle, the left-side video display screen displays a graphic overlay overlaying the displayed video images representative of the left-side second portion of the left-side exterior scene viewed by said left-side camera to indicate to the driver of the equipped vehicle location of the determined other vehicle relative to the left-body side of the equipped vehicle at which said left-side camera is disposed;

wherein, as the equipped vehicle is driven along the road, and responsive to the determination by said control that the other vehicle is traveling along the right-side traffic lane and is approaching the equipped vehicle from rearward of the equipped vehicle, the right-side video display screen displays a graphic overlay overlaying the displayed video images representative of the right-side second portion of the right-side exterior scene viewed by said right-side camera to indicate to the driver of the equipped vehicle location of the determined other vehicle relative to the right-body side of the equipped vehicle at which said right-side camera is disposed;

wherein frames of image data captured by said left-side camera are processed at said control to limit flickering in the video images as displayed at the left-side video display screen; and wherein frames of image data captured by said right-side camera are processed at said control to limit flickering in the video images as displayed at the right-side video display screen.

50. The vehicular vision system of claim 49, wherein each of the left-side video display screen and the right-side video display screen has a display area viewable by the driver, and wherein, when the respective left-side video display screen and the right-side video display screen displays video images representative of the respective left-side first portion or right-side first portion of the respective left-side exterior scene or right-side exterior scene, the displayed video images representative of the respective first portion fill the display area of the respective video display screen.

51. The vehicular vision system of claim 50, wherein, when each of the left-side video display screen and the right-side video display screen displays video images representative of the second portion of the respective left-side exterior scene or right-side exterior scene viewed by the respective left-side camera or right-side camera, the displayed video images representative of the respective second portion fill the display area of the respective video display screen.

52. The vehicular vision system of claim 49, wherein the video images displayed by the left-side video display screen are derived from a rolling average of frames of image data captured by said left-side camera to limit flickering in video images as displayed at the left-side video display screen, and wherein the video images displayed by the right-side video display screen are derived from a rolling average of frames of image data captured by said right-side camera to limit flickering in video images as displayed at the right-side video display screen.

53. The vehicular vision system of claim 49, wherein said control adjusts the displayed portion of the respective exterior scene that is being displayed by the respective video display screen responsive at least in part to a driver monitoring system of the equipped vehicle.

54. The vehicular vision system of claim 53, wherein said control adjusts the displayed portion of the respective exterior scene that is being displayed by the respective video display screen responsive at least in part to determination by the driver monitoring system of the equipped vehicle of a movement of a head of the driver of the equipped vehicle.

55. The vehicular vision system of claim 49, wherein said control adjusts the displayed portion of the respective exterior scene that is being displayed by the respective video display screen responsive at least in part to actuation of a turn signal indicator of the equipped vehicle.

56. The vehicular vision system of claim 49, wherein said control adjusts the displayed portion of the respective exterior scene that is being displayed by the respective video display screen responsive at least in part to a lane departure detection system of the equipped vehicle.

57. The vehicular vision system of claim 49, wherein the left-side video display screen is disposed between the driver of the equipped vehicle and a left-side A-pillar of the equipped vehicle.

58. The vehicular vision system of claim 49, wherein the right-side video display screen is disposed between the longitudinal centerline of the equipped vehicle and a right-side A-pillar of the equipped vehicle.

59. The vehicular vision system of claim 49, wherein the displayed graphic overlay comprises a perspectively-rendered overlay having a longitudinally extending line segment that is parallel to a respective displayed body side portion of the equipped vehicle and a plurality of laterally extending line segments that extend laterally outwardly from the longitudinally extending line segment at spaced apart intervals along the longitudinally extending line segment.

60. The vehicular vision system of claim 59, wherein the longitudinally extending line segment is spaced on the respective video display screen at a displayed distance representative of three feet or less from the displayed respective body side portion of the equipped vehicle.

61. The vehicular vision system of claim 60, wherein the plurality of laterally extending line segments comprises a closest laterally extending line segment that appears closer to the rear of the equipped vehicle when displayed on the respective video display screen than any other of the laterally extending line segments of the plurality of laterally extending line segments, and wherein the closest laterally extending line segment is spaced on the respective video display screen at a distance representative of at least twelve feet rearward of the equipped vehicle.

62. The vehicular vision system of claim 60, wherein the left-side video display screen has a diagonal dimension of at least 6.5 inches, and wherein the right-side video display screen has a diagonal dimension of at least 6.5 inches.

\* \* \* \* \*